(12) United States Patent
Deshmukh et al.

(10) Patent No.: US 9,805,095 B2
(45) Date of Patent: Oct. 31, 2017

(54) STATE INITIALIZATION FOR CONTINUOUS QUERIES OVER ARCHIVED VIEWS

(71) Applicant: Oracle International Corporation, Redwood Shores, CA (US)

(72) Inventors: Unmesh Anil Deshmukh, Nagpur (IN); Anand Srinivasan, Bangalore (IN); Vikram Shukla, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 14/036,500

(22) Filed: Sep. 25, 2013

(65) Prior Publication Data

US 2014/0095444 A1 Apr. 3, 2014

Related U.S. Application Data

(60) Provisional application No. 61/707,641, filed on Sep. 28, 2012, provisional application No. 61/830,007, filed on May 31, 2013.

(51) Int. Cl.
*G06F 17/30* (2006.01)

(52) U.S. Cl.
CPC .. *G06F 17/30516* (2013.01); *G06F 17/30463* (2013.01); *G06F 17/30466* (2013.01)

(58) Field of Classification Search
CPC .................. G06F 17/30463; G06F 17/30516
See application file for complete search history.

(56) References Cited

U.S. PATENT DOCUMENTS

| 4,996,687 A | 2/1991 | Hess et al. |
| 5,051,947 A | 9/1991 | Messenger et al. |

(Continued)

FOREIGN PATENT DOCUMENTS

| CN | 101866353 | 10/2010 |
| CN | 102135984 | 7/2011 |

(Continued)

OTHER PUBLICATIONS

"Pattern Recognition With MATCH_RECOGNIZE," Oracle™ Complex Event Processing CQL Language Reference, 11g Release 1 (11.1.1) E12048-03, May 2009, pp. 15-1 to 15-20.

(Continued)

*Primary Examiner* — Ashish K Thomas
*Assistant Examiner* — Jedidiah Ferrer
(74) *Attorney, Agent, or Firm* — Kilpatrick Townsend and Stockton LLP

(57) ABSTRACT

A method may include receiving a continuous query identified by an archived view. The method may also include creating the archived view, the archived view identified by a join query related to two or more archived relations associated with an application and/or generating a query plan for the continuous query. The method may also include identifying a view root operator in the archived view, the view root operator identified as a join operator in the archived view and/or identifying a query operator in the query plan that topologically precedes the view root operator. Further, the method may include constructing an archiver query for the identified query operator that topologically precedes the view root operator, executing the archiver query to obtain a result set of data records related to the application, and/or generating a snapshot output of one or more data values related to the application.

13 Claims, 16 Drawing Sheets

(56) References Cited

U.S. PATENT DOCUMENTS

| | | |
|---|---|---|
| 5,339,392 A | 8/1994 | Risberg et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | Demichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray et al. |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,633,867 B1 | 10/2003 | Kraft et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,904,019 B2 | 6/2005 | Heinen et al. |
| 6,985,904 B1 | 1/2006 | Kaluskar et al. |
| 6,986,019 B1 | 1/2006 | Bagashev et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,284,041 B2 | 10/2007 | Nakatani et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,440,461 B2 | 10/2008 | Sahita et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,526,804 B2 | 4/2009 | Shelest et al. |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 * | 3/2010 | Yan .................. G06F 17/30516 707/999.102 |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,984,043 B1 | 7/2011 | Waas |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,122,006 B2 | 2/2012 | De Castro Alves et al. |
| 8,134,184 B2 | 3/2012 | Becker et al. |
| 8,145,686 B2 | 3/2012 | Raman et al. |
| 8,145,859 B2 | 3/2012 | Park et al. |
| 8,155,880 B2 | 4/2012 | Patel et al. |
| 8,190,738 B2 | 5/2012 | Ruehle |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |

(56) References Cited

U.S. PATENT DOCUMENTS

| | | |
|---|---|---|
| 8,296,316 B2 | 10/2012 | Jain et al. |
| 8,307,197 B2 | 11/2012 | Koch, III |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,332,502 B1 | 12/2012 | Neuhaus et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,744 B2 | 5/2013 | Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,595,840 B1 | 11/2013 | Malibiran et al. |
| 8,676,841 B2 | 3/2014 | Srinivasan et al. |
| 8,713,049 B2 | 4/2014 | Jain et al. |
| 8,719,207 B2 | 5/2014 | Ratnam et al. |
| 8,738,572 B2 | 5/2014 | Bird et al. |
| 8,745,070 B2 | 6/2014 | Krishnamurthy |
| 8,762,369 B2 | 6/2014 | Macho et al. |
| 8,775,412 B2 | 7/2014 | Day et al. |
| 8,880,493 B2 | 11/2014 | Chen et al. |
| 9,015,102 B2 | 4/2015 | van Lunteren |
| 9,047,249 B2 | 6/2015 | de Castro Alves et al. |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 9,286,352 B2 | 3/2016 | Park et al. |
| 9,292,574 B2 | 3/2016 | Hsiao et al. |
| 9,305,057 B2 | 4/2016 | De Castro Alves et al. |
| 9,305,238 B2 | 4/2016 | Srinivasan et al. |
| 9,329,975 B2 | 5/2016 | Park et al. |
| 9,361,308 B2 | 6/2016 | Deshmukh et al. |
| 9,390,135 B2 | 7/2016 | Alves et al. |
| 9,418,113 B2 | 8/2016 | Bishnoi et al. |
| 9,430,494 B2 | 8/2016 | Park et al. |
| 9,535,761 B2 | 1/2017 | Park et al. |
| 9,563,663 B2 | 2/2017 | Shukla et al. |
| 2002/0023211 A1 | 2/2002 | Roth et al. |
| 2002/0032804 A1 | 3/2002 | Hunt |
| 2002/0038306 A1 | 3/2002 | Griffin et al. |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0027698 A1 | 2/2005 | Collet et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0108368 A1 | 5/2005 | Mohan |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0147020 A1 | 7/2006 | Castillo et al. |
| 2006/0155719 A1 | 7/2006 | Mihaeli et al. |
| 2006/0166704 A1 | 7/2006 | Benco et al. |
| 2006/0167704 A1 | 7/2006 | Nicholls et al. |
| 2006/0167856 A1 | 7/2006 | Angele et al. |
| 2006/0167869 A1 | 7/2006 | Jones |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0192301 A1 | 8/2007 | Posner |
| 2007/0198479 A1 | 8/2007 | Cai et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |

(56) References Cited

U.S. PATENT DOCUMENTS

| | | |
|---|---|---|
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0010335 A1 | 1/2008 | Wyler |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0275891 A1 | 11/2008 | Park et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | Kanthi et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112779 A1 | 4/2009 | Wolf et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0228465 A1* | 9/2009 | Krishnamurthy . G06F 17/30516 707/999.003 |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennett et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0022627 A1 | 1/2010 | Scherer |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishizawa |
| 2010/0106946 A1 | 4/2010 | Imaki et al. |
| 2010/0125572 A1 | 5/2010 | Poblete et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223283 A1 | 9/2010 | Lee et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016123 A1 | 1/2011 | Pandey et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0035253 A1 | 2/2011 | Mason et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0084967 A1 | 4/2011 | De Pauw et al. |
| 2011/0093162 A1 | 4/2011 | Nielsen et al. |
| 2011/0105857 A1 | 5/2011 | Zhang et al. |
| 2011/0131588 A1 | 6/2011 | Allam et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | De Castro et al. |
| 2011/0213802 A1 | 9/2011 | Singh et al. |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |

(56) References Cited

U.S. PATENT DOCUMENTS

| | | |
|---|---|---|
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0116982 A1 | 5/2012 | Yoshida et al. |
| 2012/0124096 A1* | 5/2012 | Krishnamurthy et al. ... 707/792 |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290817 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0275452 A1 | 10/2013 | Krishnamurthy et al. |
| 2013/0332240 A1 | 12/2013 | Patri et al. |
| 2014/0019194 A1 | 1/2014 | Anne et al. |
| 2014/0059109 A1 | 2/2014 | Jugel |
| 2014/0082013 A1 | 3/2014 | Wolf et al. |
| 2014/0095425 A1 | 4/2014 | Sipple |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0237487 A1 | 8/2014 | Prasanna et al. |
| 2014/0324530 A1 | 10/2014 | Thompson et al. |
| 2014/0358959 A1 | 12/2014 | Bishnoi et al. |
| 2014/0379712 A1 | 12/2014 | Lafuente Alvarez |
| 2015/0007320 A1 | 1/2015 | Liu et al. |
| 2015/0156241 A1 | 6/2015 | Shukla et al. |
| 2015/0161214 A1 | 6/2015 | Kali et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |
| 2016/0085809 A1 | 3/2016 | De Castro et al. |
| 2016/0085810 A1 | 3/2016 | De Castro et al. |
| 2016/0103882 A1 | 4/2016 | Deshmukh et al. |
| 2016/0127517 A1 | 5/2016 | Shcherbakov et al. |
| 2016/0140180 A1 | 5/2016 | Park et al. |
| 2016/0154855 A1 | 6/2016 | Hsiao et al. |
| 2016/0283555 A1 | 9/2016 | Alves et al. |
| 2017/0024912 A1 | 1/2017 | De Castro et al. |
| 2017/0075726 A1 | 3/2017 | Park et al. |

FOREIGN PATENT DOCUMENTS

| | | |
|---|---|---|
| CN | 102665207 | 9/2012 |
| CN | 102892073 | 1/2013 |
| CN | 104885077 | 9/2015 |
| CN | 104937591 | 9/2015 |
| CN | 105593854 | 5/2016 |
| EP | 1241589 | 9/2002 |
| EP | 2474922 | 7/2012 |
| EP | 2946314 | 11/2015 |
| EP | 2946527 | 11/2015 |
| EP | 2959408 | 12/2015 |
| JP | 2002-251233 A | 9/2002 |
| JP | 2007-328716 A | 12/2007 |
| JP | 2008-541225 A | 11/2008 |
| JP | 2009-134689 A | 6/2009 |
| JP | 2010-108073 A | 5/2010 |
| JP | 2011-039818 A | 2/2011 |
| JP | 2015536001 | 12/2015 |
| JP | 2016500167 | 1/2016 |
| WF | WO01/18712 | 3/2001 |
| WO | 0049533 | 8/2000 |
| WO | 0118712 | 3/2001 |
| WO | 0159602 | 8/2001 |
| WO | 0165418 | 9/2001 |
| WO | 03030031 | 4/2003 |
| WO | 2007122347 | 11/2007 |
| WO | WO2009/119811 A1 | 10/2009 |
| WO | 2010050582 | 5/2010 |
| WO | 2012037511 | 3/2012 |
| WO | 2012050582 | 4/2012 |
| WO | 2012154408 | 11/2012 |
| WO | 2012158360 | 11/2012 |
| WO | 2014000819 | 1/2014 |
| WO | 2014193943 | 12/2014 |
| WO | 2015191120 | 12/2015 |
| WO | 2016048912 | 3/2016 |

OTHER PUBLICATIONS

"Supply Chain Event Management: Real-Time Supply Chain Event Management," product information Manhattan Associates (copyright 2009-2012) one page.

Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.

Chandramouli et al. "High-Performance Dynamic Pattern Matching over Disordered Streams," Proceedings of the VLDB Endowment, vol. 3 Issue 1-2, pp. 220-231 (Sep. 2010).

Complex Event Processing in the Real World, an Oracle White Paper, Sep. 2007, 13 pages.

Coral8 Complex Event Processing Technology Overview, Coral8, Inc., Make it Continuous, Copyright 2007 Coral8, Inc., 2007, pp. 1-8.

Creating WebLogic Domains Using the Configuration Wizard, BEA Products, Version 10.0, Dec. 2007, 78 pages.

Creating Weblogic Event Server Applications, BEA WebLogic Event Server, Version. 2.0, Jul. 2007, 90 pages.

Dependency Injection, Dec. 30, 2008, pp. 1-7.

Deploying Applications to WebLogic Server, Mar. 30, 2007, 164 pages.

Developing Applications with Weblogic Server, Mar. 30, 2007, 254 pages.

EPL Reference, Jul. 2007, 82 pages.

Esper Reference Documentation Version 3.1.0, EsperTech, retrieved from internet at URL: http://espercodehaus.org/esper-3.1.0/doc/reference/en/pdf/esper_reference.pdf, 2009, 293 pages.

Esper Reference Documentation, Copyright 2007, Ver. 1.12.0, 2007, 158 pages.

Esper Reference Documentation, Copyright 2008, ver. 2.0.0, 2008, 202 pages.

Fantozzi "A Strategic Approach to Supply Chain Event Management," student submission for Masters Degree, Massachusetts Institute of Technology (Jun. 2003) 36 pages.

(56) References Cited

OTHER PUBLICATIONS

Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs100/guickstart/guick_start. html, May 10, 2010, 1 page.
Getting Started with WebLogic Event Server, BEA WebLogic Event Server version 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Komazec et al. "Towards Efficient Schema-Enhanced Pattern Matching over RDF Data Streams," Proceedings of the 1st International Workshop on Ordering and Reasoning (OrdRing 2011), Bonn, Germany, (Oct. 2011).
Managing Server Startup and Shutdown, BEA WebLogic Server, ver. 10.0, Mar. 30, 2007, 134 pages.
Matching Behavior, .NET Framework Developer's Guide, Microsoft Corporation, Retrieved on: Jul. 1, 2008, URL: http://msdn.microsoft.com/en-us/library/Oyzc2ybO(printer).aspx, 2008, pp. 1-2.
New Project Proposal for Row Pattern Recognition—Amendment to SQL with Application to Streaming Data Queries, H2-2008-027, H2 Teleconference Meeting, Jan. 9, 2008, pp. 1-6.
Ogrodnek "Custom UDFs and hive," Bizo development blog http://dev.bizo.com (Jun. 23, 3009) 2 pages.
Oracle Application Server 10g, Release 2 and 3, New Features Overview, an Oracle White Paper, Oracle., Oct. 2005, 48 pages.
Oracle Application Server, Administrator's Guide, 10g Release 3 (10.1.3.2.0), B32196-01, Oracle, Jan. 2007, 376 pages.
Oracle Application Server, Enterprise Deployment Guide, 10g Release 3 (10.1.3.2.0), B32125-02, Oracle, Apr. 2007, 120 pages.
Oracle CEP Getting Started, Release 11 gR1 (11.1.1) E14476-01, May 2009, 172 pages.
Oracle Complex Event Processing CQL Language Reference, 1g Release 1 (11.1.1) E12048-01, Apr. 2010, 540 pages.
Oracle Database Data Cartridge Developer's Guide, B28425-03, 11 g Release 1 (11.1), Oracle, Mar. 2008, 372 pages.
Oracle Database, SQL Language Reference 11 g Release 1 (11.1), B28286-02, Oracle, Sep. 2007, 1496 pages.
Oracle Database, SQL Reference, 10g Release 1 (10.1), Part No. B10759-01, Dec. 2003, 7-1 to 7-17; 7-287 to 7-290; 14-61 to 14-74.
Oracle™ Complex Event Processing CQL Language Reference, 11g Release 1 (11.1.1.4.0) E12048-04,(Jan. 2011), pp. title page, iii-xxxviii, 1-1 to 4-26, 6-1 to 6-12, 18-1 to 20-26, Index-1 to Index-14.
Oracle™ Complex Event Processing CQL Language Reference, 11g Release 1 (11.1.1) E12048-03, (Apr. 2010) pp. 18-1 to 18.9.5.
Oracle™ Fusion Middleware CQL Language Reference, 11g Release 1 (11.1.1.6.3) E12048-10, (Aug. 2012) pp. title page, iii-xxxvi, 1-1 to 4-26, 6-1 to 6-12, 18-1 to 20-26, Index-1 to Index-14.
OSGI Service Platform Core Specification, The OSGI Alliance, OSGI Alliance, Apr. 2007, 288 pages.
Pradhan "Implementing and Configuring SAP® Event Management" Galileo Press, pp. 17-21 (copyright 2010).
Release Notes, BEA WebLogic Event Server, Ver. 2.0, Jul. 2007, 8 pages.
Spring Dynamic Modules for OSGi Service Platforms product documentation, Jan. 2008, 71 pages.
SQL Tutorial-In, Tizag.com, http://web.archive.org/web/20090216215219/http://www.tizag.com/sqiTutorial/sqlin.php,, Feb. 16, 2009, pp. 1-3.
Stream Base New and Noteworthy, Stream Base, Jan. 12, 2010, 878 pages.
Stream Query Repository: Online Auctions, at URL: http://www-db.stanford.edu/stream/sqr/onauc.html#queryspecsend, Dec. 2, 2002, 2 pages.
Stream: The Stanford Stream Data Manager, Retrieved from: URL: http://infolab.stanford.edu/stream/, Jan. 5, 2006, pp. 1-9.
The Stanford Stream Data Manager, IEEE Data Engineering Bulletin, Mar. 2003, pp. 1-8.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.
WebSphere Application Server V6.1 Problem Determination: IBM Redpaper Collection, Dec. 2007, 634 pages.
What is BPM? Datasheet [online]. IBM, [retrieved on Jan. 28, 2013]. Retrieved from the Internet: <URL: http://www-01.ibm.com/software/info/bpm/whatis-bpm/>.
Wilson "SAP Event Management, an Overview," Q Data USA, Inc.( copyright 2009) 16 pages.
U.S. Appl. No. 10/948,523, Final Office Action dated Jul. 6, 2007, 37 pages.
U.S. Appl. No. 10/948,523, Non-Final Office Action dated Dec. 11, 2007, 48 pages.
U.S. Appl. No. 10/948,523, Notice of Allowance dated Dec. 1, 2008, 17 pages.
U.S. Appl. No. 10/948,523, Notice of Allowance dated Jul. 8, 2008, 28 pages.
U.S. Appl. No. 10/948,523, Office Action dated Janaury 22, 2007, 32 pages.
U.S. Appl. No. 10/948,523, Supplemental Notice of Allowance dated Jul. 17, 2008, 4 pages.
U.S. Appl. No. 10/948,523, Supplemental Notice of Allowance dated Aug. 25, 2008, 3 pages.
Non-Final Office Action for U.S. Appl. No. 11/601,415 dated Dec. 11, 2013, 57 pages.
U.S. Appl. No. 11/601,415, Final Office Action dated May 27, 2009, 26 pages.
U.S. Appl. No. 11/601,415, Final Office Action dated Jul. 2, 2012, 58 pages.
U.S. Appl. No. 11/601,415, Final Office Action dated Jun. 30, 2010, 45 pages.
U.S. Appl. No. 11/601,415, Non-Final Office Action dated Sep. 17, 2008, 10 pages.
U.S. Appl. No. 11/601,415, Non-Final Office Action dated Nov. 30, 2009, 32 pages.
U.S. Appl. No. 11/601,415, Office Action dated Dec. 9, 2011, 44 pages.
U.S. Appl. No. 11/873,407, Final Office Action dated Apr. 26, 2010, 11 pages.
U.S. Appl. No. 11/873,407, Non-Final Office Action dated Nov. 13, 2009, 7 pages.
U.S. Appl. No. 11/873,407, Notice of Allowance dated Nov. 10, 2010, 14 pages.
U.S. Appl. No. 11/873,407, Notice of Allowance dated Mar. 7, 2011, 8 pages.
U.S. Appl. No. 11/874,197, Final Office Action dated Aug. 12, 2011, 21 pages.
U.S. Appl. No. 11/874,197, Final Office Action dated Jun. 29, 2010, 17 pages.
U.S. Appl. No. 11/874,197, Non-Final Office Action dated Dec. 22, 2010, 22 pages.
U.S. Appl. No. 11/874,197, Office Action dated Nov. 10, 2009, 14 pages.
U.S. Appl. No. 11/874,202, Final Office Action dated Jun. 8, 2010, 18 pages.
U.S. Appl. No. 11/874,202, Non-Final Office Action dated Dec. 3, 2009, 15 pages.
U.S. Appl. No. 11/874,202, Notice of Allowance dated Mar. 31, 2011, 9 pages.

(56) References Cited

OTHER PUBLICATIONS

U.S. Appl. No. 11/874,202, Notice of Allowance dated Dec. 22, 2010, 13 pages.
U.S. Appl. No. 11/874,850, Notice of Allowance dated Jan. 27, 2010, 11 pages.
U.S. Appl. No. 11/874,850, Notice of Allowance dated Nov. 24, 2009, 12 pages.
U.S. Appl. No. 11/874,850, Notice of Allowance dated Dec. 11, 2009, 5 pages.
U.S. Appl. No. 11/874,896, Final Office Action dated Jul. 23, 2010, 28 pages.
U.S. Appl. No. 11/874,896, Non-Final Office Action dated Dec. 8, 2009, 15 pages.
U.S. Appl. No. 11/874,896, Non-Final Office Action dated Nov. 22, 2010, 25 pages.
U.S. Appl. No. 11/874,896, Notice of Allowance dated Jun. 23, 2011, 5 pages.
U.S. Appl. No. 11/927,681, Non-Final Office Action dated Mar. 24, 2011, 14 pages.
U.S. Appl. No. 11/927,681, Notice of Allowance dated Jul. 1, 2011, 8 pages.
U.S. Appl. No. 11/927,683, Final Office Action dated Sep. 1, 2011, 18 pages.
U.S. Appl. No. 11/927,683, Non-Final Office Action dated Mar. 24, 2011, 10 pages.
U.S. Appl. No. 11/927,683, Notice of Allowance dated Nov. 9, 2011, 7 pages.
U.S. Appl. No. 11/977,437, Final Office Action dated Apr. 8, 2010, 18 pages.
U.S. Appl. No. 11/977,437, Non-Final Office Action dated Oct. 13, 2009, 9 pages.
U.S. Appl. No. 11/977,437, Notice of Allowance dated Jul. 10, 2013, 10 pages.
U.S. Appl. No. 11/977,437, Notice of Allowance dated Mar. 4, 2013, 9 pages.
U.S. Appl. No. 11/977,437, Office Action dated Aug. 3, 2012, 16 pages.
U.S. Appl. No. 11/977,439, Non-Final Office Action dated Apr. 13, 2010, 7 pages.
U.S. Appl. No. 11/977,439, Notice of Allowance dated Mar. 16, 2011, 10 pages.
U.S. Appl. No. 11/977,439, Notice of Allowance dated Aug. 18, 2010, 11 pages.
U.S. Appl. No. 11/977,439, Notice of Allowance dated Sep. 28, 2010, 6 pages.
U.S. Appl. No. 11/977,439, Notice of Allowance dated Nov. 24, 2010, 8 pages.
U.S. Appl. No. 11/977,440, Notice of Allowance dated Oct. 7, 2009, 6 pages.
U.S. Appl. No. 12/395,871, Non-Final Office Action dated May 27, 2011, 7 pages.
U.S. Appl. No. 12/395,871, Notice of Allowance dated May 4, 2012, 5 pages.
U.S. Appl. No. 12/395,871, Office Action dated Oct. 19, 2011, 8 pages.
U.S. Appl. No. 12/396,008, Non-Final Office Action dated Jun. 8, 2011, 9 pages.
U.S. Appl. No. 12/396,008, Notice of Allowance dated Nov. 16, 2011, 5 pages.
Non-Final Office Action for U.S. Appl. No. 12/396,464 dated Dec. 31, 2013, 15 pages.
U.S. Appl. No. 12/396,464, Final Office Action dated Jan. 16, 2013, 16 pages.
U.S. Appl. No. 12/396,464, Non-Final Office Action dated Sep. 7, 2012, 17 pages.
U.S. Appl. No. 12/506,891, Notice of Allowance dated Jul. 25, 2012, 8 pages.
U.S. Appl. No. 12/506,891, Office Action dated Dec. 14, 2011, 17 pages.
U.S. Appl. No. 12/506,905, Notice of Allowance dated Dec. 14, 2012, 8 pages.
U.S. Appl. No. 12/506,905, Office Action dated Aug. 9, 2012, 33 pages.
U.S. Appl. No. 12/506,905, Office Action dated Mar. 26, 2012, 60 pages.
U.S. Appl. No. 12/534,384, Notice of Allowance dated May 7, 2013, 11 pages.
U.S. Appl. No. 12/534,384, Office Action dated Feb. 28, 2012, 12 pages.
U.S. Appl. No. 12/534,384, Office Action dated Feb. 12, 2013, 13 pages.
U.S. Appl. No. 12/534,398, Final Office Action dated Jun. 5, 2012, 16 pages.
U.S. Appl. No. 12/534,398, Notice of Allowance dated Nov. 27, 2012, 9 pages.
U.S. Appl. No. 12/534,398, Office Action dated Nov. 1, 2011, 14 pages.
U.S. Appl. No. 12/548,187, Final Office Action dated Jun. 10, 2013, 17 pages.
U.S. Appl. No. 12/548,187, Non Final Office Action dated Sep. 27, 2011, 17 pages.
U.S. Appl. No. 12/548,187, Non-Final Office Action dated Apr. 9, 2013, 17 pages.
U.S. Appl. No. 12/548,187, Office Action dated Jun. 20, 2012, 31 pages.
U.S. Appl. No. 12/548,209, Notice of Allowance dated Oct. 24, 2012, 12 pages.
U.S. Appl. No. 12/548,209, Office Action dated Apr. 16, 2012, 16 pages.
U.S. Appl. No. 12/548,222, Non-Final Office Action dated Apr. 10, 2013, 16 pages.
U.S. Appl. No. 12/548,222, Non-Final Office Action dated Oct. 19, 2011, 17 pages.
U.S. Appl. No. 12/548,222, Notice of Allowance dated Jul. 18, 2013, 12 pages.
U.S. Appl. No. 12/548,222, Office Action dated Jun. 20, 2012, 20 pages.
U.S. Appl. No. 12/548,281, Final Office Action dated Oct. 10, 2013, 21 pages.
U.S. Appl. No. 12/548,281, Non-Final Office Action dated Apr. 12, 2013, 16 pages.
U.S. Appl. No. 12/548,281, Non-Final Office Action dated Oct. 3, 2011, 18 pages.
U.S. Appl. No. 12/548,281, Office Action dated Jun. 20, 2012, 29 pages.
U.S. Appl. No. 12/548,290, Final Office Action dated Jul. 30, 2012, 21 pages.
U.S. Appl. No. 12/548,290, Non-Final Office Action dated Oct. 3, 2011, 15 pages.
U.S. Appl. No. 12/548,290, Non-Final Office Action dated Apr. 15, 2013, 17 pages.
U.S. Appl. No. 12/548,290, Notice of Allowance dated Sep. 11, 2013, 6 pages.
U.S. Appl. No. 11/874,197, Notice of Allowance dated Jun. 22, 2012, 20 pages.
U.S. Appl. No. 12/913,636, Final Office Action dated Jan. 8, 2013, 21 pages.
U.S. Appl. No. 12/913,636, Office Action dated Jun. 7, 2012, 15 pages.
U.S. Appl. No. 12/949,081, Final Office Action dated Aug. 27, 2013, 12 pages.
U.S. Appl. No. 12/949,081, Non-Final Office Action dated Jan. 9, 2013, 12 pages.
U.S. Appl. No. 12/957,194, Non-Final Office Action dated Dec. 7, 2012, 11 pages.
U.S. Appl. No. 12/957,194, Notice of Allowance dated Mar. 20, 2013, 9 pages.
U.S. Appl. No. 12/957,201, Final Office Action dated Apr. 25, 2013, 10 pages.
U.S. Appl. No. 12/957,201, Office Action dated Dec. 19, 2012, 13 pages.

(56) References Cited

OTHER PUBLICATIONS

Non-Final Office Action for U.S. Appl. No. 13/089,556 dated Jan. 9, 2014, 13 pages.
U.S. Appl. No. 13/089,556, Final Office Action dated Aug. 29, 2013, 10 pages.
U.S. Appl. No. 13/089,556, Non-Final Office Action dated Apr. 10, 2013, 9 pages.
U.S. Appl. No. 13/089,556, Office Action dated Nov. 6, 2012, 12 pages.
U.S. Appl. No. 13/102,665, Final Office Action dated Jul. 9, 2013, 16 pages.
U.S. Appl. No. 13/102,665, Office Action dated Feb. 1, 2013, 13 pages.
U.S. Appl. No. 13/107,742, Final Office Action dated Jul. 3, 2013, 19 pages.
U.S. Appl. No. 13/107,742, Non-Final Office Action dated Feb. 14, 2013, 16 pages.
U.S. Appl. No. 13/177,748, Non-Final Office Action dated Aug. 30, 2013, 23 pages.
U.S. Appl. No. 13/184,528, Notice of Allowance dated Mar. 1, 2012, 16 pages.
U.S. Appl. No. 13/193,377, Notice of Allowance dated Aug. 30, 2013, 18 pages.
U.S. Appl. No. 13/193,377, Office Action dated Jan. 17, 2013, 24 pages.
U.S. Appl. No. 13/193,377, Office Action dated Aug. 23, 2012, 20 pages.
U.S. Appl. No. 13/244,272, Notice of Allowance dated Aug. 12, 2013, 12 pages.
U.S. Appl. No. 13/244,272, Final Office Action dated Mar. 28, 2013, 29 pages.
U.S. Appl. No. 13/244,272, Office Action dated Oct. 4, 2012, 29 pages.
Abadi et al., Yes Aurora: A Data Stream Management System, International Conference on Management of Data, Proceedings of the 2003 ACM SIGMOD International Conference on Management of Data, 2003, 4 pages.
Aho et al., Efficient String Matching: An Aid to Bibliographic Search, Communications of the ACM, vol. 18, No. 6, Association for Computing Machinery, Inc., Jun. 1975, pp. 333-340.
Arasu et al., An Abstract Semantics and Concrete Language for Continuous Queries over Streams and Relations, 9th International Workshop on Database programming languages, Sep. 2003, 12 pages.
Arasu et al., CQL: A language for Continuous Queries over Streams and Relations, Lecture Notes in Computer Science vol. 2921, 2004, pp. 1-19.
Arasu et al., STREAM: The Stanford Data Stream Management System, Department of Computer Science, Stanford University, 2004, p. 21.
Arasu et al., The CQL Continuous Query Language: Semantic Foundations and Query Execution, Stanford University, The VLDB Journal—The International Journal on Very Large Data Bases, vol. 15, No. 2, Springer-Verlag New York, Inc, Jun. 2006, pp. 1-32.
Avnur et al., Eddies: Continuously Adaptive Query Processing, In Proceedings of the 2000 ACM SIGMOD International Conference on Data, Dallas TX, May 2000, 12 pages.
Avnur et al., Eddies: Continuously Adaptive Query Processing, 2007, 4 pages.
Babcock et al., Models and Issues in Data Streams, Proceedings of the 21st ACM SIGMOD-SIGACT-SIDART symposium on Principles database systems, 2002, 30 pages.
Babu et al., Continuous Queries over Data Streams, SIGMOD Record, vol. 30, No. 3, Sep. 2001, pp. 109-120.
Bai et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose et al., A Query Algebra for Fragmented XML Stream Data, 9th International Conference on Data Base Programming Languages (DBPL), Sep. 2003, 11 pages.
Buza, Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sqlteam.comitemprint.asp?ItemID=979, Oct. 12, 2000, 4 pages.
Chan et al., Efficient Filtering of XML documents with Xpath expressions, 2002, pp. 354-379.
Chandrasekaran et al., TelegraphCQ: Continuous Dataflow Processing for an UncertainWorld, Proceedings of CIDR, 2003, 12 pages.
Chen et al., NiagaraCQ: A Scalable Continuous Query System for Internet Databases, Proceedings of the 2000 SIGMOD International Conference on Management of Data, May 2000, pp. 379-390.
Colyer et al., Spring Dynamic Modules Reference Guide, Copyright, ver. 1.0.3, 2006-2008, 73 pages.
Colyer et al., Spring Dynamic Modules Reference Guide, Ver. 1.1.3, 2006-2008, 96 pages.
Conway, An Introduction to Data Stream Query Processing, Truviso, Inc., May 24, 2007, 71 pages.
Demers et al., Towards Expressive Publish/Subscribe Systems, Proceedings of the 10th International Conference on Extending Database Technology (EDBT 2006), Munich, Germany, Mar. 2006, pp. 1-18.
Demichiel et al., JSR 220: Enterprise JavaBeans™, EJB 3.0 Simplified API, EJB 3.0 Expert Group, Sun Microsystems, Ver. 3.0, May 2, 2006, 59 pages.
Deshpande et al., Adaptive Query Processing, Slide show believed to be prior to Oct. 17, 2007, 27 pages.
Diad et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez et al., Build your own XQuery processor, slide show, at URL: http://www.galaxquery.org/slides/edbt-summer-school2004.pdf, 2004, 116 pages.
Fernandez et al., Implementing XQuery 1.0: The Galax Experience, Proceedings of the 29th VLDB Conference, Berlin, Germany, 2003, 4 pages.
Florescu et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab et al., Issues in Data Stream Management, ACM SIGMOD Record, vol. 32, issue 2, ACM Press, Jun. 2003, pp. 5-14.
Golab et al., Sliding Window Query Processing Over Data Streams, Aug. 2006, 182 pages.
Gosling et al., The Java Language Specification, 1996-2005, 684 pages.
Hao et al., Achieving high performance web applications by service and database replications at edge servers, Performance Computing and communications conference(IPCCC) IEEE 28th International, IEEE, Piscataway, NJ, USA, 2009, pp. 153-160.
Hopcroft, Introduction to Automata Theory, Languages, and Computation, Second Edition, Addison-Wesley, Copyright 2001, 524 pages.
Hulten et al., Mining Time-Changing Data Stream, Proceedings of the Seventh ACM SIGKDD International Conference on Knowledge Discovery and Data Mining., Aug. 2001, 10 pages.
Jin et al., ARGUS: Efficient Scalable Continuous Query Optimization for Large-Volume Data Streams, 10th International Database Engineering and Applications Symposium (IDEAS'06), 2006, 7 pages.
Kawaguchi et al., Java Architecture for XML Binding (JAXB) 2.2, Sun Microsystems, Inc., Dec. 10, 1999, 384 pages.
Knuth et al., Fast Pattern Matching in Strings, Siam J Comput. vol. 6(2), Jun. 1977, pp. 323-350.

(56) References Cited

OTHER PUBLICATIONS

Lakshmanan et al., On efficient matching of streaming XML documents and queries, 2002, 18 pages.
Lindholm et al., Java Virtual Machine Specification, 2nd Edition Prentice Hall, Apr. 1999, 484 pages.
Liu et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP? , Complex Event Processing, downloaded, at URL:http://complexevents.com/?p=103, Apr. 29, 2011, 5 pages.
Madden et al., Continuously Adaptive Continuous Queries (CACQ) over Streams, SIGMOD 2002, Jun. 4-6, 2002, 12 pages.
Martin et al., Finding Application Errors and Security Flaws Using PQL, a Program Query Language, OOPSLA'05, Oct. 16, 2005, pp. 1-19.
Motwani et al., Query Processing Resource Management, and Approximation in a Data Stream Management System, Jan. 2003, 12 pages.
Munagala et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.
Novick, Creating a User Defined Aggregate with SQL Server 2005, URL: http://novicksoftware.com/Articles/sql-2005-product-user-defined-aggregate.html, 2005, 6 pages.
International Application No. PCT/US2011/052019, International Search Report and Written Opinion dated Nov. 17, 2011, 55 pages.
International Application No. PCT/US2012/034970, International Search Report and Written Opinion dated Jul. 16, 2012, 13 pages.
International Application No. PCT/US2012/036353, International Search Report and Written Opinion dated Sep. 12, 2012, 11 pages.
Peng et al., Xpath Queries on Streaming Data, 2003, pp. 1-12.
Peterson, Petri Net Theory and the Modeling of Systems, Prentice Hall, 1981, 301 pages.
Postgressql, Documentation: Manuals: PostgresSQL 8.2: User-Defined Aggregates believed to be prior to Apr. 21, 2007, 4 pages.
Sadri et al., Expressing and Optimizing Sequence Queries in Database Systems, ACM Transactions on Database Systems, vol. 29, No. 2, ACM Press, Copyright 2004, Jun. 2004, pp. 282-318.
Sadtler et al., WebSphere Application Server Installation Problem Determination, Copyright 2007, IBM Corp., 2007, pp. 1-48.
Sansoterra, Empower SQL with Java User-Defined Functions, ITJungle.com. , Oct. 9, 2003, 9 pages.
Sharaf et al., Efficient Scheduling of Heterogeneous Continuous Queries, VLDB '06, Sep. 12-15, 2006, pp. 511-522.
Stolze et al., User-defined Aggregate Functions in DB2 Universal Database, Retrieved from: <http://www.128.ibm.com/deve10perworks/db2/library/tachartic1e/0309stolze/0309stolze.html>, Sep. 11, 2003, 11 pages.
Stump et al., Proceedings, The 2006 Federated Logic Conference, IJCAR '06 Workshop, PLPV '06: Programming Languages meets Program Verification., 2006, pp. 1-113.
Terry et al., Continuous queries over append-only database, Proceedings of ACM SIGMOD, 1992, pp. 321-330.
Ullman et al. , Introduction to JDBC, Stanford University, 2005, 7 pages.
Vajjhala et al., The Java Architecture for XML Binding (JAXB) 2.0, Apr. 19, 2006, 384 pages.
Vijayalakshmi et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang et al ., Distributed continuous range query processing on moving objects, DEXA'06 Proceedings of the 17th international conference on Database and Expert Systems Applications, 2006, pp. 655-665.
White et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom et al., CQL: A Language for Continuous Queries over Streams and Relations, Oct. 17, 2007, 62 pages.
Widom et al., The Stanford Data Stream Management System, PowerPoint Presentation, Oct. 17, 2007, 110 pages.
Wu et al., Dynamic Data Management for Location Based Services in Mobile Environments, Database Engineering and Applications Symposium, 2003, Jul. 16, 2003, pp. 172-181.
Zemke, XML Query, Mar. 14, 2004, 29 pages.
U.S. Appl. No. 12/949,081, Non-Final Office Action dated Jan. 28, 2015, 20 pages.
U.S. Appl. No. 12/957,201, Notice of Allowance dated Jan. 21, 2015, 5 pages.
U.S. Appl. No. 13/107,742, Final Office Action dated Jan. 21, 2015, 23 pages.
U.S. Appl. No. 13/177,748, Non-Final Office Action dated Feb. 3, 2015, 22 pages.
U.S. Appl. No. 13/770,961, Non-Final Office Action dated Feb. 4, 2015, 22 pages.
U.S. Appl. No. 13/770,969, Notice of Allowance dated Jan. 22, 2015, 5 pages.
U.S. Appl. No. 13/829,958, Non-Final Office Action dated Dec. 11, 2014, 15 pages.
U.S. Appl. No. 13/906,162, Non-Final Office Action dated Dec. 29, 2014, 10 pages.
International Application No. PCT/US2014/010832, Written Opinion dated Dec. 15, 2014, 5 pages.
International Application No. PCT/US2014/010920, International Search Report and Written Opinion dated Dec. 15, 2014, 10 pages.
International Application No. PCT/US2014/017061, Written Opinion dated Feb. 3, 2015, 6 pages.
International Application No. PCT/US2014/039771, International Search Report and Written Opinion dated Sep. 24, 2014, 12 pages.
U.S. Appl. No. 12/548,187, Non-Final Office Action dated Feb. 6, 2014, 54 pages.
U.S. Appl. No. 12/548,281, Non-Final Office Action dated Feb. 13, 2014, 16 pages.
U.S. Appl. No. 13/177,748, Final Office Action dated Mar. 20, 2014, 23 pages.
PCT Patent Application No. PCT/US2014/010832, International Search Report dated Apr. 3, 2014, 9 pages.
Agrawal et al., Efficient pattern matching over event streams, Proceedings of the 2008 ACM SIGMOD international conference on Management of data, Jun. 9-12, 2008, pp. 147-160.
Cadonna et al., Efficient event pattern matching with match windows, Proceedings of the $18^{th}$ ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
Cranor et al., Gigascope: a stream database for network applications, Proceedings of the 2003 Acm Sigmod International Conference on Management of Data ' SIGMOD '03, Jun. 9, 2003, pp. 647-651.
De Castro Alves, A General Extension System for Event Processing Languages, DEBS '11, New York, NY, USA, Jul. 11-15, 2011, pp. 1-9.
European Application No. 12783063.6, Extended European Search Report dated Mar. 24, 2015, 6 pages.
International Application No. PCT/US2014/068641, International Search Report and Written Opinion dated Feb. 26, 2015, 11 pages.

(56) References Cited

OTHER PUBLICATIONS

Oracle® Complex Event Processing EPL Language Reference 11g Release 1 (11.1.1.4.0), E14304-02, Jan. 2011, 80 pages.
Takenaka et al., A scalable complex event processing framework for combination of SQL-based continuous queries and C/C++ functions, FPL 2012, Oslo, Norway, Aug. 29-31, 2012, pp. 237-242.
Tomàs et al., RoSeS: A Continuous Content-Based Query Engine for RSS Feeds, DEXA 2011, Toulouse, France, Sep. 2, 2011, pp. 203-218.
U.S. Appl. No. 12/913,636, Non-Final Office Action dated Apr. 1, 2015, 22 pages.
U.S. Appl. No. 13/764,560, Final Office Action dated Apr. 15, 2015, 19 pages.
U.S. Appl. No. 13/827,631, Final Office Action dated Apr. 3, 2015, 11 pages.
U.S. Appl. No. 13/830,129, Non-Final Office Action dated Feb. 27, 2015, 19 pages.
U.S. Appl. No. 13/830,378, Non-Final Office Action dated Feb. 25, 2015, 23 pages.
U.S. Appl. No. 13/839,288, Notice of Allowance dated Apr. 3, 2015, 12 pages.
U.S. Appl. No. 14/077,230, Notice of Allowance dated Apr. 16, 2015, 16 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
International Application No. PCT/US2014/039771, International Search Report and Written Opinion dated Apr. 29, 2015 6 pages.
International Application No. PCT/US2015/016346, International Search Report and Written Opinion dated May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
U.S. Appl. No. 13/838,259, filed Mar. 15, 2013, Bishnoi et al.
U.S. Appl. No. 13/839,288, filed Mar. 15, 2013, Bishnoi et al.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
U.S. Appl. No. 12/396,464, Final Office Action dated May 16, 2014, 16 pages.
U.S. Appl. No. 12/548,187, Final Office Action dated Jun. 4, 2014, 64 pages.
U.S. Appl. No. 13/089,556, Final Office Action dated Jun. 13, 2014, 14 pages.
U.S. Appl. No. 13/107,742, Non-Final Office Action dated Jun. 19, 2014, 20 pages.
International Application No. PCT/US2011/052019, International Preliminary Report on Patentability dated Mar. 28, 2013, 6 pages.
International Application No. PCT/US2012/034970, International Preliminary Report on Patentability dated Nov. 21, 2013, 7 pages.
International Application No. PCT/US2012/036353, International Preliminary Report on Patentability dated Nov. 28, 2013, 6 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, ©, 2002, pp. 238-239 and 529.
Notice of Allowance for U.S. Appl. No. 13/089,556 dated Oct. 6, 2014, 9 pages.
U.S. Appl. No. 12/396,464, Notice of Allowance dated Sep. 3, 2014, 7 pages.
U.S. Appl. No. 12/548,187, Advisory Action dated Sep. 26, 2014, 6 pages.
U.S. Appl. No. 12/548,281, Final Office Action dated Aug. 13, 2014, 19 pages.
U.S. Appl. No. 12/913,636, Non-Final Office Action dated Jul. 24, 2014, 22 pages.
U.S. Appl. No. 12/957,201, Non-Final Office Action dated Jul. 30, 2014, 12 pages.
U.S. Appl. No. 13/764,560, Non Final Office Action dated Sep. 12, 2014, 23 pages.
U.S. Appl. No. 13/770,969, Non Final Office Action dated Aug. 7, 2014, 9 pages.
U.S. Appl. No. 14/302,031, Non-Final Office Action dated Aug. 27, 2014, 19 pages.
Abadi et al., Aurora: a new model and architecture for data stream management, the VLDB Journal the International Journal on very large data bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal, The International Journal on very large data bases, vol. 12, No. 2, Aug. 1, 2003, pp. 140-156.
Dewson, Beginning SQL Server 2008 for Developers: From Novice to Professional, A Press, Berkeley, CA, 2008, pp. 337-349 and 418-438.
Harish et al., Identifying robust plans through plan diagram reduction, PVLDB '08, Auckland, New Zealand, Aug. 23-28, 2008, pp. 1124-1140.
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion dated Jul. 16, 2014, 12 pages.
International Application No. PCT/US2013/062050, International Search Report & Written Opinion dated Jul. 2, 2014, 13 pages.
International Application No. PCT/US2013/062052, International Search Report & Written Opinion dated Jul. 3, 2014, 12 pages.
International Application No. PCT/US2013/073086, International Search Report and Written Opinion dated Mar. 14, 2014.
International Application No. PCT/US2014/017061, International Search Report and Written Opinion dated Sep. 9, 2014,12 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)—2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's LEarning Optimizer, Proc. of the VLDB, Roma, Italy, Sep. 2001, pp. 19-28.

(56) References Cited

OTHER PUBLICATIONS

Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (Oct. 28, 2015).
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Non-Final Office Action for U.S. Appl. No. 13/830,502 dated Dec. 11, 2015, 25 pages.
Final Office Action for U.S. Appl. No. 13/828,640 dated Jun. 17, 2015, 11 pages.
Non-Final Office Action for U.S. Appl. No. 11/601,415 dated Nov. 13, 2015, 18 pages.
Japan Patent Office office actions JPO patent application JP2013-529376 (dated Aug. 18, 2015).
Final Office Action for U.S. Appl. No. 13/177,748 dated Aug. 21, 2015, 24 pages.
Notice of Allowance for U.S. Appl. No. 15/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
"Oracle Complex Event Processing Exatogic Performance Study" an Oracle White Paper. Sep. 2011, 16 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Action for U.S. Appl. No. 14/037,072 dated Jul. 9, 2015, 12 pages.
Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
Bestehorn Fault-tolerant query processing in structured P2P-systems, Springer Science+Business Media LLC Distrib Parallel Databases 28:33-66 (May 8, 2010).
Cooperativesystems: "Combined WLAN and Inertial Indoor Pedestrian Positioning System" URL:https://www.youtube.com/watch?v=mEt88WaHZvU, Nov. 15, 2010.
Frank et al "Development and Evaluation of a Combined WLAN & Inertial Indoor Pedestrian Positioning System" Proceedings of the $22^{nd}$ International Technical Meeting of the Satellite Division of the Institute of Navigation (ION GNSS 2009). (Sep. 25, 2009) pp. 538-546.
Kramer "Semantics and Implementation of Continuous Sliding Window Queries over Data Streams" ACM Transactions on Database Systems, vol. 34, pp. 4:1 to 4:49 (Apr. 2009).
Final Office Action for U.S. Appl. No. 13/830,428 dated May 26, 2016, 26 pages.
Final Office Action for U.S. Appl. No. 11/601,415 dated May 17, 2016, 17 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.
Final Office Action for U.S. Appl. No. 13/829,958 dated Jun. 30, 2016, 19 pages.
Final Office Action for U.S. Appl. No. 13/830,502 dated Jul. 6, 2016, 28 pages.
International Preliminary Report on Patentabiilty dated Jun. 16, 2016 for PCT/US2014/068641, 7 pages.
International Application No. PCT/RU2015/000468 International Search Report and Written Opinion dated Apr. 25, 2016, 9 pages.
International Application No. PCT/US2015/016346, International Search Report and Written Opinion dated May 24, 2016, 5 pages.
China Patent Office office action for patent application CN201180053021.4 (dated May 27, 2016).
Yosuke Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Shuhei Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.

(56) References Cited

OTHER PUBLICATIONS

Hiroyuki Kitagawa et al., Sensing Network, Information Processing, Information Processing Society of Japan, Sep. 15, 2010, vol. 51, No. 9, pp. 1119-1126.
Final Office Action for U.S. Appl. No. 13/830,759 dated Feb. 18, 2016, 18 pages.
Notice of Allowance for U.S. Appl. No. 13/770,961 dated Apr. 4, 2016, 8 pages.
Final Office Action for U.S. Appl. No. 13/838,259 dated Feb. 19, 2016, 47 pages.
Notice of Allowance for U.S. Appl. No. 13/906,162 dated Apr. 5, 2016, 7 pages.
Final Office Action for U.S. Appl. No. 13/764,560 dated Apr. 14, 2016, 20 pages.
Final Office Action for U.S. Appl. No. 14/621,098 dated Apr. 21, 2016, 16 pages.
Hirzel et al., "SPL Stream Processing Language Report", IBM Research Report RC24897 (W0911-044), IBM Research Division, Thomas J. Watson Research center, Yorktown Heights, NY, Nov. 5, 2009, 19 pages.
China Patent Office office actions for patent application CN201280022008.7 (dated Dec. 3, 2015).
European Application No. 12783063.6, Office Action dated Nov. 11, 2015, 8 pages.
Notice of Allowance for U.S. Appl. No. 12/548,187, dated Feb. 2, 2016, 15 pages.
Notice for U.S. Appl. No. 14/037,072 dated Feb. 16, 2016, 17 pages, 16 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 5, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Non-Final Office Action for U.S. Appl. No. 13/827,631 dated Feb. 11, 2016, 12 pages.
Ghazal et al., Dynamic plan generation for parameterized queries, Jun. 29, 2009, 7 pages.
Chaudhuri et al., Variance aware optimization of parameterized queries, Jun. 6, 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 Pages.
"11 Oracle Event Processing NoSQL 1-20 Database Data Cartridge—11g Release 1 (11.1.1.7) 11," Oracle Fusion Middleware CQL Language Reference for Oracle Event Processing 11g Release 1 (11.1.1.7), 4 pages (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).

Map Reduce, Wikipedia, The Free Encyclopedia, 2016, 8 pages.
Pig (programming tool), Wikipedia, The Free Encyclopedia, 2016, 3 pages.
U.S. Appl. No. 13/764,560, Notice of Allowance dated Sep. 30, 2016, 10 pages.
U.S. Appl. No. 14/079,538, Final Office Action dated Jul. 27, 2016, 28 pages.
U.S. Appl. No. 14/883,815, Notice of Allowance dated Aug. 30, 2016, 13 pages.
U.S. Appl. No. 13/827,631, Final Office Action dated Oct. 20, 2016, 12 pages.
Mahlke et al., Comparison of Full and Partial Predicated Execution Support for ILP Processors, ICSA '95, Santa Margherita Ligure, Jun. 1995, pp. 138-149.
Olston et al., Pig Latin, A Not-So-Foreign Language for Data Processing, 2008, 12 pages.
International Application No. PCT/US2015/016346, International Preliminary Report on Patentability dated Sep. 30, 2016, 6 pages.
International Application No. PCT/US2015/051268, Written Opinion dated Aug. 18, 2016, 7 pages.
Yang et al., Map-Reduce-Merge, Simplified Relational Data Processing on Large Clusters, 2007, 12 pages.
U.S. Appl. No. 13/829,958 Non-Final Office Action, dated Dec. 27, 2016, 20 pages.
U.S. Appl. No. 13/838,259 Non-Final Office Action, dated Jan. 4, 2017, 65 pages.
U.S. Appl. No. 14/610,971 Non-Final Office Action, dated Dec. 19, 2016, 10 pages.
U.S. Appl. No. 14/621,098 Non-Final Office Action, dated Nov. 14, 2016, 17 pages.
U.S. Appl. No. 15/003,646 Non-Final Office Action, dated Dec. 2, 2016, 9 pages.
U.S. Appl. No. 14/559,550 Non-Final Office Action, dated Jan. 27, 2017, 16 pages.
U.S. Appl. No. 15/015,933 Non-Final Office Action, dated Jan. 30, 2017, 11 pages.
U.S. Appl. No. 13/830,759, Non-Final Office Action dated Feb. 10, 2017, 23 pages.
U.S. Appl. No. 13/827,631, Non-Final Office Action dated Feb. 16, 2017, 16 pages.
International Application No. PCT/US2015/051268 International Preliminary Report on Patentability dated Dec. 8, 2016, 12 pages.
Sadana "Interactive Scatterplot for Tablets," The 12th International Working Conference on Advanced Visual Interfaces, available from https://vimeo.com/97798460 (May 2014).
U.S. Appl. No. 13/830,428, Non-Final Office Action dated Mar. 22, 2017, 25 pages.
U.S. Appl. No. 13/830,502, Non-Final Office Action dated Apr. 7, 2017, 28 pages.
U.S. Appl. No. 14/079,538, Non-Final Office Action dated Mar. 31, 2017, 24 pages.
U.S. Appl. No. 15/360,650, Non-Final Office Action dated Mar. 9, 2017, 34 pages.
U.S. Appl. No. 13/830,735, Non-Final Office Action dated Apr. 4, 2017, 16 pages.
U.S. Appl. No. 15/177,147, Non-Final Office Action dated Apr. 7, 2017, 12 pages.
U.S. Appl. No. 14/866,512, Non-Final Office Action dated Apr. 10, 2017, 24 pages.
U.S. Appl. No. 14/610,971, Notice of Allowance dated Apr. 12, 2017, 11 pages.
U.S. Appl. No. 13/829,958, Final Office Action dated Jun. 26, 2017, 22 pages.
U.S. Appl. No. 13/830,378, Non-Final Office Action dated Jul. 5, 2017, 44 pages.
U.S. Appl. No. 13/838,259, Final Office Action dated Jul. 7, 2017, 69 pages.
U.S. Appl. No. 14/036,659, Non-Final Office Action dated Jun. 2, 2017, 28 pages.
U.S. Appl. No. 14/559,550, Final Office Action dated Jul. 12, 2017, 21 pages.
U.S. Appl. No. 14/621,098, Notice of Allowance dated May 3, 2017, 9 pages.

(56) References Cited

OTHER PUBLICATIONS

U.S. Appl. No. 14/755,088, Non-Final Office Action dated Jun. 14, 2017, 13 pages.
U.S. Appl. No. 15/003,646, Notice of Allowance dated May 19, 2017, 16 pages.
U.S. Appl. No. 15/015,933, Notice of Allowance dated May 17, 2017, 16 pages.
Akama et al., Design and Evaluation of a Data Management System for WORM Data Processing, Journal of Information Processing, Information Processing Society of Japan, vol. 49, No. 2, Feb. 15, 2008, pp. 749-764.
Chinese Application No. 201380056012.X, Office Action dated Jun. 1, 2017, 22 pages (10 pages for the original document and 12 pages for the English translation).

* cited by examiner

STATE INITIALIZATION FOR CONTINUOUS QUERIES OVER ARCHIVED VIEWS

CROSS REFERENCES TO RELATED APPLICATIONS

The present application claims the benefit and priority under 35 U.S.C. 119(e) of U.S. Provisional Application No. 61/707,641 filed Sep. 28, 2012 entitled REAL-TIME BUSINESS EVENT ANALYSIS AND MONITORING and U.S. Provisional Application No. 61/830,007 filed May 31, 2013 entitled UTILIZING CONTINUOUS QUERIES ON ARCHIVED RELATIONS, the entire contents of each are hereby incorporated by reference for all purposes. This application is also related to application Ser. No. 14/037,072, entitled "STATE INITIALIZATION ALGORITHM FOR CONTINUOUS QUERIES OVER ARCHIVED RELATIONS," application Ser. No. 14/037,153, entitled "OPERATOR SHARING FOR CONTINUOUS QUERIES OVER ARCHIVED RELATIONS," application Ser. No. 14/036,659, entitled "GENERATION OF ARCHIVER QUERIES FOR CONTINUOUS QUERIES OVER ARCHIVED RELATIONS," and application Ser. No. 14/037,171, entitled "JOIN OPERATIONS FOR CONTINUOUS QUERIES OVER ARCHIVED VIEWS," each filed on the same day herewith, the entire contents of each hereby incorporated by reference as if fully set forth herein, under 35 U.S.C. §120.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

The foregoing, together with other features and embodiments, will become more apparent upon referring to the following specification, claims, and accompanying drawings.

In some examples, a computer-implemented method, a system, and/or a computer-readable medium may include receiving a continuous query, the continuous query being identified based at least in part on an archived view. The method, system, and/or computer-readable medium may also include creating the archived view, the archived view being identified based at least in part on a join query related to two or more archived relations associated with an application and/or generating a query plan for the continuous query. Additionally, in some aspects, the method, system, and/or computer-readable medium may also include identifying a view root operator in the archived view, the view root operator being identified as a join operator in the archived view and/or identifying a query operator in the query plan that topologically precedes the view root operator. Further, the method, system, and/or computer-readable medium may include constructing an archiver query for the identified query operator that topologically precedes the view root operator, executing the archiver query to obtain a result set of data records related to the application, and/or generating a snapshot output of one or more data values related to the application based at least in part on the result set of data records related to the application.

In at least one example, the method, system, and/or computer-readable medium may include traversing the query plan in topological order to identify the view root operator, the view root operator being identified by an output operator to store event information related to the application, inserting a buffer operator between the view root operator and the output operator in the query plan, and/or storing the event information from the view root operator in the buffer operator. The method, system, and/or computer-readable medium may also include identifying a second query operator in a second continuous query concurrently executing as being the same type as the query operator identified in the query plan, the second continuous query being identified based at least in part on the archived view and/or generating a combined query plan based at least in part on the query operator identified in the query plan being the same type as the second query operator in the second continuous query. The method, system, and/or computer-readable medium may also include initializing a state of the query operator based at least in part on the result set of data records, generating the snapshot output of one or more data values related to the application based at least in part on the state of the identified query operator, and/or initializing the state by constructing a list of tuples for the identified query operator from the result set of data records, wherein at least one tuple in the list of tuples is constructed based at least in part on a subset of attributes in the result set of data records. In some aspects, the method, system, and/or computer-readable medium may include displaying the snapshot output of the one or more data values related to the application to a user of the application via a display device. Further, the method, system, and/or computer-readable medium may also include processing incoming real-time events related to the application based at least in part on the snapshot output of the one or more data values.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
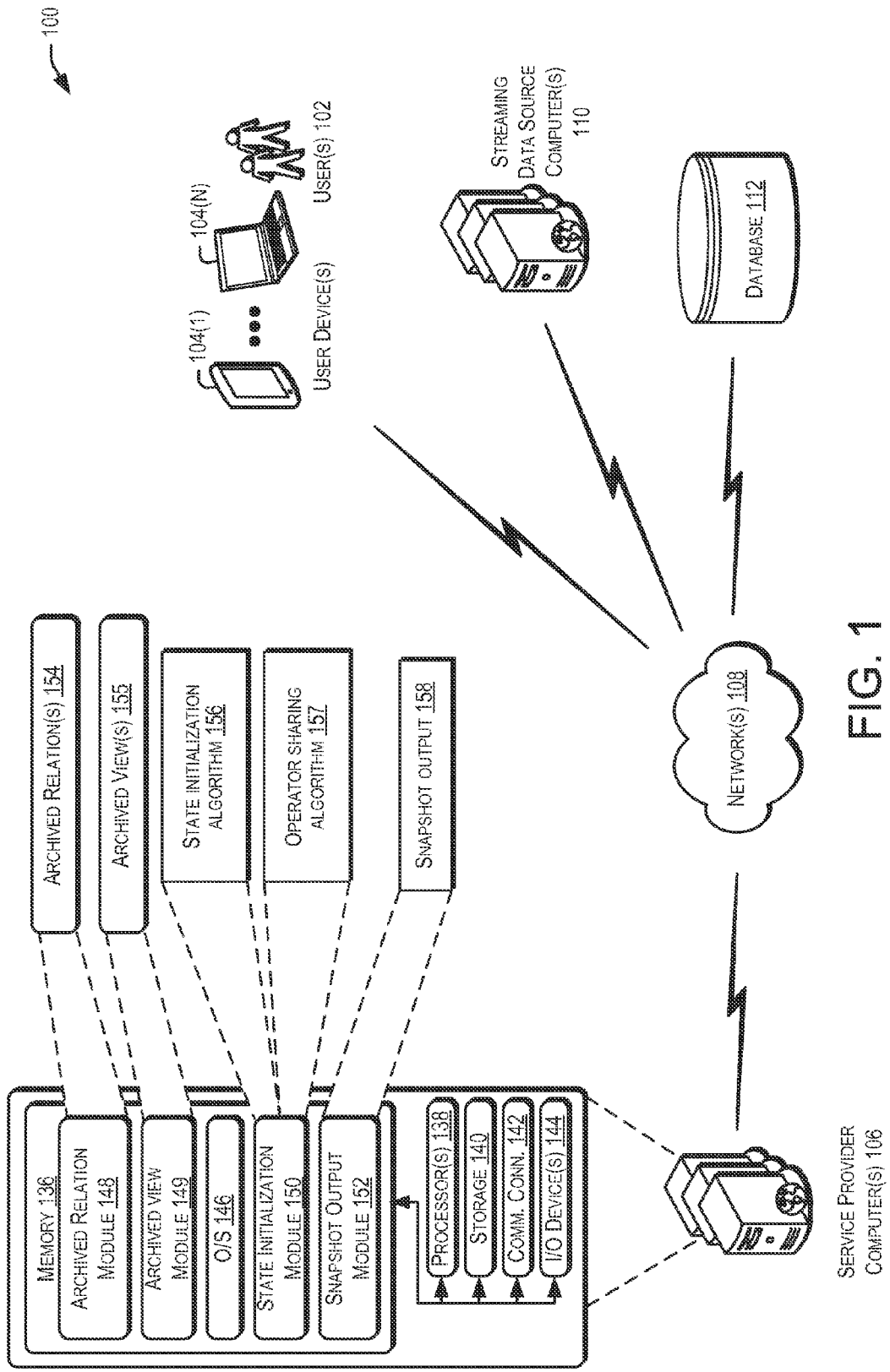
FIG. 1 depicts a simplified example system or architecture in which techniques for processing continuous queries with archived views may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, mechanisms to support continuous query language (CQL) queries (also referred to as "query statements") with one or more archived relations, for example, including but not limited to, a CQL relation this may be non-empty when created, may be provided. For example, in some scenarios, a CQL relation may be defined by applying a window on a stream. In other words, a relation may be a bounded dataset. For example, given an event stream, a relation may be first be defined by a window that includes a particular number or set of elements of the stream (e.g., within the window). However, a relation may, in some cases, be created in an empty state. That is, the window may be defined; however no events may be included the relation. On the other hand, an archived relation may include event data upon creation. In some examples, an archiver or other data object may be responsible for managing the real-time data to be utilized in creation of the archived relation and/or may provide this data to an engine configured to generate or otherwise manage the archived relations.

Additionally, in some examples, mechanisms for supporting the CQL queries with archived relations may also enable configuration of particular data windows of the archived relations. These data windows may be configured, generated, managed, updated, and/or otherwise manipulated by a user, administrator, or other entity associated with the archived relation and/or event data (e.g., business event data) of a user. Further, in some examples, archived relations within continuous queries may be implemented in such a way as to avoid missing and/or double counting change notifications. For example, when a query is run, it may initially be run against a data object backing store to establish the current state of the query, and then listen for and process change notification from that data object. However, change notifications may be missed while a complex event process (CEP) implementing the query is running the initial query. Additionally, change notifications may also be double-counted if the change is already in the initial query. Yet, in some examples, missed and/or double-counting change notifications may be avoided by establishing a listener before the initial query and/or utilizing a transaction identifier (TID), a context identifier (CID), or other mechanism for managing change events.

In general, a continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, business intelligence (BI) may help drive and optimize business operations at particular intervals (e.g., on a daily basis in some cases). This type of BI is usually called operational business intelligence, real-time business intelligence, or operational intelligence (OI). Operational Intelligence, in some examples, blurs the line between BI and business activity monitoring (BAM). For example, BI may be focused on periodic queries of historic data. As such, it may have a backward-looking focus. However, BI may also be placed into operational applications, and it may therefore expand from a mere strategic analytical tool into the front lines in business operations. As such, BI systems may also be configured to analyze event streams and compute aggregates in real time.

In some examples, a continuous query language service (CQ Service) may be configured to extend a BI analytics server to handle continuous queries and enable real-time alerts. The CQ Service, in some aspects, may provide integration with a BI analytics server and a CQL engine. By way of example only, a BI analytics server may delegate continuous queries to the CQ Service and the CQ Service may also act as a logical database (DB) gateway for a CQL engine. In this way, the CQL engine may be able to leverage the BI analytics server for its analytics capabilities and semantic modeling.

In some examples, the CQ Service may provide, among other things, the following functionalities:
  Remoting service for BI Analytics Server as CQL engine Gateway;
  Event source/sink adapter;
  Generate data definition languages (DDLs) from logical SQL plus CQL extensions;
  Provide unified model for all types of continuous queries and implementation selections;
  Maintain metadata and support restartability; and
  High availability and scalability support.

Additionally, in some examples, OI is a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns.

In some examples, a business event analysis and monitoring (BEAM) system may include a CQL engine to process and/or receive in-flight data. For example, a CQL engine may be an in-memory real-time event processing engine configured to query or otherwise process incoming real-time information (e.g., BI or OI). The CQL engine may utilize or understand temporal semantics and be configured to allow definition of a window of data to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation; that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2)>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content that be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), wherein each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

In some aspects, as part of Business Activity Monitoring (BAM), a user interface such as a dashboard may be utilized to display incoming real-time events related to an application. However, oftentimes when a user logs into the system, the user may expect to see some meaningful data related to the application while real-time data related to the application is being processed. Instead of displaying a blank screen to the user as soon as the user logs into the system, in one embodiment, the user may be provided with a 'snapshot' output of events related to the application prior to the delivery of incoming real-time data related to the application. In one example, the 'snapshot output' of events related to the application may be produced based on historical data related to the application by mapping the current state of the Data Object to the archived relation and/or archived stream.

In one example, the 'snapshot' output of events may be produced by initializing the 'state' of operators in a query plan of a query based on the historical data related to the application. In other words, the 'state' of an operator is initialized to a state in which the operator would have been, had the records in the historical data arrived as normal streaming records one after the other. In order to achieve this, in one embodiment, a state initialization process is disclosed to perform state initialization of operators in a query plan when a continuous query is received and identified that is based on an archived relation and/or an archived stream. In one example, the state initialization process may be implemented based on a state initialization algorithm that performs state initialization of operators in a query plan, as discussed in detail below.

In one embodiment of the present disclosure, a continuous query (e.g., a CQL query) that is based on an archived relation or an archived stream is initially identified or received. The continuous query is processed to generate a physical query plan for the query. Query operators are then identified in the physical query plan that need to initialize their 'state' in order to create a snapshot output of data values related to the application for the user. Archiver queries are then constructed for the identified query operators. The identified query operators query the backing store and initialize their 'state' based on the results of querying. Since, the initial 'state' of the query reflects the current 'state' of the data currently in the Data Object backing store, the returned results may be utilized to initialize the 'state' of the operators and generate a snapshot output of values related to the application for the user. From then on, real-time events related to the application may be processed as they arrive and are displayed to the user on the dashboard.

As described herein, in one example, the 'state' of an operator in a physical query plan may signify data values or information that internal data-structures of an operator (i.e., a physical operator) in the physical query plan of a continuous query may maintain as events related to the application are being processed. For example, consider a continuous query wherein the 'sum(c1) group by c2' is computed. The 'state' of the 'GroupAggr' operator performing the processing in this case, is the 'sum(c1)' values for each distinct 'c2' value. So, pairs <sum(c1), c2> exist for every distinct value of c2 thus observed. In other words, the 'state' of the 'GroupAggr' operator summarizes the input events that have been seen so far in the application.

Any subsequent input event, (whether, plus, minus or update) may then be processed by applying the correct operation on sum(c1) value for the pair whose c2 value is same as the c2 value in the current input event. It may be observed that the information that constitutes the 'state' may vary from operator to operator. For example, for a 'distinct' operator, the 'state' may include all the distinct values seen so far along with the 'count' associated with each such value indicating the number of times that this particular value has appeared so far. It is to be appreciated that although the physical operator is utilized to construct the query responsible for fetching back 'state' information, an execution operator corresponding to the physical operator may maintain the data-structures and utilize the information returned by archiver query execution to initialize the data-structures of the operator.

As described herein, in one example, an 'archiver query' is specific to a physical operator and may represent the SQL statement which when executed against the backing store fetches the information necessary to initialize the operator's 'state' based on the history data. In one embodiment, the 'archiver query' may be executed against the Data Object (DO) backing store, which in case of BAM may be either an Oracle Database or an Oracle Business Intelligence (BI) server. Thus, the archiver query may either be an Oracle SQL query or BI Logical SQL query. In some examples, the CEP Engine may include a configuration parameter, TARGET_SQL_TYPE with possible values, {ORACLE, BI} which may determine whether the generated archiver query may be an Oracle SQL query or BI Logical SQL query respectively.

As described herein, in one example, a 'query operator' refers to a physical operator in the query plan which is designated to query the archiver. In one embodiment, more than one 'query operator' may be identified in a single continuous query.

As described herein, in one example, a 'physical query plan' for a continuous query refers to a Directed Acyclic Graph (DAG) of physical query operators which may be generated at query start time (for example, when a DDL such as "alter query <queryname> start" is executed). Typically, a trivial query plan may be initially generated based on the clauses used in the continuous query. Then, the query plan may be optimized by applying certain transformations. In one embodiment, the optimized query plan thus generated may be referred to as a 'local' optimized query plan. The 'local' optimized query plan may include operators local to the query being processed. In some examples, in a subsequent step, the 'local' optimized query plan may then be combined with a 'global' query plan. This step may be referred to herein as 'operator sharing', in which operators in the 'local' query plan which are same type as the operators in already existing queries are identified and if possible shared. It may be appreciated that the process of 'operator sharing' may reduce the memory footprint while processing CQL queries.

In some embodiments, the 'global' query plan may represent the combined query plan of all the continuous queries started so far on the CEP engine. In one embodiment, the 'global' query plan may be managed by an entity referred to herein as a 'plan manager' module in the CEP engine. The CEP engine may also include other entities which manage metadata for queries for source objects (such as relations and streams) and views such as a 'query manager' module, a 'table manager' module and a 'view manager' module, in other embodiments.

As described herein, in one example, a 'connector operator' refers to an operator in which the physical (local) query plan of the query being executed gets connected to the 'global' query plan of existing queries that have already started. In one example, 'connector operator(s)' may be identified during 'operator sharing' as discussed above so that an appropriate 'snapshotId' can be set in the input queue for these operators. In some examples, every snapshot (querying of the backing store) is associated with a snapshotId and input queue of connector operator is associated with that snapshotId so as to avoid double-counting.

In many instances, there may be more than one query that is concurrently executing in the CQL engine. In one example, each such query may be identified by a 'local' query plan that may include one or more physical operators that are generated when the query is started. From a memory consumption point of view, it may be desirable to share operators across the local query plans of these operators that are common to all these queries to generate a combined query plan. In one embodiment, the combined query plan thus generated may be referred to as the 'global' query plan. In one embodiment, one or more operators that may be shared may be identified each time a new query is started.

In some aspects of the present disclosure, operator sharing may be performed by an operator sharing algorithm in the CQL Engine that identifies operators that may be shared across the local query plans of all queries that are currently executing in the system. In some examples, the processing performed by the operator sharing algorithm may include identifying an operator in the 'global' query plan to be an 'equivalent' of an operator in the local query plan and adding all the outputs of the identified operator in the local query plan to be the outputs of the 'equivalent' operator in the 'global' query plan. In some examples, the processing may then involve removing the operator from the local query plan. In this manner, two or more local query plans may be combined into a 'global' query plan.

In certain situations, it may be desirable for a user to execute queries that are based on a join of multiple physical Data Objects. In some aspects of the present disclosure, two or more physical Data Objects may be joined to generate a logical Data Object. As discussed above, an archived relation and/or an archived stream typically maps to a Physical Data Object on the backing store. In one embodiment, an archived view may be defined as the equivalent construct that maps to a logical Data Object. In some examples, when a logical Data Object is created in BAM, a corresponding archived view may be created in the CQL engine. In one example, an archived view may be defined as a join query between two or more archived relations with or without filters (e.g., WHERE clauses) defined on them.

A number of queries may be executed over a single logical Data Object or a set of pre-defined logical Data Objects. In one example, queries defined on top of a logical Data Object translate into CQL queries defined over an archived view. In one embodiment, an archived view is created when a CQL query is received and started that identifies the archived view. Accordingly, state initialization for operators in an archived view may typically be performed when the first query on top of the archived view is started. In one embodiment, the top-most operator in an archived view may be referred to as the 'view root'. In some examples, the 'view root' operator may be identified as a 'join' operator in a join query that defines the archived view.

In one embodiment, the operators in the archived view's definition query may be included in the query plan of a query defined on top of an archived view while performing state initialization of operators in the query plan. In one aspect of the present disclosure, the 'query' operator identification process may be performed for those operators in the query plan that topologically precede the 'view root' operator. In some examples, when a first query over archived view is started, two state initializations may occur: 1) state initialization of the view query (typically a join query); and/or 2) state initialization of the query over view. Subsequent queries may not need to perform state initialization of the view as it may already be performed (e.g., as described above). During state initialization of the query over view, the system may not go below the 'view root' operator when attempting to find a 'query' operator.

Additionally, in some aspects of the present disclosure, archiver queries may be constructed for operators that topologically precede the 'view root' operator. Since state initialization may typically be performed for queries defined on top of an archived view, it is generally desirable that a valid SQL expression be generated for the 'view root' operator. Since the operators that may occur below the 'view root' operator may include, for example, operators such as 'Join', 'JoinProject', 'Select', 'Project', 'Filter' and 'Relation Source', and these operators may typically construct their archiver queries, in one aspect, a sub-query based approach may be utilized to construct archiver queries for operators on top of the 'view root' operator. In one example, the sub-query based approach may include identifying an operator 'B' which may be downstream to an operator 'A', wherein operator 'B' treats operator 'A's' archiver query as a sub-query and constructs its query on top of operator 'A' by putting operator 'A's' archiver query (enclosed in brackets) in the FROM clause and uniquely aliasing it.

In some aspects, operators in a query plan of a query defined by an archived view may be shared across the local query plans of all queries that are currently executing in the system. In some aspects of the present disclosure, and as will be discussed in detail below, the process of state initialization of operators in a query plan and the process of operator sharing may be adapted in various ways to perform processing of queries over archived views.

The techniques described above and below may be implemented in a number of ways and in a number of contexts. Several example implementations and contexts are provided with reference to the following figures, as described below in more detail. However, the following implementations and contexts are but a few of many.

FIG. 1 depicts a simplified example system or architecture 100 in which techniques for processing continuous queries with archived views may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of continuous queries that identify archived relations and/or archived streams, the initialization of a state of one or more query operators identified in a query plan for the continuous query and the generation of a snapshot output of data values related to an application based on the state of the identified query operators, described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the service provider computers 106 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least an archived relation module 148, an archived view module 149, a state initialization module 150 and a snapshot output module 152. As used herein, modules may refer to programming modules executed by servers or clusters of servers that are part of a service. In this particular context, the modules may be executed by the servers or clusters of servers that are part of the service provider computers 106.

In some examples, the archived relation module 148 may be configured to, receive, identify, generate, or otherwise provide one or more archived relations 154 that may include reference to one or more event stream entries s1, s2, . . . , sN. For example, an archived relation may be defined by applying a window on the stream including these entries (i.e., s1 through sN). As such, the archived relation may be the bounded dataset including these entries. However, the entries may be non-empty upon generation including, but not limited to, having one or more of the entries (e.g., s1 and/or s2, more entries, or less) of the relation pre-loaded from Persistence or some other database of historical data. As such, these pre-loaded entries may include the historical data, and the remainder of the relation may include incoming streaming data. In some examples, the archived relation 154 may first be identified as {s3, s4}. However, when the window moves from w1 to w2, the archived relation 154 may be identified as {s4, s5} and may have been changed by a delete of s3 and/or an insert of s5.

As noted above, an archived relation 154 may be a CQL relation that is (possibly) non-empty at the "instant" of its creation. This is in contrast with "normal" CQL relations which have empty contents at the "instant" when they are created. In some examples, it is imagined as if the contents of the archived relation 154 as of the instant of its creation existed from the "beginning of time" (Long.MIN_VALUE). In the BEAM context, it is useful to note that the objects (in some examples, all the objects) of a CQL engine may be created every time on server startup. In some respects, an archived relation 154 may be similar to a "normal" CQL internal relation. In particular, operations (Relation-to-Relation operations like JOIN, GROUP AGGR, ORDER BY TOP N as well as Relation-to-Stream operations like I/D/RSTREAM) may retain the same semantics as they have over "normal" CQL internal relations. Additionally, in some examples, an "archiver" may be a Java class that implements a specific contract with the CQL engine. It may implement the IArchiver interface or some other interface capable of enabling an archiver. This "archiver" along with the identity of the logical entity managed by the "archiver" that corresponds to the archived relation 154 (for example, the name of the Data Object) may be specified as part of the DDL statement used to create the archived relation 154.

In some aspects, the archiver may be implemented based at least in part on a contract with the CQL engine to at least provide the contents of an archived relation 154 at the time of its creation. Additionally, the archiver may be expected to maintain the "time-varying" contents of the archived relation 154 on its own (e.g., external to the CQL engine). However, in some examples, the archiver may be stateless. In this example, the archiver may implement a method (e.g., "execute( )") that executes the query handed to it by the archived relation framework. The archiver may then give the contents back to the archived relation framework once the method is executed. The archiver may also be configured to provide querying capabilities on the archived relation 154 (e.g., expressed as an SQL-99 query). Additionally, in some examples, FROM clause item(s) in the query presented to the "archiver" may be the name of the "archiver" entity and/or the name of the DataObject (e.g., maintained on the durable store). When the FROM clause items are the DataObject names, they may be mapped to the archived relation in the creation DDL. Additionally, or alternatively, the archiver name may be used to lookup the archiver instance (there could be more than one archiver) and then call execute (query) on that archiver instance. The attribute names used in the query may be the column names specified in a CREATE ARCHIVED RELATION DDL or other appropriate DDL, as desired. While executing a query, the "archiver" may run the query on a snapshot of the Data Object(s) that contains committed changes as of txn T_n where T_n is not earlier than the latest transaction for which events for the Data Object have been presented as streaming input. In particular, there may have been no streaming Data Object events that have been provided as input corresponding to "later" transactions.

Further, the "archiver" may return the ID of the transaction as of which this query was executed. This ID may be a monotonically increasing number (not necessarily contiguous) such that later transactions have larger IDs as compared to earlier transactions. For UPDATE events, the "archiver" may provide as part of the streaming event, the OLD as well as the NEW values. Additionally, or alternatively, in some examples, a persistence service may send the change notifications with both OLD and NEW values to the CQ Service. In this way, the CQ Service may be able to perform the appropriate operations on the archived relations. For DELETE events, the "archiver" may provide the DELETE event as a streaming event if (in some examples, "if and only if") it passes validation (i.e., it matches with an existing Data Object record). In some examples, the functionality of the archiver may enable a scenario where there are no Data Object events that the query does not process. The CQL engine may also enable a scenario where no duplicate events are processed by skipping the processing of all Data Object events with transaction identifiers <=the transaction identifier returned by the "archiver" as part of executing a "Snapshot" query. In some examples, the archiver may be comparable to a Persistence Service. Alternatively, or in addition, snapshot information at the querying instant may also be derived from the transaction context table. This snapshot information may be maintained in the CQL Engine and a snapshotID (increasing identifier) may be associated with it. The same may be set in the input queues of some selected operators in that query's plan. These are called 'connector' operators and they may represent the place at which a local query plan may join the global (overall) query plan. When an event arrives in CQL Engine, a snapshotID may be computed for that event using the context ID and transaction ID values in it. The snapshotID may be computed using the snapshot information maintained in CQL Engine. The snapshotID of the event may then be compared with the snapshotID of the input queue. If the ID in the event >ID in the queue then it may be processed otherwise it may have already been accounted for before and may therefore ignored to avoid double-counting.

The introduction of the archived relation 154 as a native CQL concept enables the CQL engine to determine the optimal amount of data to be fetched in order to initialize the state of the operators for a query defined over the archived relation 154. In some examples, as the final step of query compilation, following the query plan generation (and/or merging with the global plan) a state initialization phase may be introduced to determine an optimal set of queries to be run against the "archiver" (e.g., for the purposes of operator state initialization). In some cases, a state initialization algorithm that is used to determine a set of queries (e.g., an optimal set) may defer materialization of state up the operator chain until a stateful operator is encountered (which aggregates data and hence may retrieve less data as compared to materialization of all details/facts in memory). The first step in query execution, even before the state initialization queries are run, may be the execution of a snapshot query and/or the delivery of the results to the client. In some examples, the snapshot query (also referred to as the "archiver query") may be part of the state initialization where the operators may be initialized with the contents of the results. These results may then be propagated to downstream operators (e.g., all downstream operators), thus outputting the result. The queries determined by the state initialization algorithm may then be run next. At the end of this first step, all the operators may have their state appropriately initialized and the query may be ready to process the streaming events.

When a CQL query refers an archived relation 154, during system restart, the CQL engine may be configured to enable a scenario where the states of execution operators in the query are initialized to the values that they had prior to a shutdown. Alternatively, or in addition, each time a query is (re)started, whether as part of shutdown or voluntarily, the query may issue a fresh or new archiver query to initialize state again. In some examples, this may be different at time t0+delta than it was at t0. In some cases, the state initialization algorithm may be configured to handle this functionality. In some examples, each (or every) archived relation 154 may map to an archiver object that keeps track of the events forming the relation and may be able to answer the SQL queries (similar to a database table) issued to it. Additionally, initializing the state of an execution operator in a CQL query may be a two-step process, including at least: issuing an appropriate SQL query to the archiver that maps to the archived relation 154 on which the CQL query depends; and use the returned results to initialize the state of the operator. Deferring materialization of the events (obtained from the archiver) may result in lesser memory and/or processing time consumption. Additionally, or in the alternative, memory savings may be due to finding the appropriate operators that minimize the memory. For example, aggregated/summarized data may be brought into memory, resulting in significant memory savings.

In some examples, the state initialization process (which may be one step in the overall process, and may be implemented when a CQL query is started and is referring an archived relation(s)) may include: obtaining a logical plan for the query using the metadata object, constructing a physical plan form the logical plan, optimizing the local physical plan using an optimizer, sharing operators to get a global physical plan, adding auxiliary structures (e.g., synopsis, store, queue, etc.), and instantiating the query (e.g., constructing execution operators and/or supporting execution structures). Additionally, the appropriate location from where to call the state initialization algorithm may be right after the local physical plan optimization. In some examples, the state initialization algorithm may only be called when the query depends on or more archived relations 154.

In some examples, given binary operators, children operators may be marked as query operators. Also if after traversing the entire query plan, no query operator is identified, the root may be marked as the query operator. Once the operators are identified as query operators, during the instantiation phase if the isQueryOperator flag is set then a method to execute the constructed archiver query would be called from the Operator Factory code. The returned result set may then be converted into a set of tuples and the list may be set in the execution operator instance. In this way, upon instantiation execution operators that need a state may have a list of tuples that may be sufficient for initializing its state. Upon instantiation, one more passes may be made over the query plan in topological order in which a method that would use these tuples to initialize state and propagate it downstream may be called. This method may be operator-specific and/or the initialization processing may be similar to populating synopsis, maintaining internal data-structures, and so on.

In some examples, the following CQL query on top of a "sales" archived relation 154 may be implemented:

```
SELECT SUM(sales), productid
FROM sales
WHERE region = "APAC"
GROUP BY productid
```

In some examples, the query plan when compiled in the CQL engine 156 may described as:

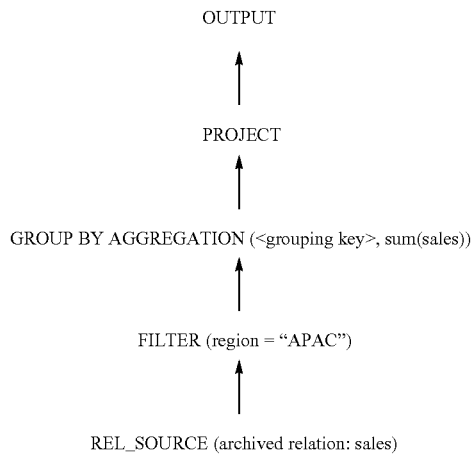

In some examples, when the CQL engine compiles the aforementioned query, it may determine that the query is expressed against a relation (e.g., the archived relation 154) whose state at startup is available externally and could potentially be large. There may be a set of operators in CQL that are stateful (e.g., GROUP BY, PATTERN) while others (e.g., FILTER, PROJECT, OUTPUT) may not be stateful. The state initialization algorithm may work as follows for the scenario in consideration: a REL_SOURCE operator may skip calling the archiver since it is stateless for archived relations. Next up is FILTER, which may also be stateless so it may skip calling the archiver for state too. Next, the GROUP BY operator may encountered, and it may invoke the archiver to fill up its state using the following SQL query (as desired, the archiver query may be a SQL query formed by using a sub-query based approach and may be more complicated than the following):

```
SELECT SUM(sales), COUNT(*), productid
FROM SALES_DO
WHERE region="APAC"
GROUP BY productid
```

Note that even though the user's query may not include the COUNT aggregate, the GROUP BY may issue a SQL query that has a COUNT aggregate. This may be because this piece of information may be requested by the GROUP BY operator (as part of its state) to determine whether a group (corresponding to a "productid" in this example) becomes empty so that it can release any resources (like memory) that it might be using related to the group.

Now, considering the situation where a -ve tuple arrives. In the above scenario REL_SOURCE may not maintain any state so it may let the next operator in the chain decide (rather than throw an exception as it might for a "regular" CQL relation). The FILTER operator also may not maintain any state, and it may do the same. Next, the GROUP BY operator may see the tuple. Since its state has been initialized it may be able to successfully locate the corresponding group and proceed with the rest of the processing. For example, if it is a tuple with region="APAC" and productid="Mobile Phones," the SUM aggregation function may reduce the running total for "Mobile Phones" by the amount present in the tuple.

In some examples, the following CQL query on top of a "sales" archived relation 154 may be implemented for determining the median as opposed to sum, in the above example:

```
SELECT MEDIAN(sales), productid
FROM sales
WHERE region = "APAC"
GROUP BY productid
```

In some examples, the query plan when compiled in the CQL engine may described as:

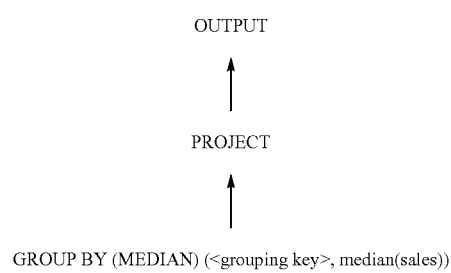

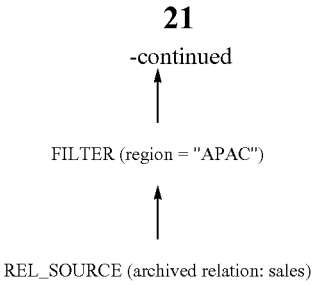

In some examples, the state initialization algorithm works as follows for the scenario in consideration. The REL_SOURCE operator may skip calling the archiver since it may be stateless for archived relations. Next up is FILTER, which may also be stateless so it may skip calling the archiver for state too. Next, the GROUP BY operator may be encountered. This operator may be stateful and thus may request state initialization. Here the query involves at least one holistic function (MEDIAN), so it is may not be sufficient to bring aggregated/summary state from the database. The entire set of values over which the MEDIAN is to be calculated may be requested for the GROUP BY state.

Thus, at this stage, having identified the lowest stateful operator and determined that more detail may be requested to make up its state, the operator plan may be traversed in the opposite direction (i.e., "down"). That is, the plan may be traversed from the top down from this stage on. In some examples, the responsibility to construct the state will fall on the next operator down the tree, which in this case may be FILTER and it may issue the following SQL query (to the "archiver") that may bring the requested set of values into memory:

```
SELECT sales, productid
FROM SALES_DO
WHERE region = "APAC"
```

In some examples, once these tuples are retrieved, the FILTER may propagate these values upstream and the GROUP BY may build its state by constructing a tree or graph (e.g., but not limited to, an Augmented Red-Black tree or the like). This data structure may enable very fast subsequent (O (log n) time) incremental MEDIAN calculation. In some examples, if the FILTER were absent in the above query, the responsibility to construct state may have fallen on the REL_SOURCE operator and the entire contents of the relation (as an optimization, only the relevant fields accessed by the query would be retrieved for each row as opposed to the entire row. Of course, if all fields are accessed, the entire row would be fetched) may have been brought into memory.

In some aspects, for handling minus events reaching a query based on an archived relation 154, additional support may be useful. Some of the CQL Engine operators like Project, Binary operator like join maintain a lineage synopsis. The lookup in this lineage synopsis is based on a TupleId. When a PLUS tuple comes it may be inserted into the synopsis. When a MINUS tuple comes to that operator we look up the lineage synopsis which happens on the tupleId. The problem that can come in the context of an archived relation 154 is as follows:

1. When the query starts, an operator which maintains a lineage synopsis may be identified as the query operator and it may query the archiver and convert the returned results into tuples and puts them in a lineage synopsis.
2. Additionally, when the query starts to run, the first tuple it receives may be a MINUS corresponding to one of the archived plus tuple. Here, the ID of the PLUS and MINUS tuple may not match and this will lead to a failed lookup and incorrect results.
3. In the normal relation case, a relation source may help ensure that PLUS and MINUS tuples have the same IDs since it may maintain a synopsis, but for the archived case it may not be possible.

As such, a BEAM Persistence layer may assign an event ID to each event and INSERT (PLUS), DELETE (MINUS), and UPDATE notifications of an event may all have the same value of this ID. This facility may be utilized to avoid the problem mentioned above. Thus, one more clause may be added to the archived relation 154 DDL to specify an EVENT IDENTIFIER clause. This may be a column of type CQL bigint and this column may have the same value for plus, minus, and update tuples for an event In some cases, within the CQL Engine, the column specified in the EVENT IDENTIFIER clause may be utilized. For example, when the archiver is queried, this field is may be forced to be present in the SELECT list and use the values of this field to set the tupleId while converting the records into tuples. Also when a normal input event comes (e.g., when the query is running) the value in this field may be assigned as the tupleId while converting the TupleValue into ITuple in the Relation Source code. This may enable a configuration for ensuring that PLUS and MINUS of an event have the same tuple ID.

In some examples, the following syntax may be utilized for an archived relation DDL:

```
CREATE ARCHIVED RELATION
SalesDataObjectChannel (region char(8), productid int, sales float,
eventid bigint)
ARCHIVER com.oracle.beam.PersistenceServiceArchiverImpl ENTITY
"SALES_DO"
EVENT IDENTIFIER eventid
```

This DDL to create the Archived Relation may be invisible to the end users and also other components and may be created by the CQService. However, in some cases, the creation of the archived relation may be handled "under the covers" by the CQL processor code when the EPN contains the Data Object node connected to a CQL processor node. For example, consider the following EPN:

(SalesDataObjectNode for SALES_DO)→(SalesDataObjectChannel)→(CQL Processor)

This EPN code may use the field names of the Data Object as the column names of the archived relation that it creates in the CQL engine thereby ensuring that the names of the fields and the order of the fields match.

Additionally, in some examples, archived streams may be enabled via the CQL engine and/or other engines. Conceptually, an archived stream may be very similar to the Archived Relations feature. But owing to the semantic difference between a stream and a relation, certain changes may be made to the design and syntax of the archived stream as compared to the archived relation feature. For example, relation contents may undergo changes when additions, updates, or deletions occur. As such, the contents can grow or shrink in size with time. However, for a stream, by definition, updates and deletions are not possible. So the stream size may only keep increasing. Thus, the size of the past contents of a stream may be prohibitively large and most of the times a user would be interested in only a subset of the immediate past maintained by the archiver.

As such, the following syntax may be utilized for an archived stream DDL:

```
CREATE ARCHIVED STREAM <stream_name> ( stream schema )
ARCHIVER <archiver_name> ENTITY "<entity_name>"
TIMESTAMP COLUMN <timestamp_col_name>
REPLAY LAST ( <time_spec> | <intToken> ROWS)
[IS SYSTEM TIMESTAMPED]
```

Here, the ARCHIVER and ENTITY clause may have the same meaning as with the archived relation 154. However, the EVENT IDENTIFIER clause may not needed since it is generally only for handling MINUS events which cannot come as input for a stream. Additionally, the REPLAY LAST clause may allow a user to specify the part of the immediate past that is of interest. The user can specify it either as a time range or in terms of number of rows. So, for example, the REPLAY clause can be REPLAY LAST 30 MINUTES (in which case the records that have arrived in the past 30 minutes may be fetched from the archiver) or REPLAY LAST 50 ROWS (in which case latest 50 records ordered by arrival time may be fetched from the archiver).

The TIMESTAMP COLUMN clause may be utilized for identification of records that may be returned while querying the archiver. This may be used in the WHERE clause of the archiver query that determines the records that are part of the result set of the archiver query. The values in this column may also be utilized while assigning the timestamp to the tuples (which may be obtained by querying the archiver) inside the CQL Engine. This column name could be the name of the column in the DO that has the creation timestamps assigned by BEAM persistence.

Returning to the discussion of FIG. 1, in some examples, the archived view module 149 may be configured to, receive, identify, generate, or otherwise provide one or more archived view(s) 155 that may include reference to one or more archived relations 154. In one example, an archived view 155 may be created by executing the following DDL in the CQL engine/CQ Service:

```
CREATE  ARCHIVED  VIEW  <VIEW-NAME>
(SCHEMA)
<QUERY_DEFINING_VIEW> EVENT IDENTIFIER
<COLUMN-NAME>
```

As per the above example, the 'schema' for the archived view may be defined as a comma separated list that includes the name and type of each of the attributes of the archived view. The 'query-defining-view' may be a CQL query that defines the archived view. In one example, the 'query-defining-view' of an archived view may be shared across all CQL queries defined on top of the archived view. In one example, the 'query-defining-view' may be defined as a 'Join' query that includes two or more archived relations with or without filters defined on them. In some examples, a 'Join' or a 'JoinProject' (for example, a 'Join' operator combined with a 'Project' operator) operator may be defined as the 'view root' operator of the archived view 155. The 'event identifier' clause uniquely identifies every event in the archived view wherein change notifications for insert, update or delete actions related to the same event may have the same value in this column.

In some examples, the 'Join' query may be defined as a join between a 'Fact' table and a 'Dimension' table. In one example, a 'Fact' table may be defined as a Data Object with a relatively large number of records, for which new records or events may occur frequently and a 'Dimension' table may be defined as a Data Object with a relatively smaller number of records, for which record changes or new record insertions may occur infrequently. In one example, the 'Dimension' table may generally be used for enrichment by looking up one or more attribute(s) of the 'Fact' table as a primary key in the 'Dimension' Data Object.

In some examples, an event identifier in the 'Fact' table may be specified as an event identifier column for the archived view since an event identifier column may typically not be maintained for a Logical Data Object. In order to satisfy the uniqueness criterion, in one example, a record on the 'Fact' side may join with at most one record on the 'Dimension' table. Additionally, by satisfying the uniqueness criterion, an event identifier on the 'Fact' side may not be repeated for all those events in the output of the 'Join' query that have the same 'Fact' record mapping to different 'Dimension' records.

In some aspects of the present disclosure, the event identifier column value may be set as a 'tupleId' in the output tuple of the 'Join' query if the join operator in the 'Join' query is the 'view root' operator. As discussed above, the event identifier column may be designated in the creation DDL. In one example, the value in the output tuple of the 'Join' query is extracted and set as the tupleId in the column position in the execution operator corresponding to the join operator. In some examples, the event identifier column may have the same values for insert and delete events so setting the event identifier column's value as a tupleId enables an operator with lineage synopsis to perform accurate lookups.

In some examples, the archived view module 149 may be configured to associate an 'isArchived' flag with an archived view to determine whether a query is dependent on an archived relation and/or archived source. Additional processing of queries that define archived views 155 may be performed by a view manager module in the CQL Engine/ CQ Service as discussed in detail in FIG. 2.

In some examples, the state initialization module 150 may be configured to receive, identify, generate, or otherwise provide a continuous query (e.g., a CQL query) from the CQL Engine I/CQ Service. In one embodiment, the state initialization module 150 may be configured to invoke a state initialization algorithm 156 in the CQL Engine/CQ Service. In some embodiments, the state initialization algorithm 156 may be configured to receive a continuous query. In one example, the continuous query may be identified based on an archived view 155.

In some examples, upon receiving a continuous query that defines an archived view, the state initialization algorithm 156 may perform state initialization of the query as follows. The state initialization algorithm 156 initially generates a physical query plan for the continuous query and identifies a 'view root' operator in the archived view. In one example, the 'view root' operator may be identified as the 'join' operator in the join query that defines the archived view. The state initialization algorithm 156 may then identify a 'query' operator in the query plan that topologically precedes the 'view root' operator and construct an archiver query for the identified query operator that topologically precedes the 'view root' operator. Additionally, the state initialization algorithm 156 may execute the archiver query to obtain a result set of data records related to the application and generate a snapshot output of one or more data values related to the application based at least in part on the result set of data records.

In some embodiments, the state initialization module 150 may also be configured to invoke an operator sharing algorithm 157. In some examples, the operator sharing algorithm 157 may include identifying operators that may be shared among queries that are currently executing in the system and generating of a combined query plan that includes these common operators. In one embodiment, the combined query plan thus generated may be referred to as the global query plan. In one aspect of the present disclosure, when one or more CQL queries are received that identify an archived view, the operator sharing algorithm 157 may include identifying operators that may be shared across all the CQL queries that are defined on top of the archived view that topologically precede the 'view-root' operator.

In some examples, the processing performed by the operator sharing algorithm 157 may also include identifying an operator in the global query plan to be an 'equivalent' of an operator in the local query plan and adding all the outputs of the identified operator in the local query plan to be the outputs of the 'equivalent' operator in the global query plan. In some examples, the processing may then involve removing the operator from the local query plan. In this manner, two or more local query plans may be combined into a global query plan.

In an alternate embodiment, the processing performed by the operator sharing algorithm 157 may include sharing an operator if all operators on the path from the source to the identified operator are already shared. In one example, the identification of operators that can be shared may be performed by executing a 'shareOperators( )' method in a plan manager module of the CQL engine as discussed in detail below.

In certain embodiments, the sharing of operators may also include 'relation propagation'. As described herein, 'relation propagation' may include propagating the existing state of an 'equivalent' operator in the global query plan to the newly added outputs (from the 'local' query plan). In one example, relation propagation may be performed when the operator in the 'global' plan maintains a data-structure referred to herein as 'synopsis' on its output by storing the output it produces.

Figure 2:
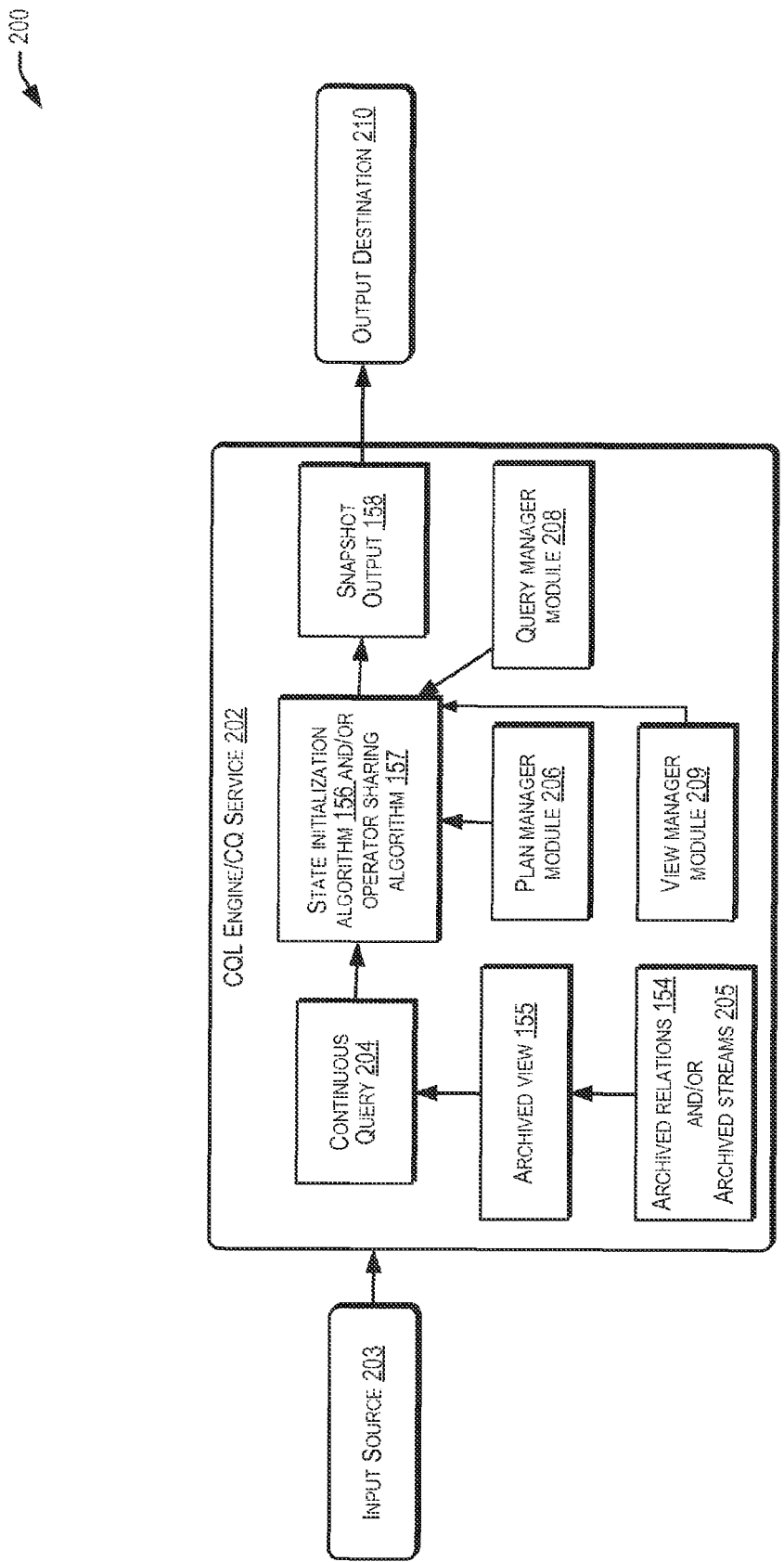
FIG. 2 illustrates a simplified block diagram with which features for the state initialization of operators and the sharing of operators in a continuous query based on an archived view may be described.

In one example, the state initialization algorithm 156 and/or the operator sharing algorithm 157 may be implemented using one or more modules in the CQL Engine/CQ Service as discussed in detail in FIG. 2. The operations performed by the state initialization module 150 are further discussed in detail in FIGS. 5-14 below.

In some examples, the snapshot output module 152 is configured to display a 'snapshot' output of the data values 158 related to the application to a user of the application via a display device in the service provider computers 106 and/or user devices 104.

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

FIG. 2 illustrates a simplified block diagram 200 with which features for the state initialization of operators and the sharing of operators in a continuous query based on an archived view may be described. As shown, FIG. 2 describes at least one implementation of a CQL Engine and/or CQ Service 202 for the management of continuous queries that identify archived views. The CQL Engine and/or CQ Service 202 may initially receive information from an input source 203. In one example, the input source 203 may include the data source computers 110 that receive an incoming continuous input data stream that includes a stream of data or events related to the application. In one example, the CQL Engine and/or CQ Service 202 may then identify an archived relation 154 and/or an archived stream 205, which may be a representation of data from the input source 203. In a certain embodiment, when a query (e.g., a continuous query) 204 is identified or received that includes an archived relation 154 and/or archived stream 205, the CQL Engine and/or CQ Service 202 may generate an archived view 155 that references one or more archived relations 154. Additionally, the CQL Engine and/or CQ Service 202 may invoke the state initialization algorithm 156 and/or the operator sharing algorithm 157 discussed above. In one example, the state initialization algorithm 156 and/or the operator sharing algorithm 157 may be implemented by one or more modules such as a plan manager module 206, a query manager module 208 and a view manager module 209 in the CQL Engine/CQ Service 202.

In certain embodiments, the plan manager module 206 may be configured to invoke one or more methods to initialize a 'state' of one or more query operators identified in a physical query plan for a continuous query defined over an archived view 155 and generate a 'snapshot' output of one or more data values 158 related to the application based at least in part on the 'state' of the identified query operators. The 'snapshot' output of data values 158 may be displayed in an output destination 210, such as for example, via one or more display devices in the service provider computers 106 and/or user devices 104.

In certain examples, the plan manager module 206 may be configured to invoke one or more methods to identify operators that may be shared across all CQL queries that are defined on top of an archived view that are above the 'view-root' operator and generate a combined query plan that includes these operators. In one embodiment, the combined query plan thus generated may be referred to as the 'global' query plan.

In certain embodiments, the query manager module 208 may be configured to invoke one or more methods for instantiating a query plan for a continuous query which may involve generating a physical query plan for the continuous query defined over an archived view, identifying one or more query operators in the physical query plan that topologically precede the 'view root' operator, constructing one or more archiver queries for the identified query operators, executing the archiver queries to generate a result set of data records related to the application and using the result set to initialize the 'state' of the operators in the query.

In some examples, the query manager module 208 may also be configured to invoke one or more methods to identify locations in the query plan where one or more 'buffer' operators may be added, create the 'buffer' operators and identify one or more 'query' operators based at least in part on the identification of the one or more 'buffer' operators.

In certain examples, the view manager module 209 may be configured to invoke one or more methods to perform processing related to queries that define archived views. In one example, an archived view's definition query may be started in the view manager module 209. In one example, the view manager module 209 may associate a field 'isView-Query' with the query's metadata when the query defines an archived view. The functionality provided by the methods in the plan manager module 206, the query manager module 208 and the view manager module 209 are discussed in detail below.

While the CQL Engine and/or CQ Service 202 shown in FIG. 2 illustrates a plan manager module 206, a query manager module 208 and a view manager module 209, it should be appreciated that alternative embodiments of the CQL Engine and/or CQ Service 202 may include additional modules than those illustrated in FIG. 2. For example, the CQL Engine and/or CQ Service 202 may include other entities which manage metadata for queries for source objects (such as relations and streams) such as, for example, a table manager module, in other embodiments.

Figure 3:
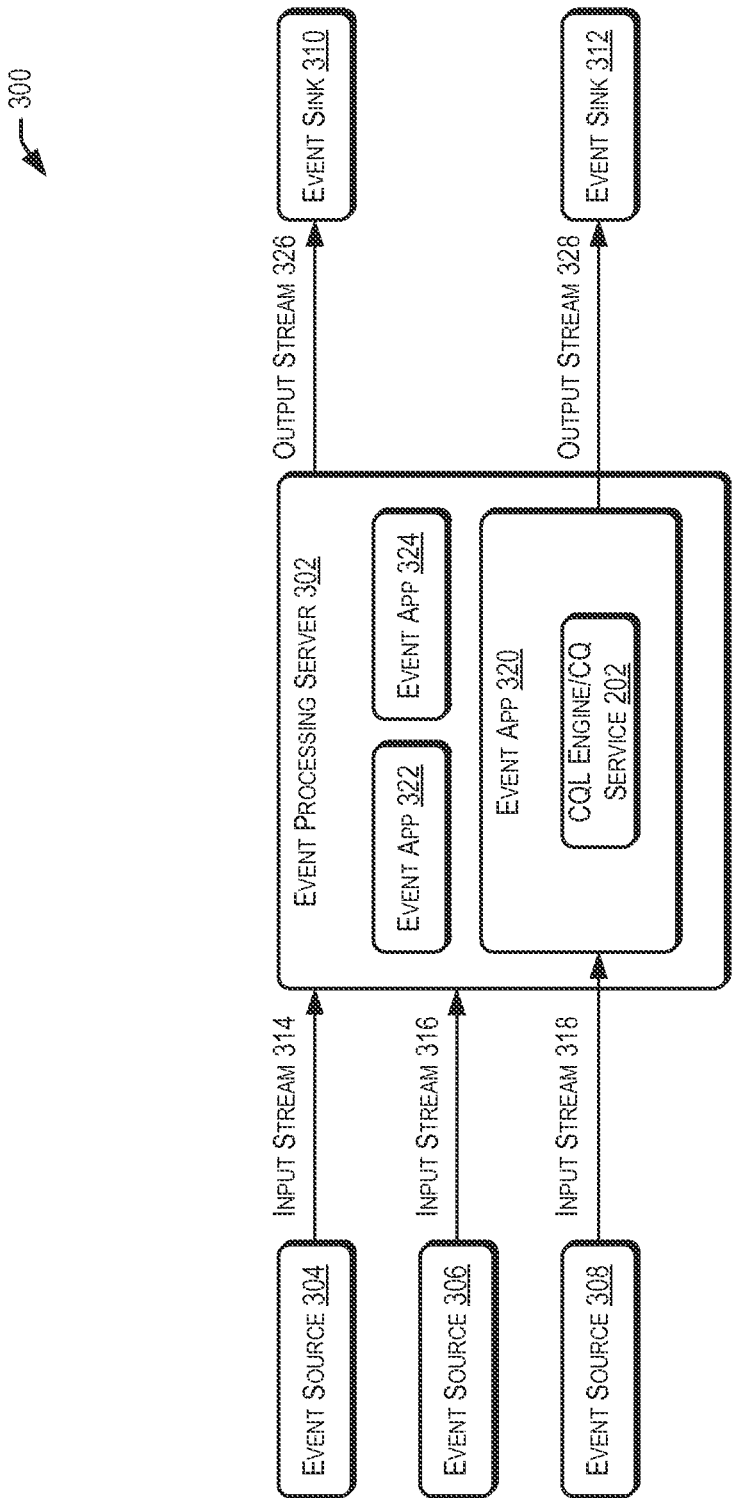
FIG. 3 depicts a simplified high level diagram of an event processing system that may incorporate an embodiment of the present disclosure.

FIG. 3 depicts a simplified high level diagram of an event processing system 300 that may incorporate an embodiment of the present disclosure. Event processing system 300 may comprise one or more event sources (304, 306, 308), an event processing server (EPS) 302 that is configured to provide an environment for processing event streams, and one or more event sinks (310, 312). The event sources generate event streams that are received by EPS 302. EPS 302 may receive one or more event streams from one or more event sources. For example, as shown in FIG. 3, EPS 302 receives an input event stream 314 from event source 304, a second input event stream 316 from event source 306, and a third event stream 318 from event source 308. One or more event processing applications (320, 322, and 324) may be deployed on and be executed by EPS 302. An event processing application executed by EPS 302 may be configured to listen to one or more input event streams, process the events received via the one or more event streams based upon processing logic that selects one or more events from the input event streams as notable events. The notable events may then be sent to one or more event sinks (310, 312) in the form of one or more output event streams. For example, in FIG. 3, EPS 302 outputs an output event stream 326 to event sink 310, and a second output event stream 328 to event sink 312. In certain embodiments, event sources, event processing applications, and event sinks are decoupled from each other such that one can add or remove any of these components without causing changes to the other components.

In one embodiment, EPS 302 may be implemented as a Java server comprising a lightweight Java application container, such as one based upon Equinox OSGi, with shared services. In some embodiments, EPS 302 may support ultra-high throughput and microsecond latency for processing events, for example, by using JRockit Real Time. EPS 302 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 3 provides a drilldown for one such event processing application 320. As shown in FIG. 3, event processing application 320 is configured to listen to input event stream 318, execute a query via the CQL engine/CQ service 202 comprising logic for selecting one or more notable events from input event stream 318, and output the selected notable events via output event stream 328 to event sink 312. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 320 in FIG. 3 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 302 without having to store all the received events data. Accordingly, EPS 302 provides a special querying mechanism that enables processing of events to be performed as the events are received by EPS 302 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 302 for a particular event stream may be executed each time that an event is received in that event stream. As part of the continuous query execution, EPS 302 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(3) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 300 depicted in FIG. 3 may have other components than those depicted in FIG. 3. Further, the embodiment shown in FIG. 3 is only one example of a system that may incorporate an embodiment of the present disclosure. In some other embodiments, system 300 may have more or fewer components than shown in FIG. 3, may combine two or more components, or may have a different configuration or arrangement of components. System 300 can be of various types including a personal computer, a portable device (e.g., a mobile telephone or device), a workstation, a network computer, a mainframe, a kiosk, a server, or any other data processing system. In some other embodiments, system 300 may be configured as a distributed system where one or more components of system 300 are distributed across one or more networks in the cloud.

The one or more of the components depicted in FIG. 3 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 4:
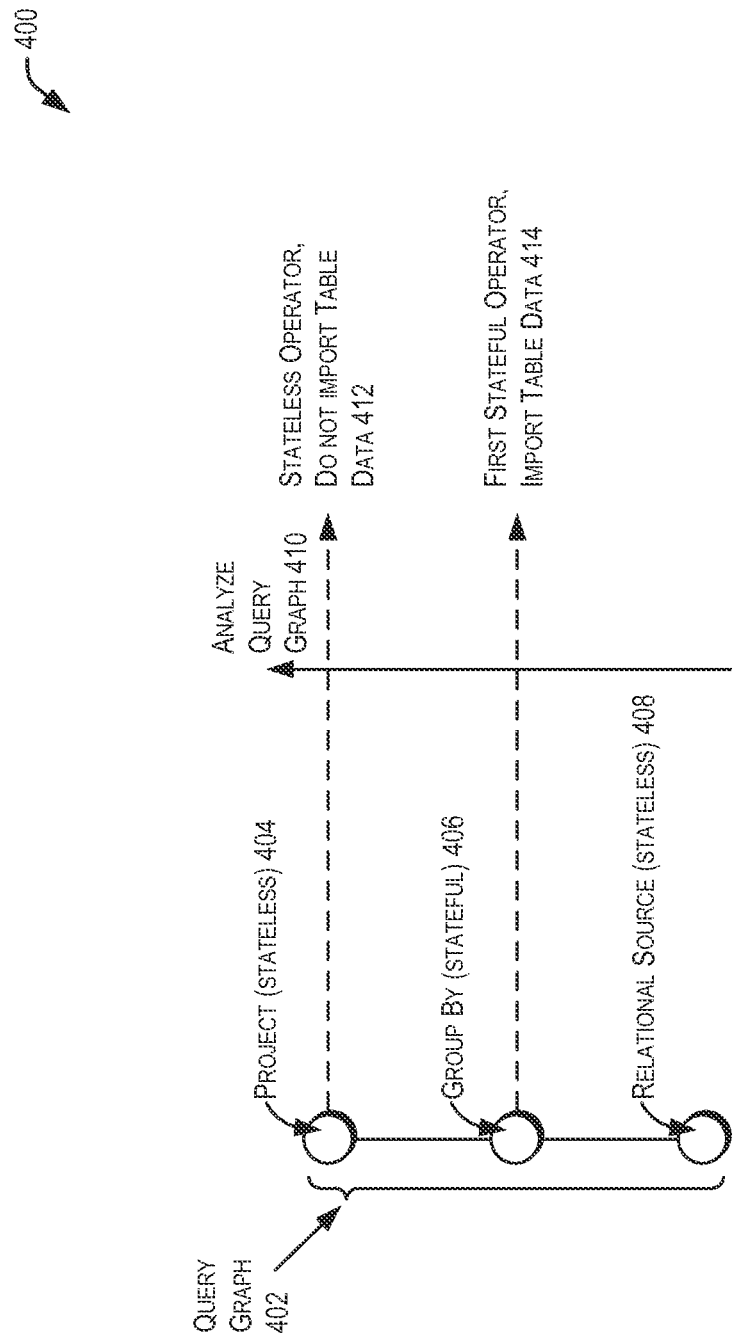
FIG. 4 illustrates a simplified block diagram with which features of the management of archived relations may be described.

FIG. 4 illustrates a simplified block diagram 400 with which features of the management of archived relations may be described. As shown in FIG. 4, an archived relation may be represented as a query graph 402. In some examples, a query graph 402 may include nodes that represent operators of the query and vertices that represent a path between the operators of the query graph 402. In one non-limiting example, the query graph 402 of FIG. 4 includes a Project operator 404, a Group By operator 406, and a Relational Source operator 408. Further, in some examples, the Project operator 404 and the Relational Source 408 may be stateless, while the Group By operator 406 may be stateful. In some cases, stateless operators do not keep track of, manage, or otherwise request state, while stateful operators do. As noted above, in some instances, the query graph 402 may be analyzed or otherwise evaluated 410 in a bottom up fashion (e.g., starting at the source operator 408), importing historical data at stateful operators (in some examples, at the first or lowest stateful operator). While analyzing 410 the query graph 402, a service and/or engine (e.g., the CQL engine and/or CQ Service 202 as described with reference to FIGS. 1-3) may be configured to determine the first stateful operator in the query graph 402. In the example of FIG. 4, the first stateful operator is Group By 406. As such, when the service reaches the Project operator 404 (which is stateless in this example), table data (i.e., historical data) may not be imported at 412. However, at 414, when the Group By operator 406 is reached, the historical, warehouse, and/or table data may be imported to initialize the archived relation.

Alternatively, or in addition, in some examples, the query graph 402 (also referred to as a plan) may be traversed in topological order starting from the source (here, the Relational Source operator 408). As such, in this example, the traversal may be in a bottom up fashion. In this traversing when the first stateful operator is reached, it may be marked as query operator and then the graph 402 may not need to be traversed further in that branch. Note that for some CQL queries like aggregate distinct, the query plan may have more than one branch. In the current example, Relational Source 408 may be stateless so the traversal may move up and see Group By 406. Since Group By 406 may be stateful it may be marked as the query operator. As such, the traversal may be complete, and may not need to go up to the Project operator 404 since Group By 406 would query the archiver, populate its state, and also propagate the snapshot output to Project 404, and further to downstream operators if any.

FIGS. 5-14 illustrate example flow diagrams showing respective processes 500, 600, 700, 800, 900, 1000, 1100, 1200, 1300 and 1400 for implementing the management of continuous queries that identify an archived view, the identification of operators that can be shared across multiple queries defined over an archived view, the initialization of a 'state' of one or more query operators identified in a query plan for a continuous query defined over an archived view and the generation of a snapshot output of data values related to an application based on the 'state' of the identified query operators, described herein. These processes 500, 600, 700, 800, 900, 1000, 1100, 1200, 1300 and 1400 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 5:
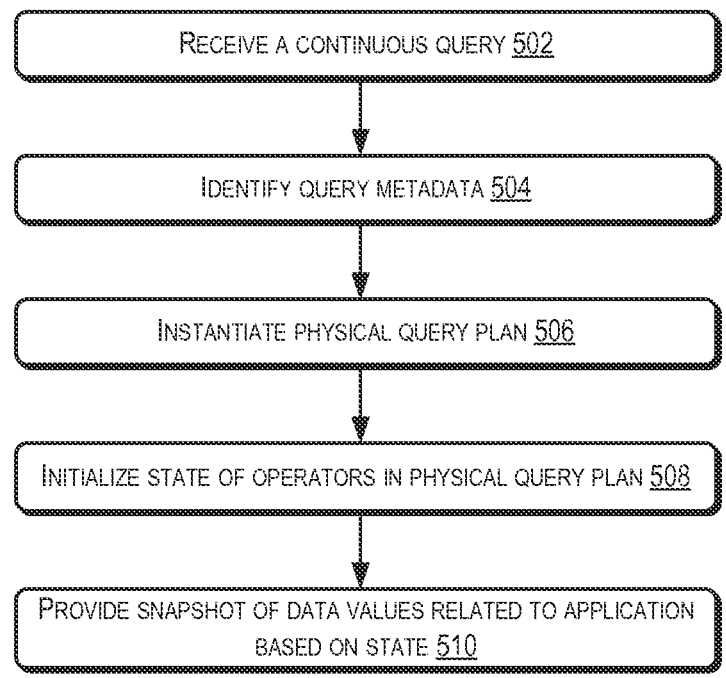
FIG. 5 is a high level flowchart depicting a state initialization process for processing a continuous query over an archived view, in accordance with one embodiment of the present disclosure.

FIG. 5 is a high level flowchart depicting a state initialization process for processing a continuous query over an archived view, in accordance with one embodiment of the present disclosure. In some examples, the one or more service provider computers 106 (e.g., utilizing at least the archived relation module 148, the archived view module 149, the state initialization module 150 or the snapshot output module 152) shown in at least FIG. 1 (and others) may perform the process 500 of FIG. 5. The process 500 may begin at 502 by including identifying and/or receiving a query (e.g., a continuous query).

At 504, the process 500 may include identifying the query's metadata based on the name of the query or the query identifier.

At 506, the process 500 may include starting the CQL query. In one example, the process starting a CQL query, may include generating a physical (or local) plan for the query that may include identifying operators in the physical query plan that are 'query' operators' and constructing archiver queries for the operators in the query plan.

In some examples starting a CQL query, may also include optimizing the physical query plan to share the physical query plan with a global query plan. Sharing the physical query plan with a global query plan may include identifying 'query' operators in the physical query plan that may connect to the global query plan. These operators may be referred to herein as 'connector' operators.

Additionally, the process of starting a CQL query, may include instantiating execution operators and their related constructs. In some examples, instantiating execution operators may include creating execution operators for corresponding physical 'query' operators identified in the physical query plan, creating connecting queues for the execution operators and creating their internal data-structures (referred to herein as 'synopses' and 'stores'). The process by which a CQL query may be started is discussed in detail in FIG. 6

At 508, the process 500 may include initializing the 'state' of the 'query' (e.g., execution) operators identified in the query plan at 506. In some examples, the process at 508 may include executing the archiver queries for the identified 'query' operators and using the results of the execution to initialize the 'state' of the 'query' operators. The process of initializing the 'state' of 'query' operators identified in the query plan is discussed in detail in FIG. 7.

At 510, the process 500 may include providing data values related to the application based at least in part on the 'state' of the one or more 'query' operators determined at 508. In some examples, the process at 510 may include generating a 'snapshot' output of the data values to a user of the application based on the 'state' of the one or more 'query' operators. The process of generating a 'snapshot' output of data values related to an application is discussed in detail in FIG. 8

Figure 6:
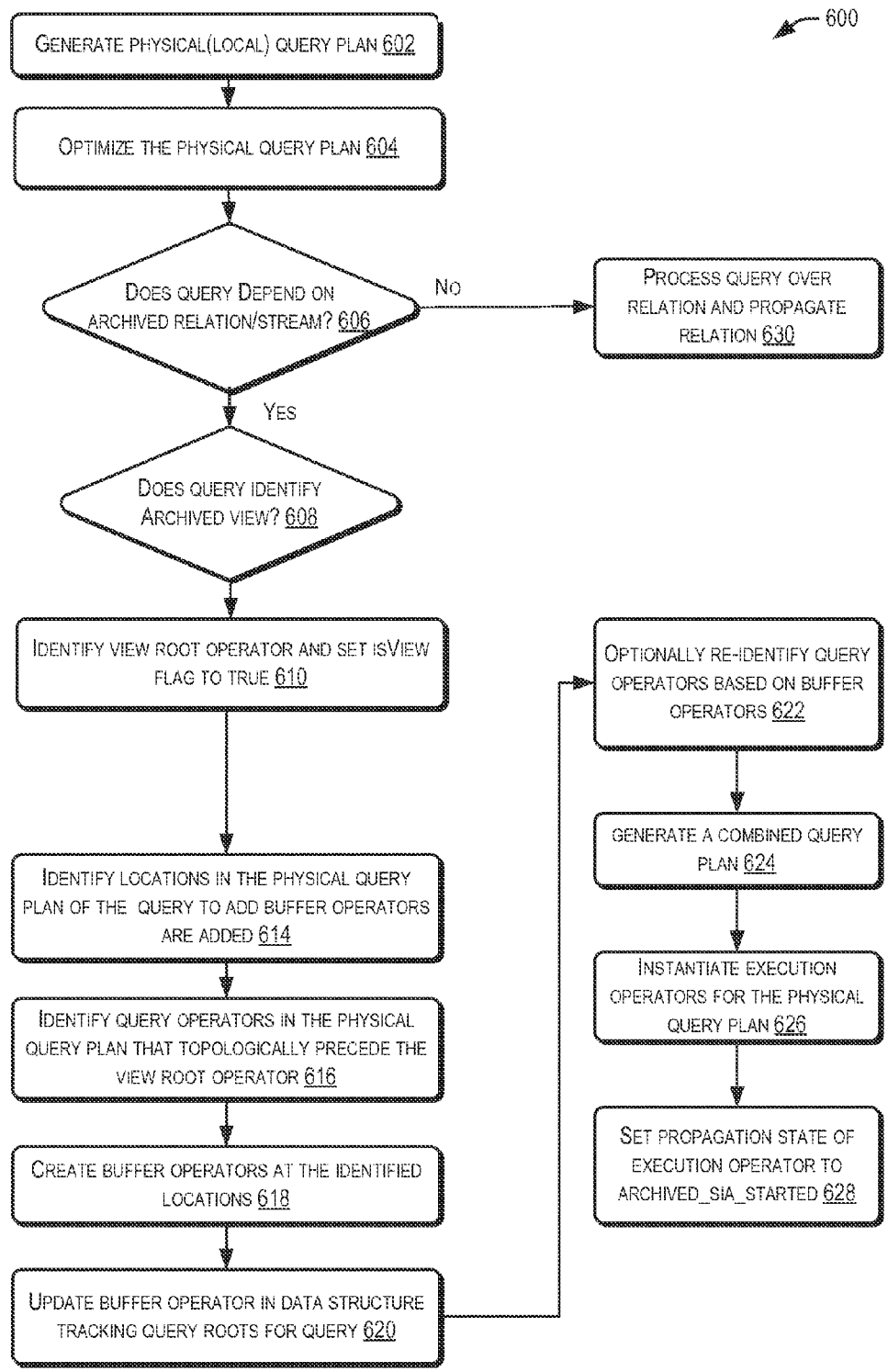
FIG. 6 is a high level flowchart depicting a process for instantiating a physical query plan for a continuous query, in accordance with one embodiment of the present disclosure.

FIG. 6 is a high level flowchart depicting a process for starting a CQL query, in accordance with one embodiment of the present disclosure. In one embodiment, the process 600 describes more details of performing process 506 discussed in FIG. 5. In some examples, the process 600 may be performed upon execution of a method, QueryManager.instantiate( ) in the query manager module 208 in the CQL engine CQ Service 202, as discussed in detail below.

At 602, the process 600 may include generating a physical (or local) query plan for the query. In one example, an 'alter query q1 start' DDL may be issued by the query manager module 208 to generate the physical query plan.

At 604, the process 600 may include optimizing the physical query plan. In some examples, optimizing the physical query plan may include identifying operators in the physical query plan which are which are the same type as one or more operators in already existing queries and optionally sharing these operators in order to reduce the memory footprint of executing the query.

At 606, the process 600 may include determining if the query depends on an archived relation and/or an archived stream. In some examples, the process at 606 may include executing a method 'isDependentOnArchivedReln( )' in the query manager module 208. In order to determine if a query is dependent on an archived relation and/or an archived stream, a Boolean field 'isDependentOnArchivedReln' may be associated with the metadata related to the query. A similar field may be used in the case when the query identifies an archived stream. During semantic analysis of the query, if at least one of the sources referred in the FROM clause of the query are archived then 'isDependentOnArchivedReln' field is set to 'true'. The method isDependentOnArchivedReln( ) returns the value of this field from the query metadata If it is determined that the query identifies an archived relation and/or an archived stream, then 608, the process 600 may include identifying if the query also identifies an archived view. If it is determined that the query identifies an archived view, then at 610, the process 600 may include creating the archived view (e.g., by issuing a create view DDL in the CQL Engine/CQ service as discussed above), identifying the 'view root' operator in the archived view and setting an 'isView' flag to 'true' for the 'view root' operator.

At 614, the process 600 may include identifying locations in the physical query plan of the query where one or more 'buffer' operators can be added. In one example, the process at 614 may include executing a method, 'findBufferOpRequirements( )' in the plan manager module 208 in the CQL engine/CQ Service 202.

In some examples, the 'findBufferOpRequirements( )' method may include traversing the physical query plan in topological order starting from the source to identify one or more child operators related to one or more parent (output) operators in the physical query plan, where the child operators are identified by the parent operators to store event information related an application. As an example, if the (child) operator currently being visited identifies an archived relation and/or an archived source or includes a 'select' or 'project' operator which identifies an archived relation and/or the archived source in the lineage or identifies an archived view having a 'view root' operator, then the method may include determining if any output (parent) operators of the (child) operator expect the (child) operator to maintain synopsis. If so, the (child) operator is identified as a candidate on top of whom a 'buffer' operator is added to the query plan.

In some examples, when the query identifies an archived view, the 'findBufferOpRequirements( )' method may include traversing the query plan of the query in topological order to identify the 'view root' operator, the view root operator being identified by an output operator to store event information related to the application and inserting a 'buffer' operator between the 'view root' operator and an 'output' operator. The process may then include storing event information from the 'view root' operator in the 'buffer' operator.

The following examples below illustrate the manner in which the 'findBufferOpRequirements( )' method may identify locations in the query plan of a CQL query where a 'buffer' operator may be added when the query identifies an archived view. As an example, consider a CQL query as follows:

SELECT*FROM V

In the above example, V refers to an archived view. In this case, the query's root is the 'view root' operator.

As another example, consider the following queries, Q1 and Q2 defined over an archived view, V.

Q1: SELECT SUM(C1) FROM V AND Q2: SELECT MAX(C1) FROM V
Q2: SELECT MAX(C1) FROM V

In this case, GroupAggr(sum) may be identified as the 'query' operator for Q1 and Q2 may delegate the querying to the child operator which happens to be the 'view root'. Per this example, the 'view root' may be the 'Join' operator in the archived view. Since, the 'Join' operator is typically stateful and may be shared across all queries on top of it, making the 'Join' operator as a 'query' operator may result in inconsistent state of the join's synopsis and the generation of incorrect query results. In both the above cases, the 'findBufferOpRequirements( )' method may identify that a 'buffer' operator may be inserted between the 'view root' and the operator above it (i.e. the output operator).

In some examples, the 'findBufferOpRequirements( )' method may include returning a Boolean value to indicate if the parent operator needs a child or children to maintain synopsis. All the outputs expecting synopsis from this operator may then be added to a list. In some examples, this list may initially be null, by default. In the case when the operator is a query 'root' then there may be no outputs but a 'buffer' operator may be needed for some output which may be added later and which may expect synopsis. In one example, a 'null' value may be added to the list. In one example, the 'findBufferOpRequirements( )' method may include setting a flag to 'true' to indicate locations in the query plan where a 'buffer' operator may be added. Additionally, in some examples, a 'buffer' operator may or may not be added depending on what the 'query' operator is.

At 616, the process 600 may include traversing the physical query plan in topological order starting from the source to identify 'query' operators in the physical query plan. In some examples, a 'query operator' may refer to a physical operator in the physical query plan which may be designated to query the archiver. In one example, the process at 616 may include executing a method, 'findQueryOperators( )' in the plan manager module 208 in the CQL engine/CQ Service 202. The process by which 'query' operators in the physical query plan may be identified is discussed in detail in FIG. 9.

In some examples, the 'findQueryOperators( )' method may include returning a Boolean value 'isQueryFlagOverwritten' indicating whether a 'query' operator's flag was overwritten upon execution of the 'findQueryOperators( )' method. In addition, the 'findQueryOperators( )' method may include appropriately setting a 'canBeShared' flag and ensuring that operators downstream to the 'query' operator have the 'canBeShared' flag set to false. In one example, the 'findQueryOperators( )' method may also include resetting the 'canBeShared' flag to 'false' and resetting the list of outputs expecting the 'buffer' operator to be 'null' for all downstream and reachable operators.

In some examples, if it is determined that the query identifies an archived view, the 'findQueryOperators( )' method may also include identifying one or more operators that topologically precede the 'view root' operator in the archived view as 'query' operators. Accordingly, in one embodiment, the 'findQueryOperators( )' method may include setting an 'isBelowViewRootInclusive' flag to 'true' for an operator while performing the identification of 'query' operators.

In some examples, the process at 616 may also include constructing archiver queries for the identified 'query' operators that topologically precede the 'view root' operator. If it is determined that the query identifies an archived view, then, in one example, the 'view root' operator may utilize the archived view's attribute names (specified in schema) as aliases for the project expressions of the archiver query. This aspect may be considered by the physical operators capable of constructing their archiver queries. In one example, an 'isView' flag may be included in physical operator to identify whether an operator is a 'view root'. If this flag is set, then, in one example, the process at 616 may include utilizing the view's attribute names instead of the generated aliases for project expressions in the archiver query.

At 618, the process at 600 may include creating the 'buffer' operators at the identified locations. In one example, the process at 618 may include executing a method, 'createBufferOperators( )' in the plan manager module 208 in the CQL engine/CQ Service 202. In one example, the 'createBufferOperators( )' method may include inserting one or more buffer operators between each of the one or more identified child operators and the one or more parent operators in the physical query plans at the identified 'buffer' operator locations and storing event information from the one or more child operators into the buffer operators.

In some examples, the 'createBufferOperators( )' method includes performing a topological traversal of the query plan starting from the source. If the operator currently being visited has a non-empty list of outputs expecting a 'buffer' operator, then, in one example, a 'buffer' operator may be created for every output in that list. In one embodiment, the 'createBufferOperators( )' method may include creating a physical 'buffer' operator instance, identifying the current operator as the 'buffer' operator's input, copying over relevant fields from the current operator such as the 'outputSQL' and setting the output which was expecting the 'buffer' operator as its output. In this manner, a 'buffer' operator may get added or inserted into the query plan. Additionally, the 'createBufferOperators( )' method may include setting a flag 'atLeastOneBufferOpAdded' when the first 'buffer' operator is created. If the input operator of the 'buffer' operator is a 'query' operator then the method includes resetting the 'atLeastOneBufferOpAdded' flag and marking the 'buffer' operator as the 'query' operator.

In one example, upon execution, the 'createBufferOperators( )' method may return a Boolean value which is 'true' (by setting the flag 'atLeastOneBufferOpAdded' to 'true') if at least one 'buffer' operator is created.

At 620, the process at 600 may include determining if the 'buffer' operator is the new query root (i.e., topmost operator in the physical query plan). If the 'buffer' operator is the new query root, then the process at 612 may include updating the 'buffer' operator in the data structure tracking the query roots for each query.

At 622, the process 600 may include determining if a 'isQueryFlagOverwritten' flag and an 'atleastOneBufferOpAdded' flag for an operator are set to 'true', and if so, the process at 614 may include optionally re-executing the 'findQueryOperators( )' method to determine if the operator is a 'query' operator.

At 624, the process 600 may include determining, based at least in part on the 'buffer' operator, that a 'query' operator identified in the physical (local) query plan is a same type as a second 'query' operator in a second continuous query concurrently executing in the system defined on top of an archived view. In some examples, when a 'query' operator in a physical (local) query plan is identified as being the same type as the second 'query' operator in the second continuous query, the 'shareOperators( )' method may then include identifying the 'query' operator as an 'equivalent' operator and generating a combined query plan or global query plan by adding all the outputs of the 'query' operator identified in the local query plan to be the outputs of the 'equivalent' operator in the global query plan. In one example, the process at 616 may include invoking a 'shareOperators( )' method in the plan manager module 208 in the CQL engine 156/CQ Service 202.

In some examples, the 'shareOperators( )' method may include traversing the physical (local) query plan of a query to obtain one or more 'equivalent' operators for an operator in the local query plan. Then, the 'shareOperators( )' method may include determining if the 'canBeShared' flag has been set to 'true' for the operator. If the operator has the 'canBeShared' flag set to 'true', then, in one example, the 'shareOperators( )' method may include obtaining the 'equivalent' operator for the operator from the global query plan and then deleting the operator from its local query plan. If, however, the operator has the 'canBeShared' flag set to 'false', then, in one example, the 'shareOperators( )' method may include adding the operator to the global query plan.

In some examples, the 'shareOperators( )' method may include identifying operators that may be shared across queries by determining if a current operator topologically precedes the 'view root' operator, when the query defines an archived view. In one example, the 'shareOperators( )' method may include setting a Boolean flag 'isBelowViewRootInclusive' flag to 'false' for operators that topologically precedes the 'view root' operator and thus can be shared.

In one embodiment, the 'shareOperators( )' method may also include identifying 'query' operators in the physical (local) query plan of the query that may connect to the 'global' query plan for operators that are downstream to the 'view root' operator referred by the query. These operators may be referred to herein as 'connector' operators. As an example, a physical operator in a local query plan can be a 'connector' operator for a query. A binary operator, however, can be a 'connector' operator for a query from both sides since two fields are associated with the operator, the 'isLHSConnector' and the 'isRHSConnector'. In addition, the 'shareOperators( )' method may utilize a field 'canBeConnectorOperator' to indicate whether an operator can be a 'connector' for a query. Once an operator is marked as a 'connector' operator, in one example, none of its downstream unary operators can be connectors since a 'connector' operator may be defined as the first operator at which a local plan joins a global plan. In one example, the method may include utilizing a 'canBeConnectorOperator' flag to identify if the operator is indeed a first such operator and then marking the operator as a 'connector' operator and setting the 'can BeConnectorOperator' flag to 'false' for all the operators reachable from the operator.

In the case of a binary operator, the method may include performing an additional check to determine if the 'canBeConnectorOperator' flag is set to 'false' since the operator may be set to 'false' by an operator getting marked as a 'connector' for one side of the binary operator. However since the binary operator may act as a 'connector' for the other side, the inputs are consulted to check if the 'connector' flags are set for any of them. In this manner, the 'shareOperators( )' method may identify 'connector' operator(s) for a query. In one example, the 'connector' operators may have an 'isLHSConnector' and/or an 'isRHSConnector' flag set to 'true'. These operators may be collected in a list while processing the 'initializeOperatorStates( )' method discussed below and the 'snapshotIds' may be set on their input queues.

At 626, in some examples, the process 600 may include instantiating execution operators for the physical query plan. In certain embodiments, the process at 618 may include creating execution operators for corresponding 'query' operators identified in the physical query plan, creating connecting queues for the execution operators and creating their internal data-structures (referred to herein as 'synopses and stores').

In one example, at 628, the process 600 may include setting the propagation state of the execution operator to 'ARCHIVED_SIA_STARTED' if the query is dependent on an archived relation. As an example, and as discussed in detail below, setting the propagation state may be performed when a 'snapshot' output is being produced based on history data in order to avoid heartbeat requests from the join operation.

In some aspects of the present disclosure, a join operator during query execution may send heartbeat requests if it has received an input from one side of the join operation but has not yet received an input from other side of the join operation. In one example, the heartbeat request may include a timestamp (heartbeat) tuple of the time at which an event is being received on the busy side. So if the left side of the join operation received an event with a timestamp 1000 and an event is not yet received on right side then the join operation, the join operator may send a heartbeat request with a timestamp 1000 on the right side of the join operation.

The heartbeat request results in sending a timestamp (heartbeat) tuple from the silent side source which eventually reaches the join operator and then the join operator is able to proceed further with its execution. Heartbeat requests that occur during a state initialization phase may result in out-of-order timestamp exceptions at runtime. The out-of-order execution may occur since while initializing the state an input from either side of the join operation may not arrive from the source. In this situation, the heartbeat request may get processed later (for example, once state initialization completes) by which time the requested heartbeat time may have typically expired (for example, events with higher timestamp could have been sent in state initialization itself). To avoid this situation, in one embodiment of the present disclosure, heartbeat requests may be blocked during state initialization. Accordingly, the propagation state of all execution operators may be set to ARCHIVED_SIA_START state once the query is instantiated. Once the execution operators are in this state, the heartbeat requests may be blocked. At the end of state initialization, once the archived relation tuples are propagated completely, the state may be set to ARCHIVED_SIA_DONE and normal processing related to heartbeat requests may be performed for streaming input events.

At 630, if it is determined that the query does not identify an archived relation and/or an archived stream or an archived view, then the query is processed to identify the source specified in the query and the results of executing the query are propagated to downstream to generate a 'snapshot' output of data values for the user.

Figure 7:
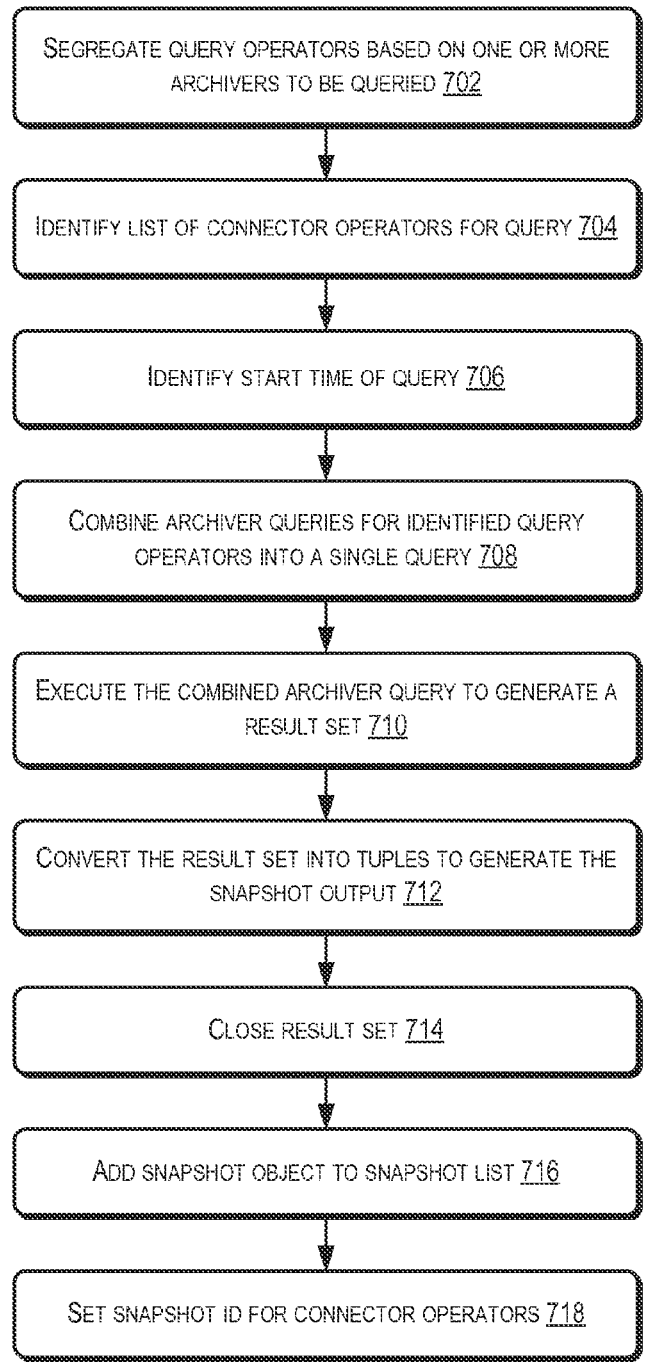
FIG. 7 is a high level flowchart depicting a process for initializing the state of query operators identified in a physical query plan for a continuous query, in accordance with one embodiment of the present disclosure.

FIG. 7 is a high level flowchart depicting a process for initializing the state of query operators identified in a physical query plan for a continuous query, in accordance with one embodiment of the present disclosure. In one embodiment, the process 700 describes more details of performing the process 508 discussed in FIG. 5. In some examples, the process 700 is performed upon execution of a method, QueryManager.initalizeOperatorStates( ) in the query manager module 208 in the CQL engine/CQ Service 202, as discussed in detail below.

At 702, the process 700 may include segregating the identified query operators in the physical query plan based on the archiver they are going to query. In some examples, one or more archivers may be identified for the query, and the process discussed below in (708-718) may be performed for every archiver that is referred to by the archived relation and/or archived stream in an archived view of the query being executed.

At 704, the process 700 may include identifying a list of 'connector' operators for the query.

At 706, the process 700 may include identifying the start time of the query as the current system time. In some examples, the start time may be used as a parameter while constructing an archiver query.

At 708, the archiver queries for all the identified 'query' operators that may query a particular archiver (identified at 702) may be combined into a single query. In one embodiment, the process at 708 may be performed by executing a method 'constructUnionBasedQuery( )' in the query manager module 208.

At 710, the process 700 may include finding the archiver instance and executing the combined archiver query by executing an 'executeArchiverQuery( )' method in the query manager module 208.

In some examples, at 710, parameter values, if any, may be supplied to the combined archiver query and executed against the archiver instance which corresponds to the archiver name mentioned in the archived relation and/or archived stream creation DDL. In some examples, the parameter values may correspond to the system timestamp at the query start time. This timestamp may be referred to as a 'snapshot time'. It is further to be appreciated that certain types of archiver queries such as the archiver query of a 'stream source' and a 'value relation window' may typically require parameter values. In the case of a 'value relation window', the current system time may be appropriately converted to mark the beginning of the current hour or current period (depending on the window type being a current hour or a current period window) before being sent as a parameter.

In some examples, the return value of the 'executeArchiverQuery( )' method is a result set of data records returned by the 'executeArchiverQuery( )' method. In one example, the 'snapshot time' may be set in the execution operator so that it can be used as the timestamp for the tuples which may be obtained in the returned result set. These tuples may be referred to herein as 'archiver' tuples.

At 712, the process 700 may include converting the result set (obtained as a result of executing the archiver query) into a list of tuples for each of the participating 'query' operators and setting the list of tuples in the corresponding execution operator. In one embodiment, this is performed by executing a method 'convertResulttoTuples( )' in the query manager module 208 which constructs tuples from the data records returned in the result set. In some examples, at 712, the method 'convertResulttoTuples( )' may also include constructing a 'snapshot' information object based on querying the BEAM_TRANSACTION_CONTEXT system table records.

At 714, the process 700 may include closing the archiver's result set.

At 716, the process 700 may include adding the 'snapshot' object into a snapshot list maintained by the plan manager module 206 after getting a new 'snapshot' identifier from the plan manager module 206. In one example, the process of adding a 'snapshot' object may be performed by executing a method 'addSnapshot( )' in the plan manager module 206.

In some examples, the plan manager module 206 may maintain a list of 'snapshot' objects created each time an archiver query is executed. In one example, the 'addSnapshot( )' method may provide a method called 'getNextSnapshotId( )' which may return an incrementally increasing 'snapshot' number every time it is called. Accordingly, when the next 'snapshotId' is obtained, it is associated with its 'snapshot' object constructed as discussed above, and added to the end of 'snapshotList' maintained by the plan manager module 206.

At 718, the process 700 may include setting the 'snapshot' identifier for every 'connector' operator in the list of connector operators obtained at 704. In one example, the process of setting the 'snapshot' identifier may be performed by executing a method 'setSnapshotId ForConnectors( )' in the plan manager module 206.

In some examples, the 'setSnapshotId ForConnectors( )' method sets the input queues of the connector operator with the 'snapshotId' returned by the plan manager module 206. In one example, the 'snapshotId' id returned by the plan manager module 206 may be increasing and snapshots that are taken later may subsume the earlier snapshots. For example, if the input queue is set with a 'snapshotId' of '2' then any event which has a 'snapshotId'<=2 has already been seen by the branch originating at that operator. Since, the connector operator is the place where the physical (local) query plan joins the global query plan, the 'snapshotId' filtering may be applied to its input queue to avoid double counting of events.

Every incoming event may consult the 'snapshotList' data structure to compute its 'snapshotId' which may indicate the earliest of 'snapshots' which has accounted for this event. If no 'snapshot' has accounted for the event yet then the incoming event may be assigned a 'snapshotId' which is larger than the highest 'snapshotId' in the plan manager module 206. Based on the above disclosed technique and based on comparing the 'snapshotId' of an event with the queue (if a queue has been set), the double-counting of events may be avoided.

In some examples, the 'setSnapshotId ForConnectors( )' method may iterate through the list of connector operators and set the 'snapshotId' in their input queue. For a binary operator, the operator may be checked to determine if it is a connector operator for the left side (isLHSConnector( )) or a connector operator for the right side (isRHSConnector( )) or both and accordingly, the 'snapshotId' may be set in the appropriate input queue(s).

As discussed above, in one example, upon converting the result set of data records into a set of tuples and constructing a 'snapshot' object (at 712), the set of tuples may be set in the execution operators corresponding to the identified 'query' operators. In this manner, the set of tuples may be utilized to initialize the 'state' of the execution operators. One more passes may be made over the physical query plan in topological order to initialize the 'state' of the execution operators based on the set of tuples and propagate the tuples downstream to generate a 'snapshot' output of data values related to the application. In one embodiment, the process 800 in FIG. 8 below describes the manner of generating a 'snapshot' output of data values related to the application based on the obtained result set.

Figure 8:
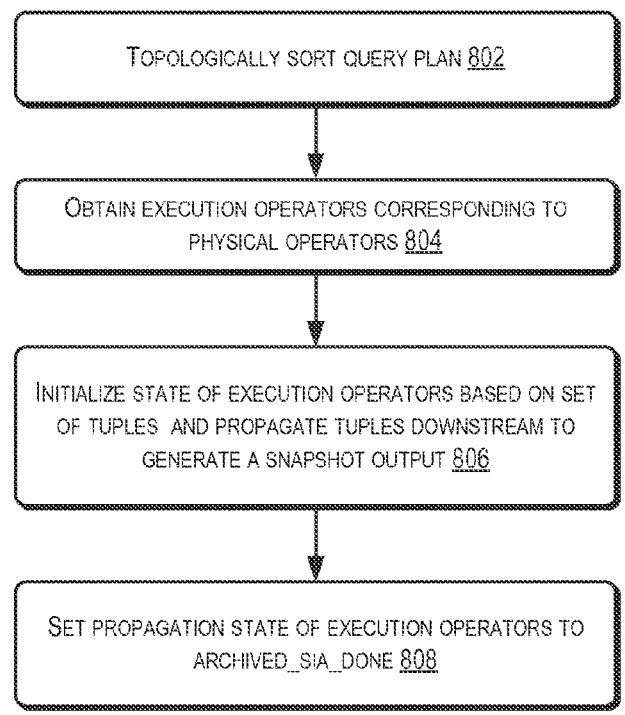
FIG. 8 is a high level flowchart depicting a process for generating a snapshot output of data values related to an application, in accordance with one embodiment of the present disclosure.

FIG. 8 is a high level flowchart depicting a process for generating a snapshot output of data values related to an application, in accordance with one embodiment of the present disclosure. In one embodiment, the process 800 describes more details of performing the process 510 discussed in FIG. 5. In some examples, the process 800 may be performed upon execution of a method, 'PlanManager.propagateArchivedRelationTuples( )' in the plan manager module 206 in the CQL engine/CQ Service 202, as discussed in detail below.

At 802, the process 800 may involve topologically sorting the physical query plan starting from the source.

At 804, the process 800 may involve obtaining execution operators corresponding to each physical operator visited in topological order in the physical query plan.

At 806, the process 800 may involve initializing the 'state' of the execution operators based on the set of tuples obtained (for example, at 712) and propagating the tuples downstream to generate a 'snapshot' output of data values related to the application. In some examples, the process at 806 may involve initializing the internal data structures of the execution operators and propagating the archived tuples downstream by enqueung in the output queue. In one embodiment, the process at 806 may be performed by executing a method, 'ExecOpt.initializeState( )' in the plan manager module 206.

In some examples, the 'ExecOpt.initializeState( )' method iterates over the list of 'archiver' tuples set during the 'initializeOperatorStates( )' method discussed above. In one example, every tuple may be used to initialize the 'state' of the operator, typically involving adding the operator to an internal data-structure and synopsis and then enqueuing the operator on the output queue for downstream propagation. In one example, the enqueue may be associated with 'readerIds' set in the execution operator. The timestamp for these 'archiver' tuples may be the 'snapshotTime' which may be set in the execution operator. Typically, a heart-beat (time progress indication) may be sent with 'snapshotTime+1' to ensure flushing out of the 'snapshot' output.

In one example, the implementation of the 'ExecOpt.initializeState( )' method may be operator-specific and may be provided for the operators which can actually query the archiver such as, for example, the 'RelationSource' operator, the 'StreamSource' operator, the 'ValueRelationWindow' operator, the 'GroupAggr' operator, the 'Select' operator, the 'Project' operator, the 'Distinct' operator and the 'Buffer' operator.

Once the archived relation tuples are propagated completely, in some examples, at 808, the process 800 may involve setting the propagation state of the execution operators to ARCHIVED_SIA_DONE so that normal processing related to heartbeat requests may be performed for streaming input events.

Additional details of the manner in which the various processes of FIGS. 6-8 discussed above may be performed are now described in detail below. For example, FIGS. 9-10 describe a process by which 'query' operators in a physical query plan may be identified (e.g., more details on performing process 608 of FIG. 6). Similarly, FIGS. 11-12 describes a process of generating a list of tuples and a 'snapshot' object from data records returned in a result set (e.g., more details of performing process 712 FIG. 7).

Figure 9:
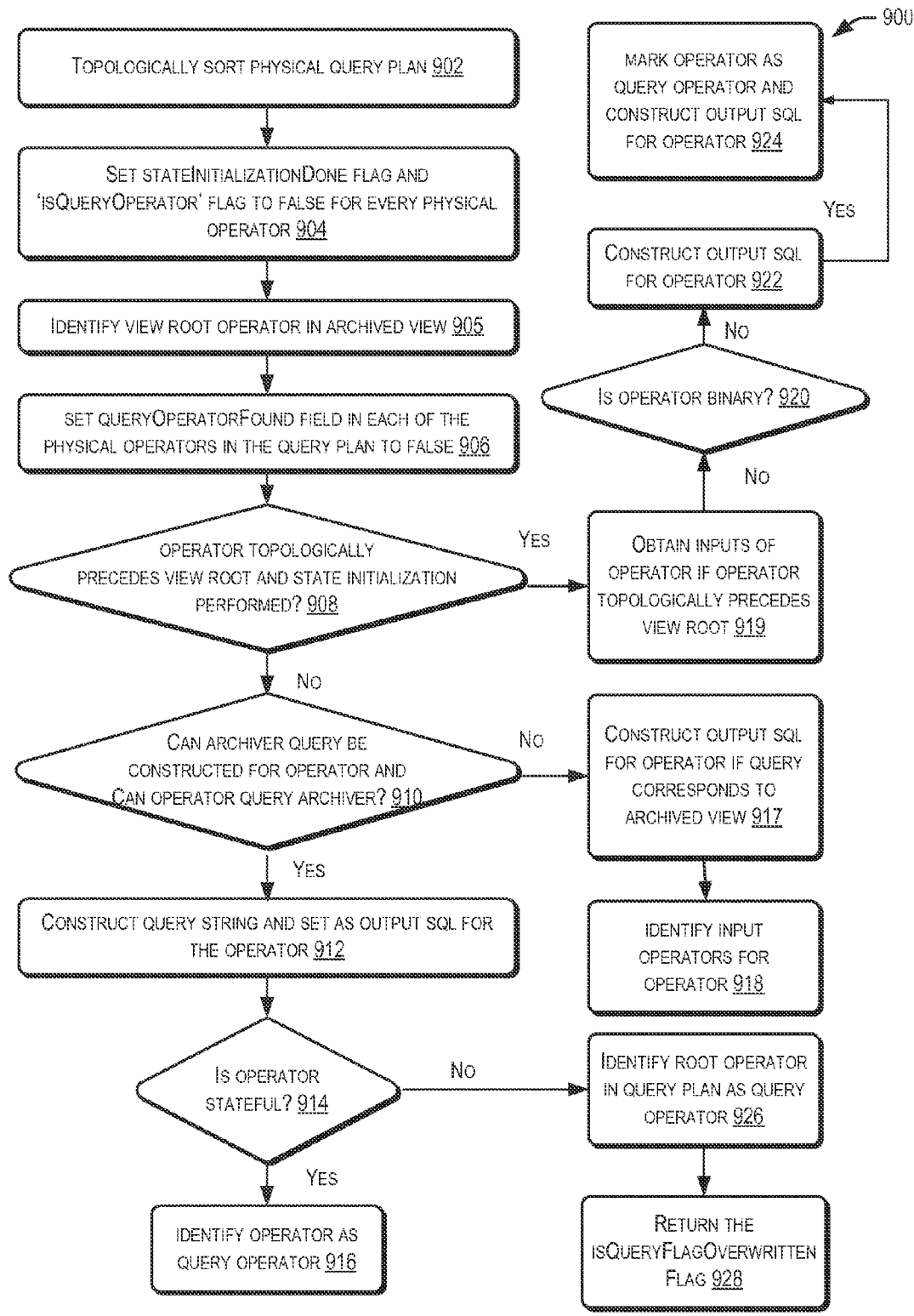
FIG. 9 is a high level flowchart depicting a process of identifying query operators in a physical query plan, in accordance with one embodiment of the present disclosure.

FIG. 9 is a high level flowchart depicting a process of identifying query operators in a physical query plan, in accordance with one embodiment of the present disclosure. In one embodiment, the process 900 describes more details of performing process 608 discussed in FIG. 6. In some examples, the process 900 may be performed upon execution of a method, 'findQueryOperators( )' in the query manager module 208 in the CQL engine 156/CQ Service 202, as discussed in detail below.

In some examples, the 'findQueryOperators( )' method may include identifying one or more 'query' operators in the physical (local) query plan and constructing archiver queries for the identified 'query' operators. In some examples, an operator which is identified as a 'query' operator may either be a lowest stateful operator (i.e., an operator which has some state, such as for example, a 'ValueRelationWindow' operator, a 'GroupAggr' operator) or a stateless operator whose parent operator (i.e., downstream operator) may not construct its archiver query. In some examples, there may be multiple branches in the physical query plan (such as, for example, a query involving a join operator) and the 'findQueryOperators( )' method may identify a 'query' operator for each branch.

In certain examples, the 'findQueryOperators' method may invoke certain methods defined in the operators in the physical query plan, including, but not limited to, 'canConstructQuery( )', 'canBeQueryOperator( )', 'updateArchiverQuery( )' and 'getOutputSQL'. These methods are discussed in detail below.

In one example, the 'canConstructQuery( )' method returns 'true' if it is possible to construct the archiver query for a physical 'query' operator, and 'false' otherwise. For example, a 'GroupAggr' operator computing MAX may not be a 'query' operator as the 'GroupAggr' operator typically requires the entire input of data as a part of its state. Even if the MAX value may be obtained from the archiver, subsequent streaming inputs may not be processed as MAX is typically considered a non-incremental aggregate function. In one example, the 'canBeQueryOperator( )' method returns 'true' if the operator can indeed 'query' the archiver. In one example, the 'updateArchiverQuery( )' method constructs the query string and sets it as an 'outputSQL' for a physical operator. In one example, the 'getOutputSQL( )' method returns the archiver query for a physical operator. Details of the process performed by the 'findQueryOperators' method is discussed in detail below.

In some examples, the process at 900 may include associating a 'isBelowViewRootInclusive' flag with the physical operators in the physical query plan of a query that identifies an archived view and computing the value of this flag for every operator in the query plan prior to identifying 'query' operators. Since state initialization of operators in a query plan is typically performed in topological order starting from the source and the operators in the archived view's definition query may also be included in the query plan of a query defined on top of an archived view, state initialization of an archived view's definition query may be performed while performing the state initialization of the operators of the query defined on top of the view. In one embodiment, the 'query' identification process may be performed for those operators in the query plan that topologically precede the 'view root' operator in the archived view by utilizing the 'isBelowViewRootInclusive' flag to determine whether an operator topological precedes the 'view root' operator in the query plan.

In some examples, prior to the identification of 'query' operators, the process at 900 may include initially identifying those operators that are above (i.e., topologically precede) the 'view root' operator referred by this query. In one example, a list of view references for the query may be obtained and the 'view root' for each of the archived views referenced by the query may be determined. In one embodiment, the process at 900 may include invoking a 'initializeFlagForOpsUpstreamToViewRoot( )' method in the query manager module 208 which may take the 'view root' operator as a parameter and set the 'isBelowViewRootInclusive' to 'true' for the 'view root' and all the operators that are topologically below the 'view root'. Once this flag is set correctly for all operators in the query plan, the method may include determining whether to process an operator during the topological traversal of the query plan. Additionally, if the current query being started includes a definition query for an archived view, the outputSQL (obtained by calling the updateArchiverQuery( ) method) may be constructed for the operator after the 'query' operator(s) for the definition query of the archived view have been identified so that a valid outputSQL may be generated for the 'view root' operator. In some examples, the queries on top of the archived view may then utilize the 'view root' operator's outputSQL to construct their queries.

In some examples, at 902, the process 900 may involve topologically sorting the query plan starting from one or more sources.

At 904, the process 900 may involve setting a 'stateInitializationDone' flag and an 'isQueryOperator' flag to 'false' for every physical operator in the query plan. As described herein, in one example, the 'stateInitializationDone' flag may indicate whether state initialization processing has been performed for a physical operator and the 'isQueryOperator' flag may indicate whether the physical operator has been marked as a 'query' operator.

If the query refers to one or more archived views then at 905, the process 900 may include setting the 'isBelowViewRootInclusive' to 'false' for every physical operator. Additionally, the 'view root' is identified for every referred archived view in the query, and the 'initializeFlagForOpsUpstreamToViewRoot( )' method is invoked to set the 'isBelowViewRootInclusive' flag to 'true' for all operators that are below the 'view root' operator.

In some examples, at 905, the process 900 may also include setting a 'canBeShared' flag to true for all operators in the query plan, thus indicating that an operator can participate in the operator sharing process.

At 906, the process 900 may include setting a boolean field, 'queryOperatorFound' and 'isQueryFlagOverwritten' in each of the physical operators in the query plan to 'false'. The process discussed below in (908-922) may then be performed for each physical operator visited in topological order in the physical query plan.

At 908, the process 900 may include determining if the operator topologically precedes the 'view root' operator and if state initialization has been performed for the operator.

If it is determined that the operator topologically precedes the 'view root' operator and state initialization has not been performed for the operator, then at 910, the process 900 may include determining if an archiver query can be constructed for the physical operator (for example, by invoking the 'canConstructQuery( )' method) and if the operator can indeed 'query' the archiver (for example, by invoking the 'canBeQueryOperator( )' method).

If one or more of the conditions in 910 are true, then at 912, the process 900 may include constructing a query string and setting the string as an 'output SQL' for the physical operator. In one embodiment, this may be achieved by calling the 'updateArchiverQuery( )' method to construct the query string and sets it as an 'output SQL' for that physical operator.

At 914, the process 900 may include determining if the physical operator is a 'stateful' operator.

If it is determined that the physical operator is a 'stateful' operator, then at 916, the process 900 may include identifying or marking the physical operator as a 'query' operator. In some examples, identifying the physical operator as a 'query' operator may involve setting the 'isQueryOperator' flag to 'true'. In addition, the 'stateInitializationDone' flag may be set to 'true' for all operators downstream that are reachable from this operator.

Additionally, at 916, the process 900 may include resetting the 'canBeShared' flag to false and resetting the list of output operators expecting the 'buffer' operator to be 'null' for all downstream and reachable operators including the physical operator. If an operator is encountered which was marked as a 'query' operator then the 'canBeShared' flag is reset and the 'isQueryFlagOverwritten' flag is set to 'true' and the 'queryOperatorFound' flag is set to 'true'.

If one or more of the conditions in 910 are not true, then at 917, the process 900 may include constructing an outputSQL for the operator, for example, if it is determined that the operator can construct its query but cannot be a 'query' operator and if the query corresponds to an archived view's definition query.

At 918, the process 900 may include identifying 'input' operators for the physical operator. As described herein, an 'input' operator may refer to an operator that can construct its query and can also be a 'query' operator for the physical operator. The process 918 of identifying 'input' operators for a physical operator is described in detail in FIG. 10.

In some examples, at 908, if it is determined that state initialization has been performed for the operator then at 919, the process 900 may include obtaining the inputs of the operator if the operator topologically precedes the 'view root' operator.

At 920, the process 900 may include determining if the operator is a unary operator or a binary operator. If it is determined that the operator is a unary operator, then at 922, the process 900 may include constructing an outputSQL for the operator (for e.g., by invoking the 'updateArchiverQuery( )' method) if it is determined that the operator identifies an archived view's definition query and that the operator can construct its query (for e.g., by invoking the 'canConstructQuery( )' method).

If it is determined that the operator is a binary operator, then at 924, the process 900 may include determining if any of the input operators corresponding to this operator have a valid 'output SQL', can be 'query' operators but haven't yet been identified as 'query' operators.

In some examples, at 922, the process 900 may include marking each input operator as a 'query' operator and setting the 'stateInitializationDone' flag to 'true' for all operators downstream and reachable from these input operators. In addition, the 'queryOperatorFound' flag may be set to 'true' for these input operators.

Additionally, at 922, the process 900 may include constructing an outputSQL for each input operator (for e.g., by invoking the 'updateArchiverQuery( )' method) if it is determined that the input operators identify an archived view's definition query and the input operators can construct their query (for e.g., by invoking the 'canConstructQuery( )' method).

At 926, the process 900 may conclude by marking or identifying the 'root' of the query plan as a 'query' operator for this query plan if no 'query' operators have been identified for the query. As an example, at 914 if it is determined that all the operators have been visited and are determined to not be stateful, then, in one example, at 926, the 'root' of the query plan is identified as a 'query' operator for this query plan.

At 928, in some examples, the process 900 may include returning the 'isQueryFlagOverwritten' flag.

Figure 10:
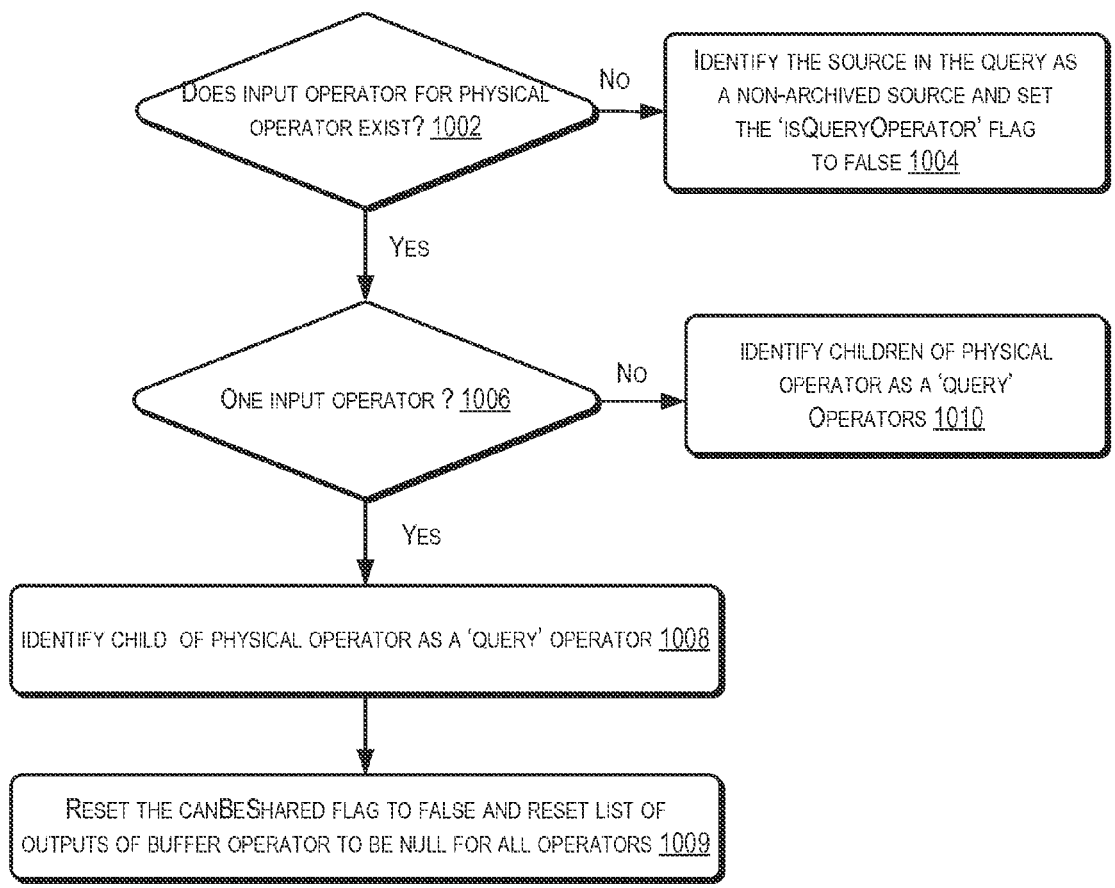
FIG. 10 is a high level flowchart depicting a process by which input operators for a physical operator are identified, in accordance with one embodiment of the present disclosure.

FIG. 10 is a high level flowchart depicting a process by which input operators for a physical operator are identified, in accordance with one embodiment of the present disclosure. In one embodiment, the process 1000 describes more details of performing process 918 of identifying 'input' operators for a physical operator discussed in FIG. 9.

At 1002, the process 1000 may include determining if 'input' operators for the physical operator exist. In some examples, the process at 1002 may include identifying 'input' operators as operators in the physical query plan that can construct its query and can also be a query operator for the physical operator.

If it is determined that no 'input' operators for this operator exist, then at 1004, the process 1000 may include identifying the source specified in the query as a non-archived source and the 'isQueryOperator' flag is set to 'false'. In addition, the 'StateInitializationDone' flag is set to 'true' for all the operators downstream and reachable from this operator.

At 1006, the process 1000 may include determining if one 'input' operator exists for this operator.

If it is determined if there is one 'input' operator then at 1008, the process 1000 may include marking or identifying the child of the physical operator as a 'query' operator by setting the 'isQueryOperator' flag to 'true'. In addition, the 'StateInitializationDone' flag is set to 'true' for all the operators downstream and reachable from the child (input) operator and the 'queryOperatorFound' flag is set to 'true'.

In one example, at 1009, the process 1000 may include resetting the 'canBeShared' flag to 'false' and resetting the list of outputs expecting the 'buffer' operator to be 'null' for all downstream and reachable operators. In this case, the physical operator may not be included in this processing. If an operator is encountered which was marked a 'query' operator then the process includes resetting the operator and setting the 'isQueryFlagOverwritten' to 'true'.

If it is determined that more than one 'input' operator exists for this operator, then at 1010, the process 1000 may include marking or identifying both the children as 'query' operators by setting the 'isQueryOperator' flag to 'true'. In addition, the 'StateInitializationDone' flag is set to 'true' for all the operators downstream and reachable from these children (input) operators and the 'queryOperatorFound' flag is set to 'true'.

In one example, the process at 1010 may also include resetting the 'canBeShared' flag to false and resetting the list of outputs expecting the 'buffer' operator to be 'null' for all downstream and reachable operators. In this case, the physical operator may not be included in this processing. If an operator is encountered which was marked a 'query' operator then the process includes resetting the operator and setting the 'isQueryFlagOverwritten' to 'true'.

Figure 11:
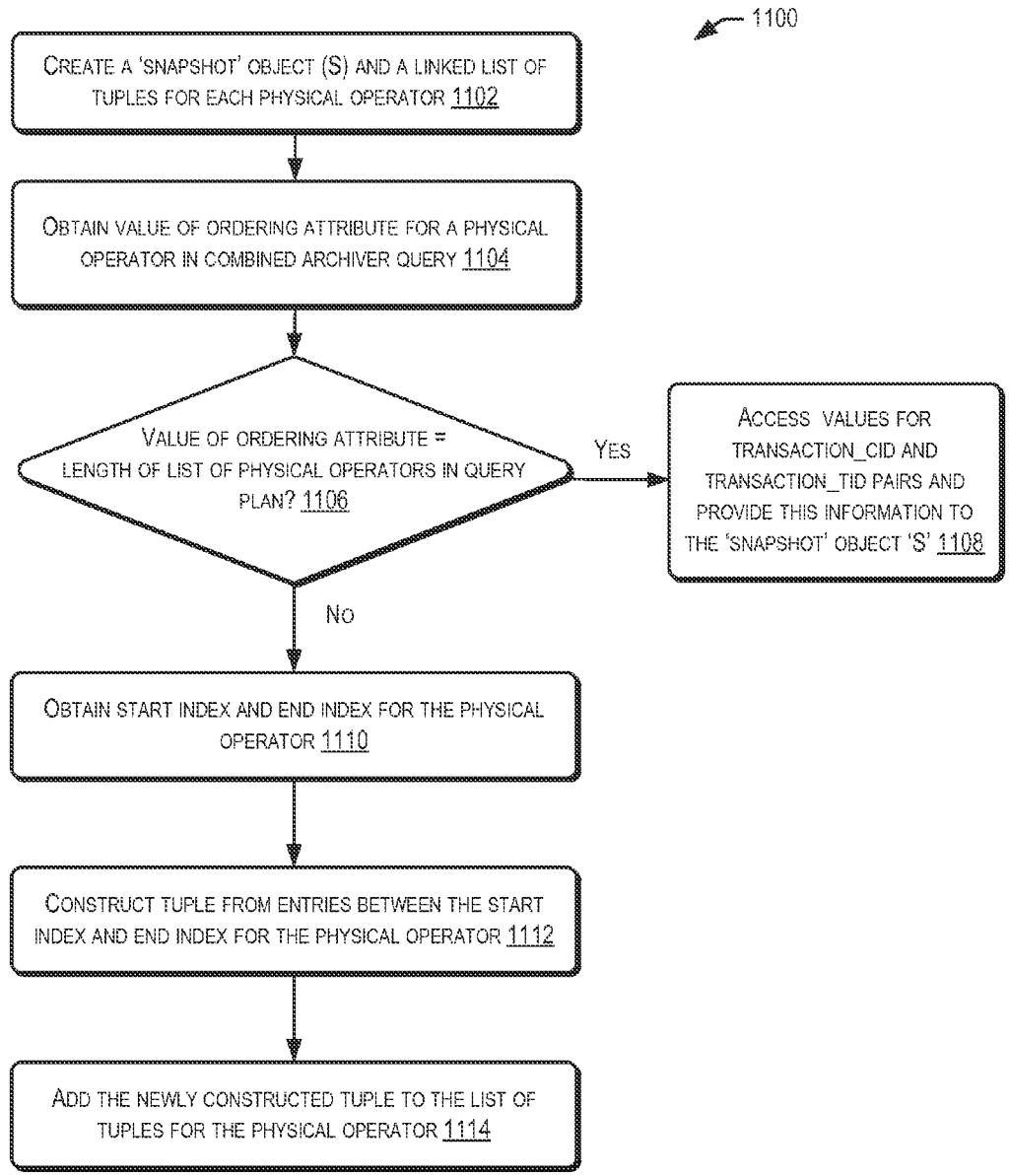
FIG. 11 is a high level flowchart depicting a process for generating a list of tuples from data records returned in a result set, in accordance with one embodiment of the present disclosure.

FIG. 11 is a high level flowchart depicting a process for generating a list of tuples from data records returned in a result set, in accordance with one embodiment of the present disclosure. In one embodiment, process 1100 describes more details of performing process 712 discussed in FIG. 7 of converting a result set (obtained as a result of executing the archiver query) into tuples for each of the participating query operators and setting the list of tuples in the execution operator corresponding to the query operator.

In some examples, the process 1100 may be performed by executing the method 'convertResulttoTuples( )' in the query manager module 208 which constructs tuples from the data records returned in the result set and constructs a 'snapshot' object. As described herein, in one example, a 'snapshot' object maintains a mapping of a 'worker/context' id (transaction_cid) with the 'transaction id' (transaction_tid) to ensure that events are processed exactly once. Accordingly, double counting of events as discussed above may be solved by using this mechanism.

In one example, the pairs (transaction_cid and transaction_tid) may be obtained after querying the BEAM_TRANSACTION_CONTEXT table which may be maintained by the persistence layer in BAM. These pairs may be stored as a hashmap and a 'snapshotId' is associated with them. In some examples, the 'snapshotId' is an increasing number. A list of such 'snapshot' objects may be maintained by the plan manager module 206, in one example. New additions may occur when the archiver is queried. The data-structure of 'snapshot' objects may be consulted when a new record arrives and the 'snapshotId' for that event may be computed based on this consultation. The 'convertResulttoTuples( )' method may also enable the updation/deletion of the 'snapshot' objects. Additional details of the process performed by the 'convertResulttoTuples( )' method is discussed below.

At 1102, the process 1100 may include creating a 'snapshot' object (S) and a linkedlist of tuples (which are empty initially) for each of the physical operators (which may be identified as query operators) participating in the querying process.

In one example, the process 1100 may then include performing the processes described in (1104-1114) below for each record in the result set.

At 1104, the process 1100 may include obtaining the value of an 'ordering' attribute in the combined archiver query (obtained in 708 of FIG. 7). As described herein, in one example, the 'ordering' attribute may refer to the last column in the combined archiver query. In some examples, during construction of the combined archiver query, the value for this column may start from 0. The first physical operator may have a value 0 for the 'ordering' attribute in the combined archiver query; the second operator may have a value of 1 and so on. Accordingly, in one example, this value can be used as an index into the list of physical operators. In one example, the mapping may enable identifying that that if the value of this attribute is 'i' (i>=0) then the record in the result set may have meaningful values for those columns in the 'select' list which belong to the physical operator present at $i^{th}$ index in the list of physical operators, wherein the rest of the values may be null.

At 1106, the process 1100 may include determining if the value of the 'ordering' attribute is equal to the length of the list of physical operators in the query plan. As described herein, the value of the ordering attribute being equal to the length of the list of physical operators may indicate the presence of 'snapshot' information since the query against the BEAM_TRANSACTION_CONTEXT may be the last query in the combined archiver query.

If it is determined that the value of the 'ordering' attribute is equal to the length of the list of physical operators, then at 1108, the process 1000 may include accessing the values for the transaction_cid and transaction_tid pairs and providing this information to the 'snapshot' object 'S' by calling a 's.addSnapshotInfo( )' method.

If it is determined that the value of the 'ordering' attribute is not equal to the length of the list of physical operators, then at 1110, the process 1100 may include obtaining a 'start index' and an 'end index.' As described herein, in one example, the 'start index' may refer to the index at which the SELECT list entries for the physical operator is located at the start of 'ordering' attribute in the combined SELECT list. Similarly, the 'end index' may refer to the index at which the SELECT list entries for the physical operator are located at the end of the 'ordering' attribute in the combined SELECT list. In one example, while constructing the combined archiver query, a data-structure may be populated that enables access to the 'start index' and an 'end index.'

At 1112, the process 1100 may include constructing a tuple from the entries between the 'start index' and the 'end index' (both inclusive) with other information related to the physical operator and metadata related to the 'result set.' Accordingly, the columns may be traversed one by one and an appropriate 'getter' method may be invoked based on the column's data type to extract its value. Then, based on the data type of the attribute in the tuple at the current position, an appropriate 'setter' method may be invoked to set the extracted value in the attribute.

At 1114, the process 1100 may include adding the newly constructed tuple to the list of tuples for that operator.

Figure 12:
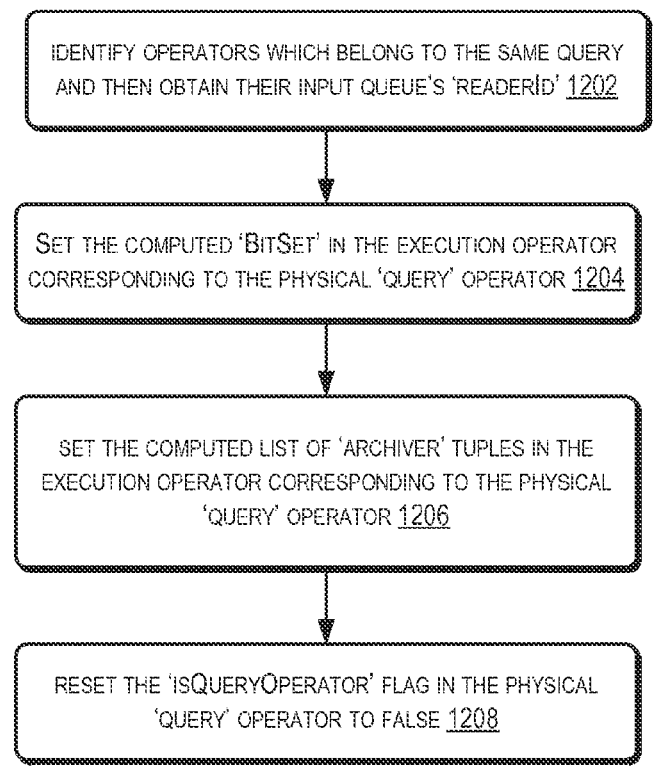
FIG. 12 is a high level flowchart depicting a process for generating a snapshot object from data records returned in a result set, in accordance with one embodiment of the present disclosure.

FIG. 12 is a high level flowchart depicting a process for generating a snapshot object from data records returned in a result set, in accordance with one embodiment of the present disclosure. In one embodiment, process 1200 describes more details of performing process 712 discussed in FIG. 7 of constructing a 'snapshot' object for each of the identified 'query' operators.

In some examples, the process 1200 may be performed by executing the method 'convertResulttoTuples( )' in the query manager module 208 discussed above.

In some examples, each 'execution' operator may be associated with an output queue and a list of associated 'readerIds' that indicate the readers that read from this queue. In one example, the readers in the 'BitSet' which are part of the physical query plan of the current query being started may be identified. This may happen in the case when operator sharing exists across queries. In the case where operator sharing is not present, then all the 'readerIds' are obtained instead of identifying the 'readerIds' in the 'BitSet'. Accordingly, in one example, at 1202, the process 1100 may include identifying those operators which belong to the same query and then obtaining their input queue's 'readerId'. As described herein, the input queue may refer to the queue which reads from the current physical operator's output queue.

At 1204, the process 1200 may include setting the computed 'BitSet' in the execution operator corresponding to the physical 'query' operator.

At 1206, the process 1200 may include setting the computed list of 'archiver' tuples in the 'execution' operator corresponding to the physical 'query' operator.

At 1208, the process 1200 may include resetting the 'isQueryOperator' flag in the physical 'query' operator to false.

The following discussion relates to the manner in which embodiments of the present disclosure of generating a physical query plan for a query (e.g., a continuous query), instantiating the state of operators identified in the query plan and generating a 'snapshot' output of data values related to an application may be applied to a continuous query (e.g., a CQL query) which is received at the CQL Engine 156/CQ Service 202 which identifies an archived relation and/or an archived stream as its source.

As an example, consider an archived relation R that is created using the following DDL schema as follows:

```
CREATE ARCHIVED RELATION R(C1 INTEGER, C2 CHAR(10),
C3 FLOAT, EID BIGINT, WID BIGINT, TID BIGINT)
ARCHIVER MYARCHIVER
ENTITY "ROBJ"
EVENT IDENTIFIER EID WORKER IDENTIFIER WID
TRANSACTION IDENTIFIER TID IS SYSTEM TIMESTAMPED.
```

As per the above defined DDL schema, in one example, 'myArchiver' refers to the archiver which is to be queried, 'RObj' refers to the name of the Data Object (DO) on the backing store which maps to the archived relation R, 'eid' refers to an event identifier column that is used to appropriately handle the deletion/updation of tuples, 'wid' refers to a worker (context) identifier column which may be used to enable a single processing of the query, 'tid' refers to a transaction identifier column which may also be used to enable a single processing of the query and 'timestamped' refers to the timestamp of the tuples that may be provided by the CQL Engine 156/CQ Service 202 based on the system time.

Further, assume that the following CQL query is defined over archived relation R as follows:

```
CREATE QUERY Q1 AS SELECT SUM(C1)+5, C2-10 FROM R
GROUP BY C2 WHERE C3 > 2.5
```

In one example, the physical query plan that may be generated for the above CQL query is as follows:

```
RELATIONSOURCE (R) →SELECT (C3 > 2.5) → GROUPAGGR
(SUM(C1) GROUP BY C2) → PROJECT (SUM(C1)+5, C2-10)
```

As per the above example, it may be noted that the above physical query plan is already in topological order. Accordingly, when this query plan is traversed in topological order, the 'RelationSource' operator is encountered first. This operator can construct its archiver query and in can also be a query operator. However, in the case of archived relations the 'RelationSource' operator may not be 'stateful' since it may not maintain synopsis. So, in this case, the archiver query for the 'RelationSource' operator may be constructed but may not be marked as a 'query' operator.

Similar processing may take place for the 'Select' operator and it constructs its 'outputSQL' on top of the 'RelationSource' operator using a sub-query based approach to query construction. Now, the 'GroupAggr' operator may be encountered and this may be considered to be a 'stateful' operator and it is able to construct its query as well as it can act as a 'query' operator. Since, these conditions are satisfied, this operator may be marked as a 'query' operator. Then, the 'Project' operator may be encountered and this operator has the 'stateInitializationDone' flag set to TRUE since it is downstream to the 'GroupAggr' operator which is already marked as a 'query' operator. Since the 'Project' operator is a unary operator, additional processing may not need to be performed for this operator.

It may be noted that reachable operators from an operator may refer to operators for which there is a path (for example, made up of bottom-up arrows in the query plan) from the operator to the reachable operators in the query plan. In certain examples, an operator which was previously marked as a 'query' operator may have its flag overwritten if due to another branch in the query plan some operator upstream to it is marked as a 'query' operator.

For example, consider the following query:
SELECT SUM(DISTINCT C1), MAX(C2) FROM R GROUP BY C3
In this example, there are two branches in the query plan:

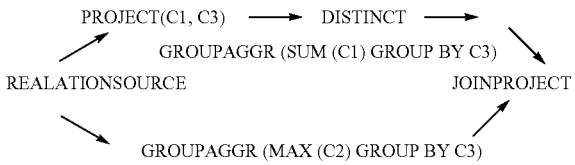

In this query, the first 'Distinct' operator may be identified as a 'query' operator in the first branch. But when the second branch is processed, a GroupAggr that computes a non-incremental aggregate MAX is encountered so the processing reverts back to its input operator which is the 'RelationSource' operator and this operator is marked as a 'query' operator. Then while setting the 'stateInitializationDone' flag to FALSE for operators downstream and reachable from the 'RelationSource' operator (in this case all operators fall in that category) the 'isQueryOperator' flag is set to FALSE in the 'Distinct' operator since now an operator which is upstream to it, 'RelationSource' is marked as a query operator.

The archiver queries for all the identified query operators that query the archive 'R' are then combined into a single query. A combined archiver query may then be constructed as follows:

(SELECT C2 AS C2, SUM(C1) AS PO_GROUP_AGGR_ALIAS0,
COUNT(*) AS PO_GROUP_AGGR_ALIAS1, NULL,
NULL, 0 AS PO_GROUP_AGGR_TYPE
FROM (
SELECT C1 AS C1, C2 AS C2 , C3 AS C3, EID AS EID, NULL AS WID, NULL AS TID
FROM (SELECT C1 AS C1, C2 AS C2 , C3 AS C3, EID AS EID, NULL AS WID, NULL AS TID FROM ROBJ) PO_SELECT

WHERE (C3 > 2.5)
) PO_GROUP_AGGR
GROUP BY C2)
UNION ALL
(SELECT NULL, NULL, NULL, TRANSACTION_CID,
TRANSACTION_TID, 1 AS PO_GROUP_AGGR_TYPE
FROM BEAM_TRANASACTION_CONTEXT)
ORDER BY PO_GROUP_AGGR_TYPE

The generated combined archiver query may also query the BEAM_TRANSACTION_CONTEXT table to get back the snapshot information besides querying the entity RObj. The count(*) corresponds to internally added aggregation which is essential to track the number of records per group.

The combined archiver query is then executed against the archiver instance 'RObj' to get a result set.

A 'snapshot' object and a set of tuples are then constructed from the records returned by the result set. As per the above example, assume that the entity 'RObj' includes the following data records stored on the backing store as shown in Table-1 below:

TABLE 1

| c1 | c2 | c3 | eid |
|-----|--------|-------|-----|
| 100 | First  | 30.5  | 1   |
| 50  | Second | 15.2  | 2   |
| 65  | First  | 102.6 | 3   |

In addition, consider that the BEAM_TRANSACTION_CONTEXT system table has the following data records as shown in Table-2 below:

TABLE 2

| Transaction_cid | Transaction_tid |
|-----------------|-----------------|
| 10              | 12              |
| 11              | 3               |

It may be noted that the BEAM_TRANSACTION_CONTEXT system table, Table-2 has the highest committed transaction_tid per transaction_cid as provided by the BAM Persistence layer. It may also be noted that the backing store entity 'RObj' as per Table-1 does not have columns for 'wid' and 'tid' (worker identifiers and transaction identifiers) in the archived relation. In some examples, the BAM Persistence layer may provide these worker and transaction identifiers with every event change notification and the column names 'transaction_cid' and 'transaction_tid' may be included in Table-1. So every incoming event in the CQL Engine that comes via the CQ Service (which reads from BAM Persistence) may typically have those values. These values may then be used to compute the 'snapshotId' for that event and accordingly at 'connector' operator input queues, the event may either be processed or ignored.

Based on the data records as per Table-1 and Table-2, the set of data records returned by executing the above combined archiver query (for example, upon execution of the executeArchiverQuery( ) method) is shown in the 'Result Set' table below:

RESULT SET TABLE

| c2 | sum (c2) | count (*) | Transaction_cid | Transaction_tid | Ordering column |
|---|---|---|---|---|---|
| First | 165 | 2 | Null | Null | 0 |
| Second | 50 | 1 | Null | Null | 0 |
| Null | Null | Null | 10 | 12 | 1 |
| Null | Null | Null | 11 | 3 | 1 |

The first record in the 'Result Set' table has an 'ordering column' value of 0. As per the above example, the operator at the $0^{th}$ position is the 'GroupAggr' operator. It is to be appreciated that while the above example lists the 'GroupAggr' operator, other examples may include more than one operator from the list of physical operators.

The 'startIndex' and 'endIndex' for the 'GroupAggr' operator include entries in columns 1-3. Accordingly, columns 1-3 are considered when processing the first record to obtain a first tuple of data values <First, 165, 2>. This tuple is then added to the list of tuples for the 'GroupAggr' physical operator. In one example, the tuple may be obtained by executing the convertResultSettouples( ) method in the Plan Manager module of the CQL engine.

Similarly processing of the second record of the 'Result Set' table results in the creation of a second tuple of data values <Second, 50, 1>. This tuple is also added to the list of tuples for the 'GroupAggr' physical operator.

The third and fourth records in the 'Result Set' table have an 'ordering column' value of 1 and it is equal to the length of the list of physical operators. In one example, these records represent the output of the snapshot information. The columns to consider in these records may include column 4 and column 5. The hashmap in the snapshot object is populated with pairs of tuples of data values <10, 12> and <11, 3> and the snapshot object is returned by the 'Result Set'.

After processing all the data records in the 'Result Set' table, in some examples, the 'readerIds' bitset may be computed. Since the above example discusses a single query without operator sharing, the readerId bitset may include the id of the input queue of the 'project' operator (which, in this example is the parent of the 'GroupAggr' operator). The list of tuples is also set into the execution operator corresponding to the 'GroupAggr' physical operator.

The snapshot object thus constructed from the data records in the result set is associated with a 'snapshot id'. As per the above example, the 'snapshot id' for the snapshot object is 0. The snapshot object is then added as the first row to the snapshot list (for example, by executing the addSnapshot( ) method).

The input queues associated with the connector operator are then set for the 'snapshot id' returned by the result set (for example, by executing the setSnapshotIdForConnectors( ) method). As per the above example, the connector operator is the 'select' operator. In one example, source operators may be shared by default and so these operators may be considered as a part of global plan. In this example, the 'select' operator is the operator in the local query plan that is connected to the global query plan (which, in this case is the 'Relation Source' operator). So the input queue of the 'select' operator is set with the snapshotId returned by the Plan Manager module which in this example has the value '0'.

Now suppose an incoming event <50, Second, 15.2, 2> with wid=10 and tid=11 is received when the query starts receiving new incoming events. The 'snapshotId' for this event may be computed by looking up 'snapshotList'. Since the hashmap of the snapshot object has a mapping <10, 12>, it may be inferred that the incoming event has been accounted for in the 'snapshot' output and its snapshotId becomes '0'. Since the snapshotId of the event (0) is <=snapshotId in the input queue of SELECT (0) we ignore that event thus avoiding double counting.

The query plan is then traversed in topological order. For every physical operator, the corresponding execution operator may then be obtained. If there are 'archiver' tuples set in the execution operator (which may be the case when that operator is identified as a query operator) then the ExecOpt.initializeState( ) method of the execution operator is called to initialize the state of the operators. This may involve initializing the internal data-structures and propagating the archived tuples downstream by enqueing in the output queue.

As per the above example, the two tuples <First, 165, 2> and <Second, 50, 1> are input into the synopsis of the 'GroupAggr' operator and are enqueued in the output queue. The 'Project' operator which is downstream reads these tuples and produces the snapshot output of data values after applying the project expressions (sum(c1)+5, c2−10): <170, −8>, <55, −9>.

Now consider that a delete event <100, First, 30.5, 1> is received after the query starts. For example, if this event corresponds to an event which was present in the backing store prior to the start of the query, then a group tuple <First, 165, 2> may be identified in the synopsis of the 'GroupAggr' operator. Then, the 'GroupAggr' operator sends a minus to the 'Project' operator thus resulting in output minus; <170, −8>. The count in the group tuple in synopsis is decremented to 1 and the updated output is sent by the 'GroupAggr' operator as follows: <65, First, 1>. The 'Project' operator on receiving this results in the output, plus: <70, −9>. Accordingly, new incoming events may utilize the initialized state of the operators to produce the correct output. In some examples, the output may be displayed on the dashboard to the user of the application.

Additionally, in some examples, a archived view may be identified based at least in part on a join query related to two or more archived relations associated with an application and/or generating a query plan for the continuous query. Assuming R is an archived view, it may have its own corresponding query tree rooted at either JOIN or JOIN PROJECT.

Then on top of the that view root there may be GROUP operators (e.g., the view root acts like a source).

Visually, this could represented as:

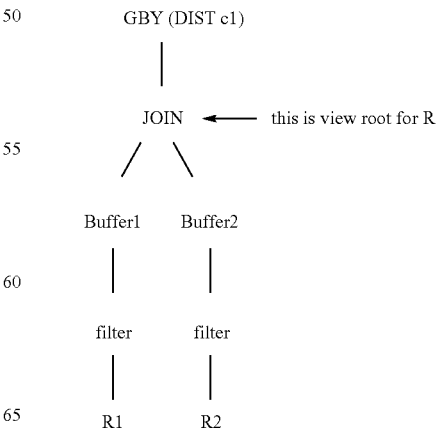

In some examples, there will be the operator tree corresponding to the view R (which will have join or joinproject as root) and then on top of it you will have two branches for aggregates sum( ).

Here buffer operators may be query operators for the view since join needs state on both sides. One could mark even R1 and R2 as query operators but there is a stateless operator (filter) on top of it which does not need its entire input stored. However since filter is stateless and join expects entire input on both sides a buffer operator may be needed. Since the buffer will issue a query with a filter to the backing store, a fraction of records will be brought in memory.

There are really two state initializations happening here. One below root. Those above view root for each query that gets started on top of the view. In some examples, view initialization may be done when the first query is submitted on that view. It may not be done for subsequent query starts.

Additionally, a combined archiver query in this case may look monstrous both view init and query init. For view init both Buffer1 and Buffer2 will do init and may separate out their results based on their operator id. Things get more complex when multiple joins are added. But the same argument holds.

In some examples, if there are incremental aggrs on view root (like sum/count/avg) a buffer operator may not be needed on top of the view root. However if there are non-incremental aggregates (like median/min/max) then the entire input may be stored. This is so because when say a tuple is deleted we may need to scan the entire input. Since view root (join/joinproject) cannot be query operators a buffer operator is needed. In some aspects, this design may save significant memory as you can see all queries started on archived view share the view plan (except, in some examples, when the presence of non-incremental aggregates is not counted). Additionally, in some aspects, queries on view can be started at different points in time and it is possible that operators above view root can see old/stale data. However due to built-in double counting mechanism, operators belonging to new query may discard them.

Figure 13:
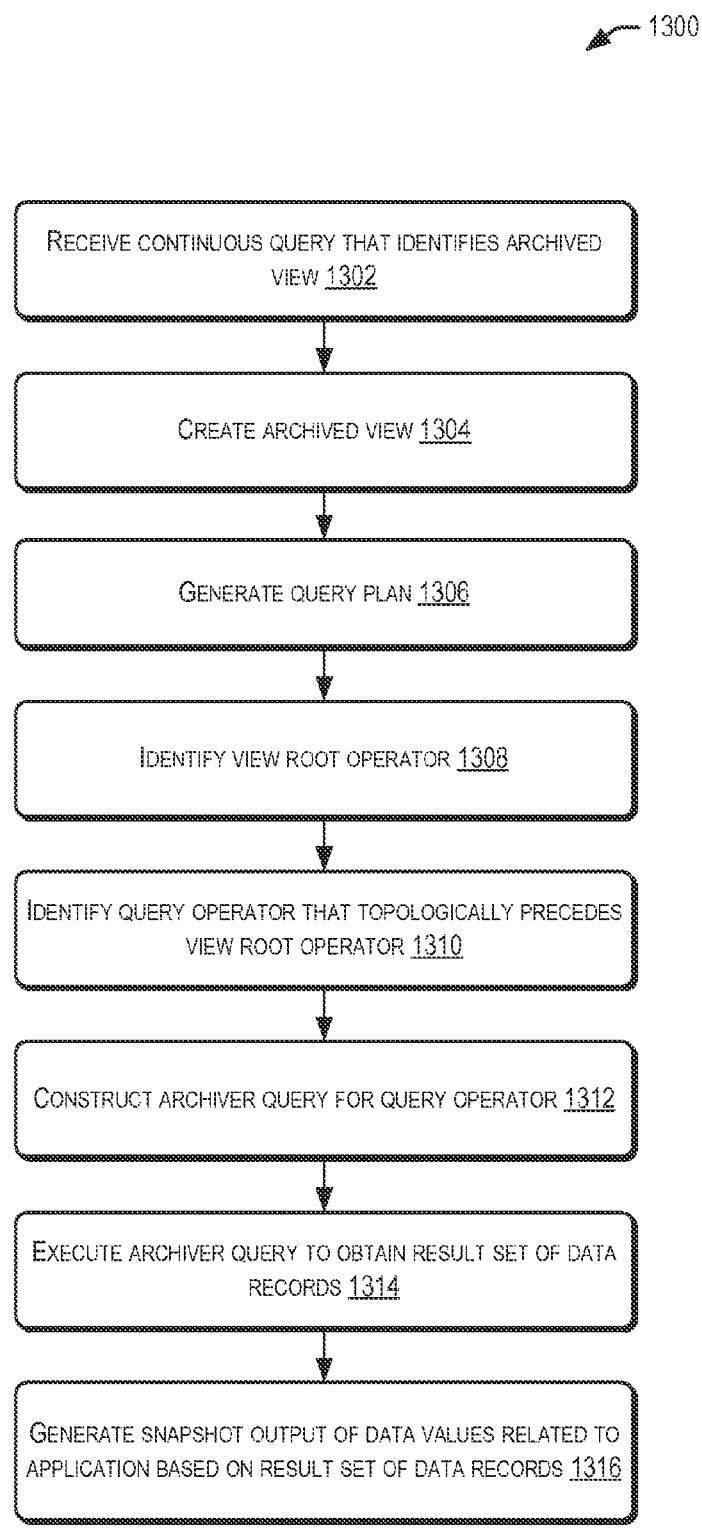
FIG. 13 illustrates an example flow diagram showing process for implementing the management continuous queries that identify an archived relation and/or an archived stream described herein, in accordance with one embodiment of the present disclosure.

FIG. 13 illustrates an example flow diagram showing process 1300 for implementing the management continuous queries that identify one or more archived views described herein, in accordance with one embodiment of the present disclosure. The one or more service provider computers 106 (e.g., utilizing at least the archived relation module 148, the archived view module 149, the state initialization module 150 or the snapshot output module 152 module 152) shown in at least FIG. 1 (and others) may perform the process 1300 of FIG. 13.

The process 1300 may begin at 1302 by including receiving a continuous query. In one example, the continuous query may be identified based at least in part on an archived view At 1304, the process 1300 may include creating the archived view. In one example, the archived view may be identified based at least in part on a join query related to two or more archived relations associated with an application. At 1306, the process 1300 may include generating a query plan for the continuous query. At 1308, the process 1300 may include identifying a view root operator in the archived view. In one example, the view root operator may be identified as a join operator in the archived view. At 1310, the process 1300 may include identifying a query operator in the query plan that topologically precedes the view root operator. Further, at 1312, the process 1300 may include constructing an archiver query for the identified query operator that topologically precedes the view root operator.

At 1314, the process 1300 may include executing the archiver query to obtain a result set of data records related to the application. Additionally, in some examples, at 1316, the process 1300 may include generating a snapshot output of one or more data values related to the application based at least in part on the data records related to the application.

Figure 14:
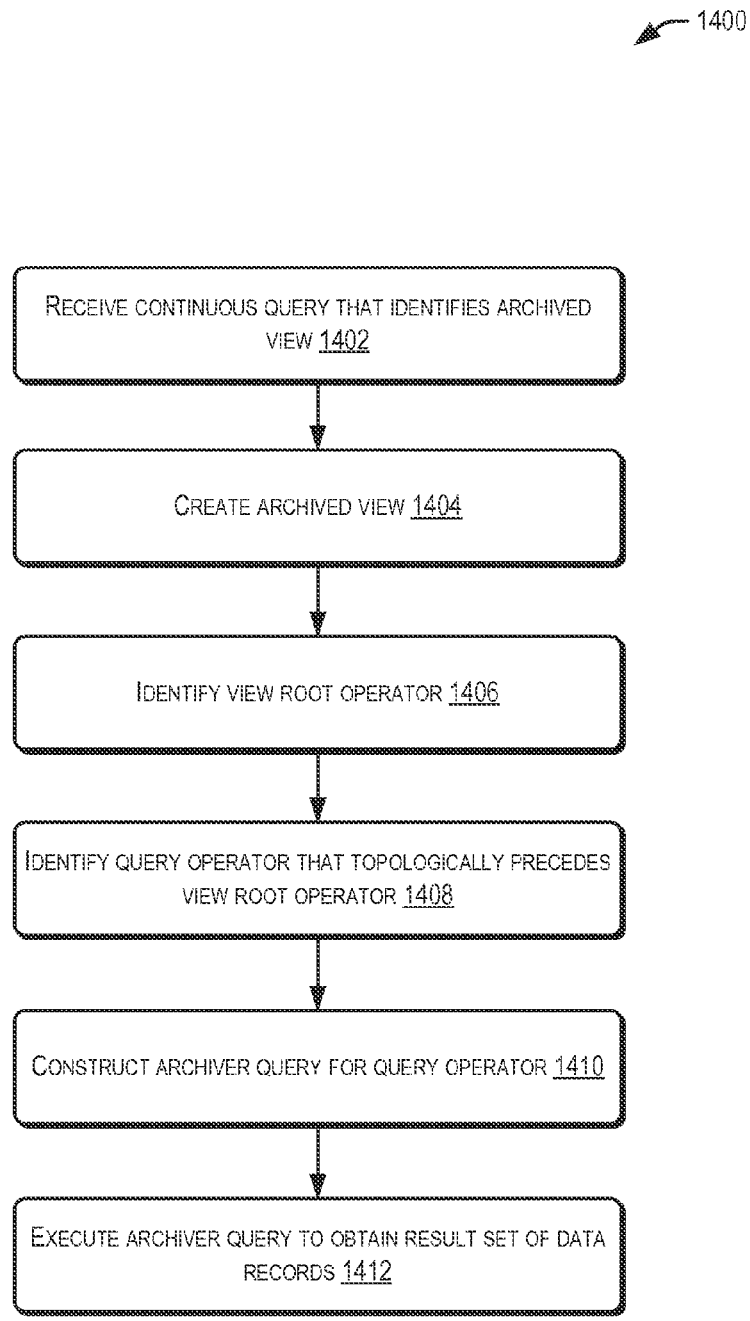
FIG. 14 illustrates an example flow diagram showing process for implementing the management continuous queries that identify an archived relation and/or an archived stream described herein, in accordance with another embodiment of the present disclosure.

FIG. 14 illustrates an example flow diagram showing process 1400 for implementing the management continuous queries that identify one or more archived views described herein, in accordance with another embodiment of the present disclosure. The one or more service provider computers 106 (e.g., utilizing at least the archived relation module 148, the archived view module 149, the state initialization module 150 or the snapshot output module 152 module 152) shown in at least FIG. 1 (and others) may perform the process 1400 of FIG. 14.

The process 1400 may begin at 1402 by including receiving a continuous query. In one example, the continuous query may be identified based at least in part on an archived view. At 1404, the process 1400 may include creating the archived view. In one example, the archived view may be identified based at least in part on a join query related to two or more archived relations associated with an application. At 1406, the process 1400 may include identifying a view root operator in the archived view. In one example, the view root operator may be identified as a join operator in the archived view. At 1408, the process 1400 may include identifying a query operator in a query plan of the query that topologically precedes the view root operator. Further, at 1410, the process 1400 may include constructing an archiver query for the identified query operator that topologically precedes the view root operator. At 1414, the process 1400 may include executing the archiver query to obtain a result set of data records related to the application.

Figure 15:
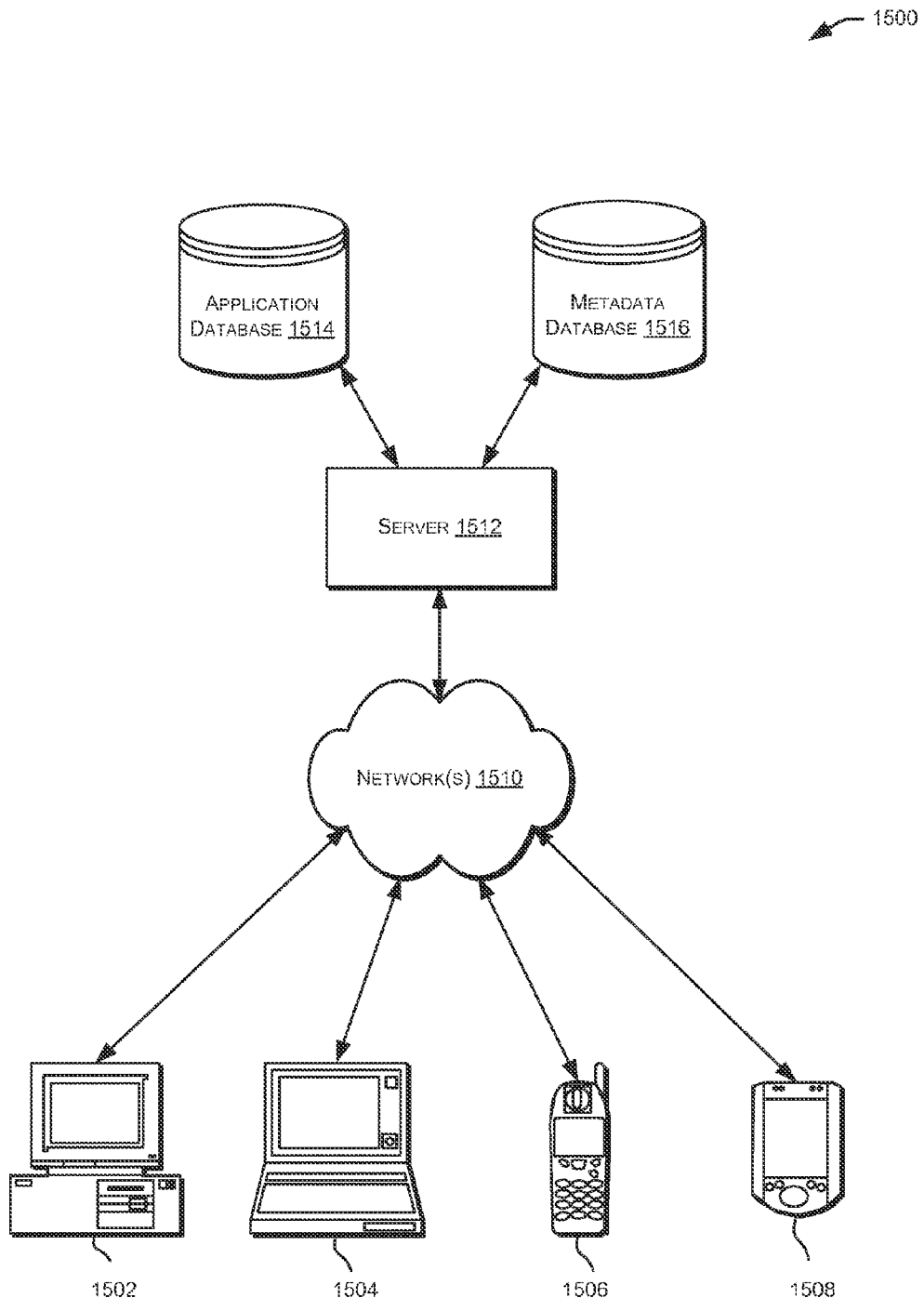
FIG. 15 is a simplified block diagram illustrating components of a system environment that may be used in accordance with an embodiment of the present disclosure.

FIG. 15 is a simplified block diagram illustrating components of a system environment 1500 that may be used in accordance with an embodiment of the present disclosure. As shown, system environment 1500 includes one or more client computing devices 1502, 1504, 1506, 1508, which are configured to operate a client application such as a web browser, proprietary client (e.g., Oracle Forms), or the like over one or more networks 1510 (such as, but not limited to, networks similar to the networks 108 of FIG. 1). In various embodiments, client computing devices 1502, 1504, 1506, and 1508 may interact with a server 1512 over the networks 1510.

Client computing devices 1502, 1504, 1506, and 1508 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1502, 1504, 1506, and 1508 may be any other electronic device, such as a thin-client computer, Internet-enabled gaming system, and/or personal messaging device, capable of communicating over a network (e.g., network 1510 described below). Although example system environment 1500 is shown with four client computing devices, any number of client computing devices may be supported. Other devices such as devices with sensors, etc. may interact with server 1512.

System environment 1500 may include networks 1510. Networks 1510 may be any type of network familiar to those skilled in the art that can support data communications using any of a variety of commercially-available protocols, including without limitation TCP/IP, SNA, IPX, AppleTalk, and the like. Merely by way of example, network 1510 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1500 also includes one or more server computers 1512 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1512 may be adapted to run one or more services or software applications described in the foregoing disclosure. For example, server 1512 may correspond to a server for performing processing described above according to an embodiment of the present disclosure.

Server 1512 may run an operating system including any of those discussed above, as well as any commercially available server operating system. Server 1512 may also run any of a variety of additional server applications and/or mid-tier applications, including HTTP servers, FTP servers, CGI servers, Java servers, database servers, and the like. Example database servers include without limitation those commercially available from Oracle, Microsoft, Sybase, IBM and the like.

System environment 1500 may also include one or more databases 1514, 1516. Databases 1514, 1516 may reside in a variety of locations. By way of example, one or more of databases 1514, 1516 may reside on a non-transitory storage medium local to (and/or resident in) server 1512. Alternatively, databases 1514, 1516 may be remote from server 1512, and in communication with server 1512 via a network-based or dedicated connection. In one set of embodiments, databases 1514, 1516 may reside in a storage-area network (SAN) familiar to those skilled in the art. Similarly, any necessary files for performing the functions attributed to server 1512 may be stored locally on server 1512 and/or remotely, as appropriate. In one set of embodiments, databases 1514, 1516 may include relational databases, such as databases provided by Oracle, that are adapted to store, update, and retrieve data in response to SQL-formatted commands.

Figure 16:
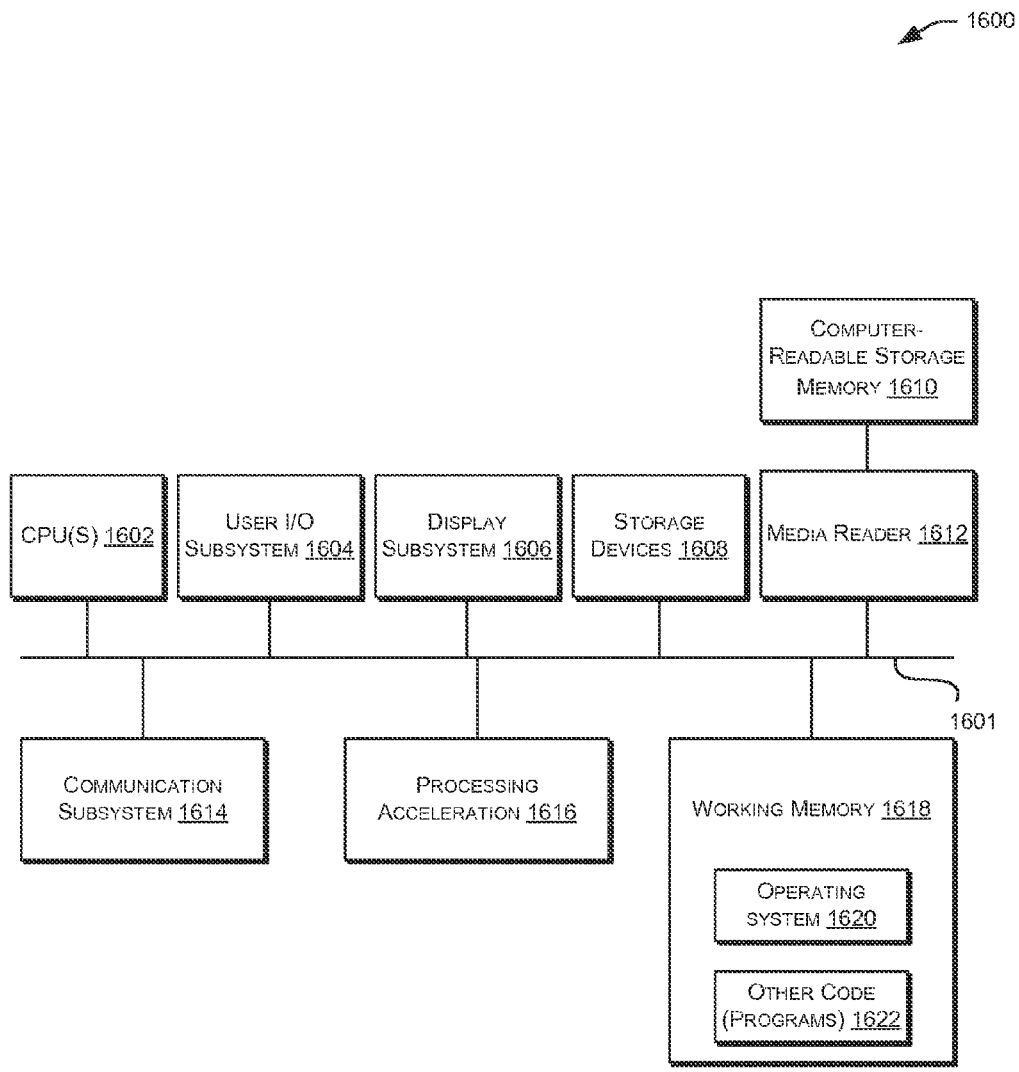
FIG. 16 is a simplified block diagram of a computer system that may be used in accordance with embodiments of the present disclosure.

FIG. 16 is a simplified block diagram of a computer system 1600 that may be used in accordance with embodiments of the present disclosure. For example service provider computers 106 may be implemented using a system such as system 1600. Computer system 1600 is shown comprising hardware elements that may be electrically and/or communicatively coupled via a bus 1601. The hardware elements may include one or more central processing units (CPUs) 1602, one or more input devices 1604 (e.g., a mouse, a keyboard, etc.), and one or more output devices 1606 (e.g., a display device, a printer, etc.). Computer system 1600 may also include one or more storage devices 1608. By way of example, the storage device(s) 1608 may include devices such as disk drives, optical storage devices, and solid-state storage devices such as a random access memory (RAM) and/or a read-only memory (ROM), which can be programmable, flash-updateable and/or the like.

Computer system 1600 may additionally include a computer-readable storage media reader 1612, a communications subsystem 1614 (e.g., a modem, a network card (wireless or wired), an infra-red communication device, etc.), and working memory 1618, which may include RAM and ROM devices as described above. In some embodiments, computer system 1600 may also include a processing acceleration unit 1616, which can include a digital signal processor (DSP), a special-purpose processor, and/or the like.

Computer-readable storage media reader 1612 can further be connected to a computer-readable storage medium 1610, together (and, optionally, in combination with storage device (s) 1608) comprehensively representing remote, local, fixed, and/or removable storage devices plus storage media for temporarily and/or more permanently containing computer-readable information. Communications system 1614 may permit data to be exchanged with network 1612 and/or any other computer described above with respect to system environment 1600.

Computer system 1600 may also comprise software elements, shown as being currently located within working memory 1618, including an operating system 1620 and/or other code 1622, such as an application program (which may be a client application, Web browser, mid-tier application, RDBMS, etc.). In an example embodiment, working memory 1618 may include executable code and associated data structures used for relying party and open authorization-related processing as described above. It should be appreciated that alternative embodiments of computer system 1600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
receiving, by a computer system configured to execute computer-executable instructions, a continuous query, the continuous query identifying an archived view, the archived view identifying a join query between at least a first archived relation and a second archived relation associated with an application, the first archived relation comprising at least a first portion of historical data and incoming events related to an event stream of the application and the second archived relation comprising at least a second portion of the historical data and the incoming events related to the event stream;
generating a query plan for the continuous query;
identifying a view root operator in the archived view, the view root operator being identified as a join operator in the join query identified in the archived view;
determining that a set of one or more operators in the query plan comprises one or more query operators, the one or more query operators being identified as stateful query operators of the query plan that maintain state information related to the application;
identifying one or more of the stateful query operators in the query plan that topologically precede the view root operator;
constructing a set of one or more archiver queries corresponding to the one or more stateful query operators that topologically precede the view root operator;
combining the set of one or more archiver queries to generate a combined archiver query;
executing the combined archiver query to obtain a result set of data records related to the application;
converting the result set of data records into a list of tuples for each of the one or more stateful query operators by:
determining a value of an ordering attribute in the combined archiver query, the value of the ordering attribute corresponding to a number of the one or more stateful query operators in the query plan; and
constructing the list of tuples for each of the one or more stateful query operators based at least in part on the value of the ordering attribute;
initializing a state of the one or more stateful query operators based at least in part on the list of tuples; and
generating a snapshot output of one or more data values related to the application based at least in part on the state of the one or more stateful query operators.

2. The computer-implemented method of claim 1, further comprising:
traversing the query plan in topological order to identify the view root operator, the view root operator being identified by an output operator to store event information related to the application;
inserting a buffer operator between the view root operator and the output operator in the query plan; and
storing the event information from the view root operator in the buffer operator.

3. The computer-implemented method of claim 1, further comprising:
identifying a second query operator in a second continuous query concurrently executing as being the same type as the one or more query operators identified in the query plan, the second continuous query being identified based at least in part on the archived view; and
generating a combined query plan based at least in part on the one or more query operators identified in the query plan being the same type as the second query operator in the second continuous query.

4. The computer-implemented method of claim 1, further comprising initializing the state of the one or more stateful query operators by constructing a list of tuples for the one or more stateful query operators from the result set of data records, wherein at least one tuple in the list of tuples is constructed based at least in part on a subset of attributes in the result set of data records.

5. The computer-implemented method of claim 1, further comprising displaying the snapshot output of the one or more data values related to the application to a user of the application via a display device.

6. The computer-implemented method of claim 1, further comprising processing incoming real-time events related to the application based at least in part on the snapshot output of the one or more data values.

7. A non-transitory computer-readable storage medium storing computer-executable instructions that, when executed by one or more computer systems, configure the one or more computer systems to perform at least:

instructions that cause the one or more computer systems to receive a continuous query, the continuous query identifying an archived view, the archived view identifying a join query between-at least a first archived relation and a second archived relation associated with an application, the first archived relation comprising at least a first portion of historical data and incoming events related to an event stream of the application and the second archived relation comprising at least a second portion of the historical data and the incoming events related to the event stream;

instructions that cause the one or more computer systems to identify a view root operator in the archived view, the view root operator being identified as a join operator in the join query identified in the archived view;

instructions that cause the one or more processors to determine that a set of one or more operators in a query plan for the continuous query comprises one or more query operators, the one or more query operators being identified as stateful query operators of the query plan that maintain state information related to the application;

instructions that cause the one or more computer systems to identify one or more of the stateful query operators in the query plan that topologically precede the view root operator;

instructions that cause the one or more computer systems to construct a set of one or more archiver queries corresponding to the one or more stateful query operators that topologically precede the view root operator;

instructions that cause the one or more computer systems to combine the set of one or more archiver queries to generate a combined archiver query;

instructions that cause the one or more computer systems to execute the combined archiver query to obtain a result set of data records related to the application;

instructions that cause the one or more computer systems to convert the result set of data records into a list of tuples for each of the one or more stateful query operators by:

determining a value of an ordering attribute in the combined archiver query, the value of the ordering attribute corresponding to a number of the one or more stateful query operators in the query plan; and constructing the list of tuples for each of the one or more stateful query operators based at least in part on the value of the ordering attribute;

instructions that cause the one or more computer systems to initialize a state of the one or more stateful query operators based at least in part on the list of tuples; and instructions that cause the one or more computer systems to generate a snapshot output of one or more data values related to the application based at least in part on the state of the one or more stateful query operators.

8. The non-transitory computer-readable storage medium of claim 7, further comprising instructions that cause the one or more computer systems to initialize the state of the one or more stateful query operators by constructing a list of tuples for the one or more identified query operators from the result set of data records.

9. The non-transitory computer-readable storage medium of claim 8, wherein at least one tuple in the list of tuples is constructed based at least in part on a subset of attributes in the result set of data records.

10. The non-transitory computer-readable storage medium of claim 7, further comprising instructions that cause the one or more computer systems to at least display a snapshot output of one or more data values related to the application based at least in part on the result set of data records related to the application.

11. A system, comprising:
a memory storing a plurality of instructions; and
a central processing unit configured to access the memory, wherein the central processing unit is further configured to execute the plurality of instructions to at least:
receive a continuous query, the continuous query identifying an archived view, the archived view identifying a join query between-at least a first archived relation and a second archived relation associated with an application, the first archived relation comprising at least a first portion of historical data and incoming events related to an event stream of the application and the second archived relation comprising at least a second portion of the historical data and the incoming events related to the event stream;
generate a query plan for the continuous query;
identify a view root operator in the archived view, the view root operator being identified as a join operator in the join query identified in the archived view;
determine that a set of one or more operators in the query plan comprises one or more query operators, the one or more query operators being identified as stateful query operators of the query plan maintain state information related to the application;
identify one or more of the stateful query operators in the query plan that topologically precede the view root operator;
construct a set of one or more archiver queries corresponding to the one or more stateful query operators that topologically precede the view root operator;
combine the set of one or more archiver queries to generate a combined archiver query;
execute the combined archiver query to obtain a result set of data records related to the application;
convert the result set of data records into a list of tuples for each of the one or more stateful query operators by:
determining a value of an ordering attribute in the combined archiver query, the value of the ordering attribute corresponding to a number of the one or more stateful query operators in the query plan; and
constructing the list of tuples for each of the one or more stateful query operators based at least in part on the value of the ordering attribute;
initialize a state of the one or more stateful query operators based at least in part on the list of tuples; and
generate a snapshot output of one or more data values related to the application based at least in part on the state of the one or more stateful query operators.

12. The system of claim 11, wherein the central processing unit is further configured to execute the plurality of instructions to at least:
traverse the query plan in topological order to identify the view root operator, the view root operator being identified by an output operator configured to store event information related to the application;
insert a buffer operator between the view root operator and the output operator in the query plan; and
store the event information from the view root operator in the buffer operator.

13. The system of claim 11, wherein the central processing unit is further configured to execute the plurality of instructions to at least:
   identify a second query operator in a continuous query concurrently executing as being the same type as the one or more query operators in the query plan; and
   generate a combined query plan based at least in part on the one or more query operators identified in the query plan being the same type as the second query operator in the continuous query.

* * * * *

UNITED STATES PATENT AND TRADEMARK OFFICE
CERTIFICATE OF CORRECTION

PATENT NO.        : 9,805,095 B2
APPLICATION NO.   : 14/036500
DATED             : October 31, 2017
INVENTOR(S)       : Unmesh Anil Deshmukh et al.

It is certified that error appears in the above-identified patent and that said Letters Patent is hereby corrected as shown below:

On the Title Page

Item (56) References Cited, Other Publications

At Page 6, Column 2, Line 32, delete "Janaury"" and insert -- January --, therefor.

At Page 11, Column 1, Line 40, delete "Office office" and insert -- Office --, therefor.

At Page 11, Column 1, Line 52, delete "Office office" and insert -- Office --, therefor.

At Page 11, Column 1, Line 68, delete "Exatogic" and insert -- Exalogic --, therefor.

At Page 11, Column 2, Line 56, delete "Patentabiilty" and insert -- Patentability --, therefor.

At Page 11, Column 2, Line 62, delete "Office office" and insert -- Office --, therefor.

At Page 12, Column 1, Line 20, delete "Office office" and insert -- Office --, therefor.

In the Specification

In Column 22, Line 22, after "event" insert -- . --.

In Column 24, Line 46, delete "I/CQ" and insert -- /CQ --, therefor.

In Column 31, Line 59, after "FIG. 6" insert -- . --.

In Column 32, Line 17, delete "CQ" and insert -- /CQ --, therefor.

In Column 32, Line 43, after "metadata" insert -- . --, therefor.

Signed and Sealed this
Twenty-fifth Day of December, 2018

Andrei Iancu
*Director of the United States Patent and Trademark Office*

CERTIFICATE OF CORRECTION (continued)
U.S. Pat. No. 9,805,095 B2

In Column 36, Line 12, delete "'can BeConnectorOperator'" and insert -- 'canBeConnectorOperator' --, therefor.

In Column 39, Line 48, delete "enqueung" and insert -- enqueuing --, therefor.

In Column 40, Line 49, delete "'getoutputSQL'." and insert -- 'getoutputSQL( )'. --, therefor.

In Column 45, Line 4, delete "that that" and insert -- that --, therefor.

In Column 48, Line 9, delete "TRANASACTION" and insert -- TRANSACTION --, therefor.

In Column 50, Line 15, delete "enqueing" and insert -- enqueuing --, therefor.

In Column 50, Line 45, delete "the that view root" and insert -- the view root --, therefor.

In the Claims

In Column 57, Line 4, in Claim 7, delete "between-at" and insert -- between at --, therefor.

In Column 58, Line 11, in Claim 11, delete "between-at" and insert -- between at --, therefor.